United States Patent
Herweck et al.

(10) Patent No.: US 10,739,035 B2
(45) Date of Patent: Aug. 11, 2020

(54) PERSONAL AMBIENT AIR TEMPERATURE MODIFICATION, FILTRATION, AND PURIFICATION SYSTEM

(71) Applicant: Airwirl, LLC, North Palm Beach, FL (US)

(72) Inventors: Steve A. Herweck, Wellesley Hills, MA (US); Dana Herweck, Wellesley Hills, MA (US); Michael McCarthy, Palm Beach Gardens, FL (US)

(73) Assignee: Airwirl, LLC, North Palm Beach, FL (US)

( * ) Notice: Subject to any disclaimer, the term of this patent is extended or adjusted under 35 U.S.C. 154(b) by 0 days.

(21) Appl. No.: 16/502,307

(22) Filed: Jul. 3, 2019

(65) Prior Publication Data
US 2020/0011567 A1 Jan. 9, 2020

Related U.S. Application Data

(60) Provisional application No. 62/694,785, filed on Jul. 6, 2018, provisional application No. 62/768,409, filed (Continued)

(51) Int. Cl.
*F24F 13/00* (2006.01)
*F24F 13/20* (2006.01)
(Continued)

(52) U.S. Cl.
CPC ........... *F24F 13/20* (2013.01); *F24F 3/1603* (2013.01); *F24F 5/0017* (2013.01); *F24F 6/12* (2013.01);
(Continued)

(58) Field of Classification Search
CPC ......... F24H 7/04; F24F 5/0017; F24F 5/0021; F24F 2221/38; F24F 6/12; F24F 7/08; F24F 7/007
See application file for complete search history.

(56) References Cited

U.S. PATENT DOCUMENTS 1,922,790 A 8/1933 Alger
4,711,099 A 12/1987 Polan
(Continued)

FOREIGN PATENT DOCUMENTS

GB 237765 8/1925
GB 237765 A * 8/1925 ............ F24F 5/0017
WO WO-2016-113771 7/2016

OTHER PUBLICATIONS

International Search Report from PCT/US2019/040481, dated Sep. 13, 2019.
(Continued)

*Primary Examiner* — Frantz F Jules
*Assistant Examiner* — Lionel Nouketcha
(74) *Attorney, Agent, or Firm* — Morse, Barnes-Brown & Pendleton, P.C.; Sean D. Detweiler, Esq.

(57) ABSTRACT

A personal ambient air temperature modification, filtration, and purification system that is configured to be handheld. The personal ambient air temperature modification, filtration, and purification system of the present invention provides a container with air inlets to allow an internal motorized air movement mechanism to pull air through an air channel fluidly coupling to the air inlets, through a filter disposed in the air channel, through thermal diffusion blades, across at least one combination fluid vapor source and thermal energy storage component that purifies the air by vapor capture, into a thermal energy concentrator disposed in the interior volume of the container that modifies air temperature, and through the motorized air movement mechanism, where the air is then delivered into an environment as purified, filtered, temperature modified air.

44 Claims, 20 Drawing Sheets

Related U.S. Application Data on Nov. 16, 2018, provisional application No. 62/775,320, filed on Dec. 4, 2018.

(51) Int. Cl.

| | | |
|---|---|---|
| F24F 3/16 | (2006.01) | |
| F24F 5/00 | (2006.01) | |
| F24F 6/12 | (2006.01) | |
| F24F 7/007 | (2006.01) | |
| F24F 11/30 | (2018.01) | |
| F24F 11/88 | (2018.01) | |
| F24F 7/08 | (2006.01) | |
| F24F 110/10 | (2018.01) | |
| F24F 7/04 | (2006.01) | |

(52) U.S. Cl.
CPC ............... *F24F 7/007* (2013.01); *F24F 7/08* (2013.01); *F24F 11/30* (2018.01); *F24F 11/88* (2018.01); *F24F 5/0021* (2013.01); *F24F 7/04* (2013.01); *F24F 2005/0067* (2013.01); *F24F 2110/10* (2018.01); *F24F 2221/02* (2013.01); *F24F 2221/38* (2013.01)

(56) References Cited

U.S. PATENT DOCUMENTS

| | | | | |
|---|---|---|---|---|
| 5,030,389 | A * | 7/1991 | Cecil | B01F 3/04085 |
| | | | | 261/29 |
| 5,062,281 | A | 11/1991 | Oliphant | |
| 5,857,350 | A | 1/1999 | Johnson et al. | |
| 5,953,933 | A | 9/1999 | Cheng | |
| 6,067,813 | A | 5/2000 | Smith | |
| 6,227,004 | B1 * | 5/2001 | Gerstein | A47G 19/2288 |
| | | | | 62/421 |
| 6,726,112 | B1 | 4/2004 | Ho | |
| 7,127,910 | B2 | 10/2006 | Urfig | |
| 7,311,526 | B2 | 12/2007 | Rohrbach | |
| 8,544,286 | B2 | 10/2013 | Janssen | |
| 2003/0230109 | A1 | 12/2003 | Link | |
| 2004/0107707 | A1 | 6/2004 | Richardson | |
| 2005/0150251 | A1 | 7/2005 | Navado et al. | |
| 2006/0123832 | A1 | 6/2006 | Urfig | |
| 2006/0254306 | A1 | 11/2006 | Urfig | |
| 2007/0044503 | A1 * | 3/2007 | McCarrell | F24F 5/0017 |
| | | | | 62/420 |
| 2007/0180840 | A1 | 8/2007 | Shostack | |
| 2008/0022712 | A1 * | 1/2008 | Carr | F24F 5/0017 |
| | | | | 62/425 |
| 2008/0170388 | A1 | 7/2008 | Greil | |
| 2009/0056716 | A1 | 3/2009 | Carrier | |
| 2009/0078120 | A1 | 3/2009 | Kummer et al. | |
| 2009/0143004 | A1 | 6/2009 | Tam et al. | |
| 2010/0050750 | A1 * | 3/2010 | Saaski | G01N 1/2205 |
| | | | | 73/61.75 |
| 2010/0175556 | A1 | 7/2010 | Kummer | |
| 2011/0030413 | A1 | 2/2011 | Heil | |
| 2011/0180069 | A1 * | 7/2011 | McCabe | F24F 5/0017 |
| | | | | 128/204.15 |
| 2012/0031984 | A1 | 2/2012 | Feldmeier | |
| 2012/0305414 | A1 | 12/2012 | Magnus | |
| 2012/0324920 | A1 | 12/2012 | Carrubba | |
| 2013/0168882 | A1 | 7/2013 | Lykins | |
| 2013/0206372 | A1 | 8/2013 | Yang | |
| 2014/0232022 | A1 * | 8/2014 | Chung | F24F 6/12 |
| | | | | 261/78.1 |
| 2014/0306636 | A1 | 10/2014 | Yu | |
| 2014/0361101 | A1 * | 12/2014 | Maher | F24F 6/14 |
| | | | | 239/302 |
| 2015/0267961 | A1 | 9/2015 | Christian | |
| 2015/0382096 | A1 | 12/2015 | Lamar | |
| 2016/0058134 | A1 | 3/2016 | Blunt | |
| 2016/0187046 | A1 | 6/2016 | Chen | |
| 2017/0087500 | A1 * | 3/2017 | Combs | B01D 46/429 |
| 2017/0223922 | A1 * | 8/2017 | Loopesko | A01K 1/0082 |
| 2018/0023579 | A1 | 1/2018 | Park | |
| 2018/0073769 | A1 | 3/2018 | Herweck et al. | |

OTHER PUBLICATIONS

New Comfort Blue Mini Desktop Water Based Air Purifer Humidifier Aroma Therapy and Air Cleaner, https://www.amazon.com/New-Comfort-Desktop-Purifier-Humidifier/dp/B077NQ2S7G, 8 pages, retrieved from the World Wide Web on Jun. 14, 2019.

WYND—The Smartest Air Purifier for your Personal Space, https://shop.hellowynd.com, 12 pages, retrieved from the World Wide Web on Jul. 23, 2019.

This personal air purifier and air quality tracker helps you breathe easier, <https://www.reviewed.com/smarthome/content/this-personal-air-purifier-and-air-quality-tracker-helps-you-breathe-easier>, 2 pages, retrieved from the World Wide Web on Jul. 23, 2019.

Breathe—World's smallest wearable air purifier, https://www.indieoogo.com/projects/breathe-world-s-smallest-wearable-air-purifier#/, 7 pages, retrieved from the World Wide Web on Jul. 23, 2019.

Baby Stroller Cooling System Upgrade Kit: Baby, https://www.amazon.com/Baby-Stroller-Cooling-System-Upgrade/dp/B0041BCF91#immersive-view_1469102723193, 5 pages, retrieved from the World Wide Web on Jan. 19, 2018.

Thermos 24 Ounce Hydration Bottle with Connected Smart Lid, https://www.amazon.com/Thermos-Ounce-Hydration-Bottle-Connected/dp/Boozqunhoo/ref-as_li_ss_tl?th=1&linkCode=s11&tag-usatsyndication-20&linkld=11127351715fbef51c07215767e40624, 8 pages, retrieved from the World Wide Web on Jan. 19, 2018.

Personal Cooling Fan, http://www.myhandycooler.com/products_babystroller.html, 1 page, retrieved from the World Wide Web on Jan. 19, 2018.

My Chill Personal Space Coolers, http://www.homedics.com/mychill.html, 5 pages, retrieved from the World Wide Web on Jan. 19, 2018.

LED Bluetooth Speaker Fan, http://www.kolmon.net/led-bluetooth-speaker-fan-p00152p1.html, 4 pages, retrieved from the World Wide Web on Jan. 19, 2018.

Buy No Leaf Air Condition Bladeless Fan & Room Freshener, http://www.kharidlay.com/Unique-Prod/No-leaf-Air-Condition-Bladeless-Fan---Room-Freshener-id-266080.html, 2 pages, retrieved from the World Wide Web on Jan. 19, 2018.

Portable Mini USB Foldable Hand-held Fan Coller Rechargeable Air Conditioner, https://www.ebay.com/itm/Portable-Mini-USB-Foldable-Hand-held-Fan-Cooler-Rechargeable-Air-Conditioner-/382077768934?_trksid=p2141725.m3641.l6368, 3 pages, retrieved from the World Wide Web on Jan. 19, 2018.

Portable 2 in 1 USB Mini Humidifier Air Cooling Mister Fan, https://tyloc.en.alibaba.com/product/60422106008-803134035/Portable_2_in_1_USB_Mini_Humidifier_Air_Cooling_Mister_Fan.html?spm=a2700.83 04367.prewdfa4cf.23.38557dbawz9Rs9, 12 pages, retrieved from the World Wide Web on Jan. 19, 2018.

Unifire® Mini Portable USB Rechargeable Hand Held Air Conditioner Summer Coller Fan, https://www.amazon.com/dp/B00W9AYL90//ref=cm_sw_su_dp?tag=duiwath-20, 6 pages, retrieved from the World Wide Web on Jan. 19, 2018.

Cool on the Go? Clip Fan—Next Generation, https://www.amazon.com/dp/B007OWTTAO//ref=cm_sw_su_dp?tag=relprods-20, 8 pages, retrieved from the World Wide Web on Jan. 19, 2018.

The Original Handy Cooler Small Fan & Mini-Air Conditioner, https://www.amazon.com/Original-Handy-Cooler-Mini-Air-Conditioner/dp/B003KCT4UC, 8 pages, retrieved from the World Wide Web on Jan. 19, 2018.

The Zero Breeze Portable Air Conditioner, https://www.ireviews.com/review/zero-breeze, 8 pages, retrieved from the World Wide Web on Jan. 19, 2018.

World's First Personal Air Conditioner, https://www.indiegogo.com/projects/world-s-first-personal-air-conditioner#/, 8 pages, retrieved from the World Wide Web on Jan. 19, 2018.

International Search Report from PCT/US2017/050730, dated Dec. 20, 2017.

Non Final Office Action 15/699,772, dated May 30, 2019.

(56) References Cited

OTHER PUBLICATIONS

International Search Report issued in International Application No. PCT/US2019/040481, dated Sep. 13, 2009.
Online Publication cited by Wayback Maching Jul. 8, 2016 entitled "WYND" (Year: 2019).
Final Office Action 15/699,772, dated Jan. 13, 2020.
International Search Report from PCT/US2019/063718, dated Feb. 4, 2020.

* cited by examiner

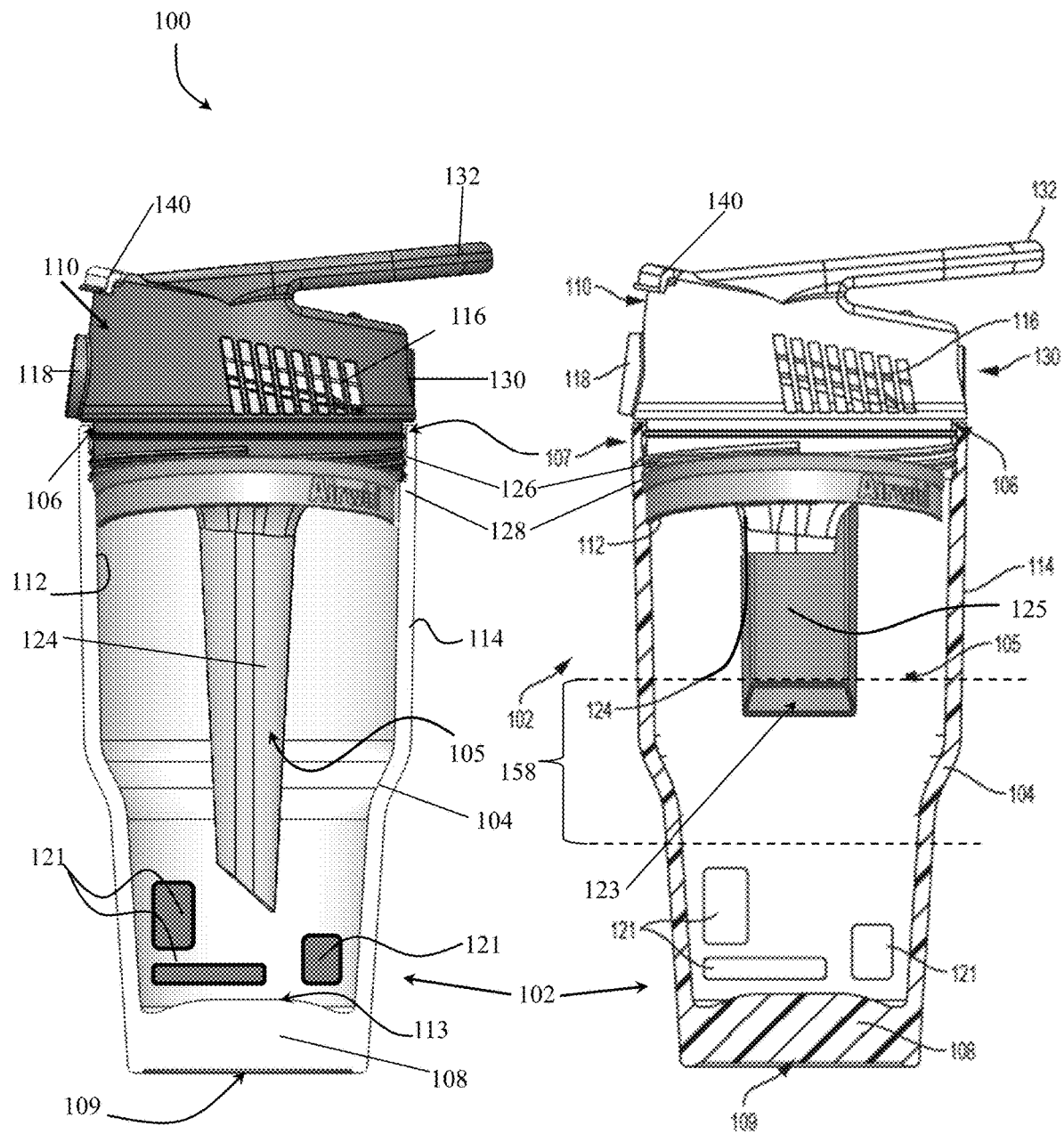
*Fig. 2A*　　　*Fig. 2B*

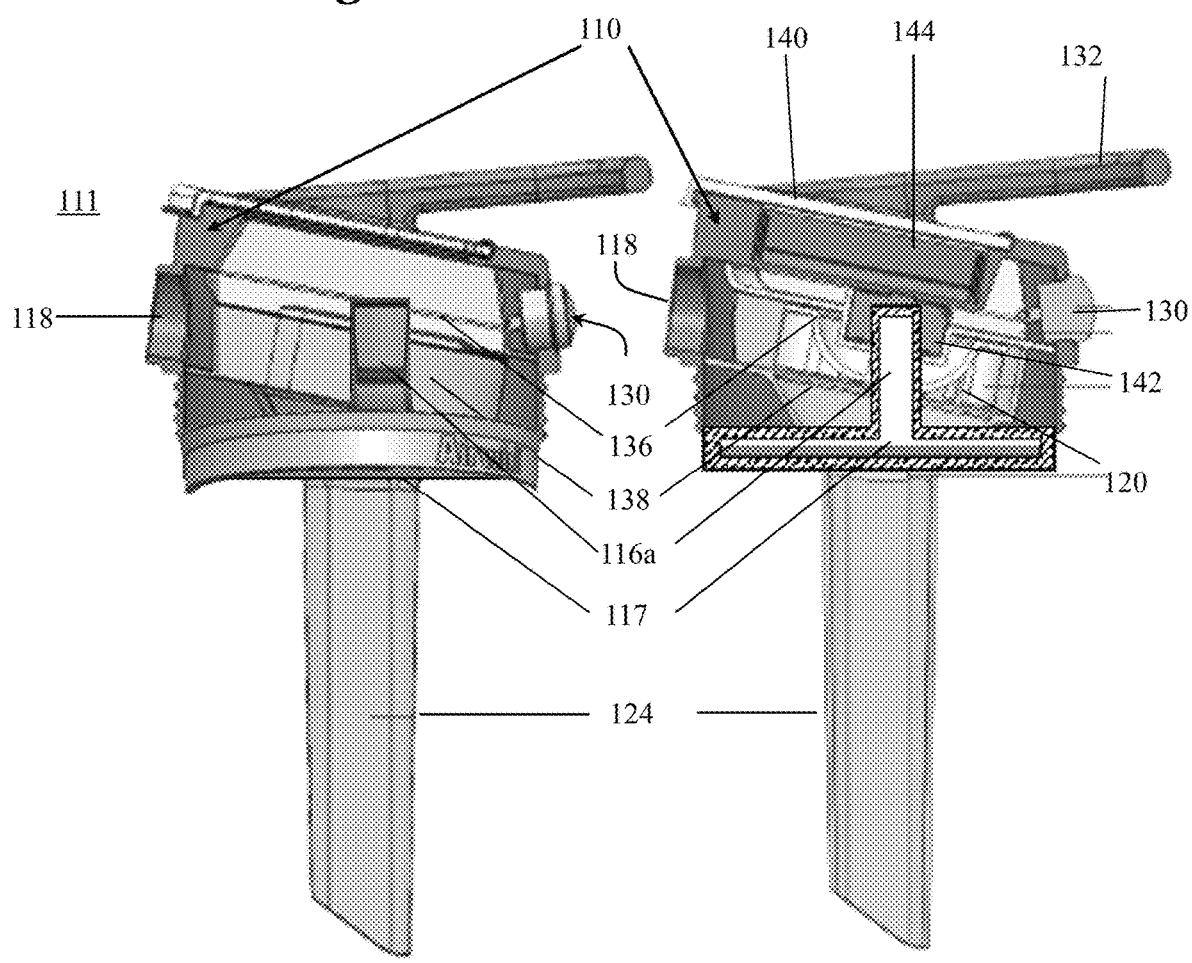

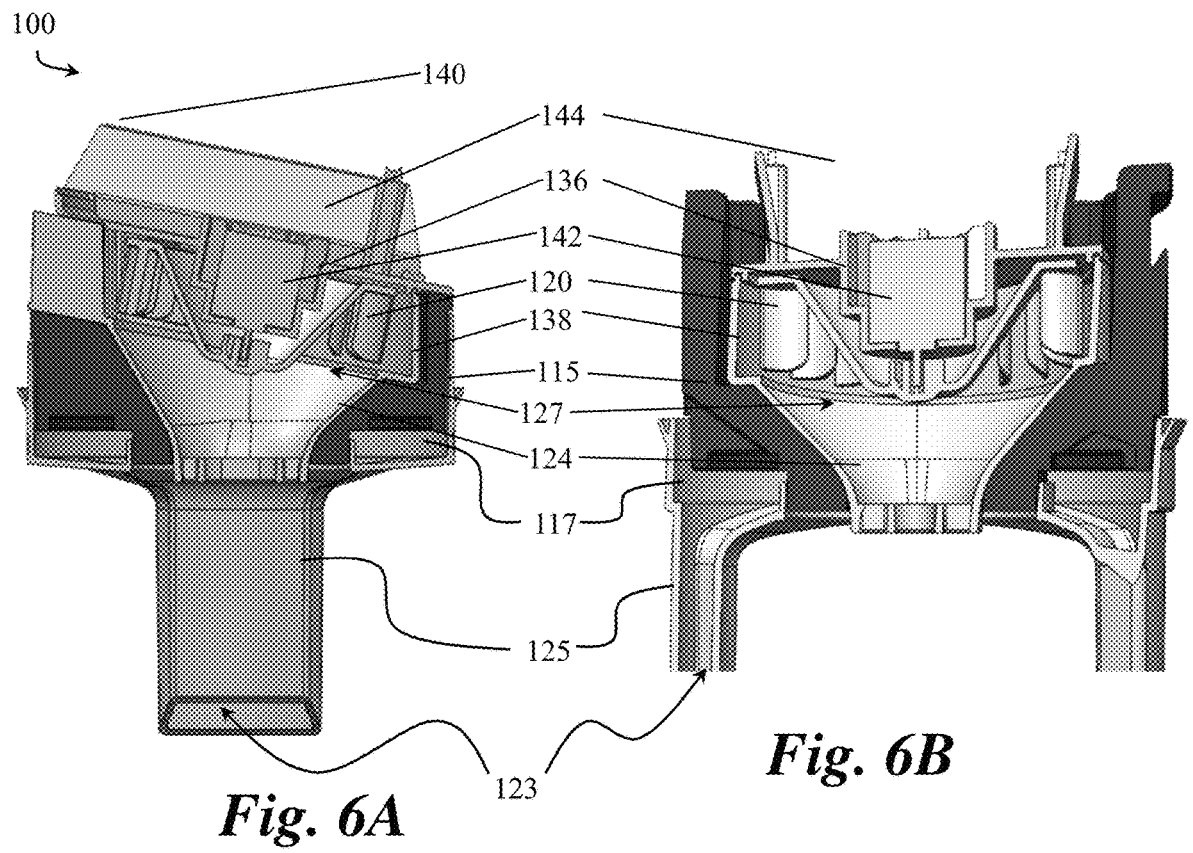
*Fig. 6A*
*Fig. 6B*
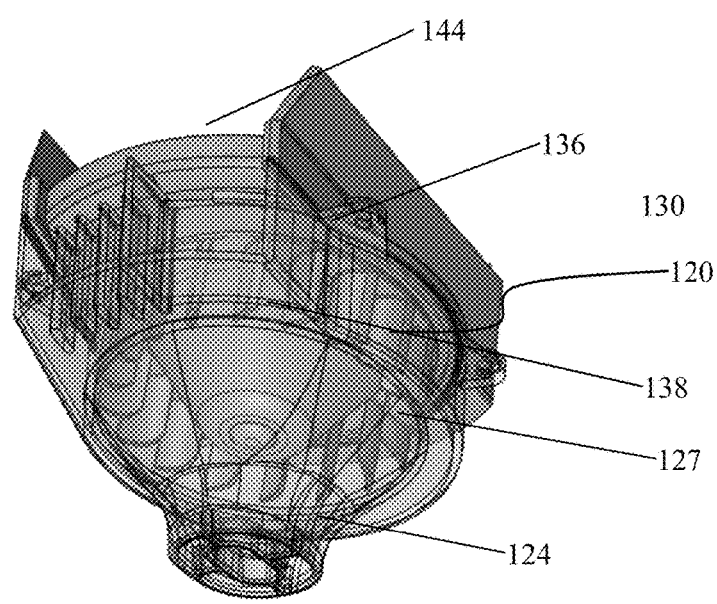
*Fig. 6C*

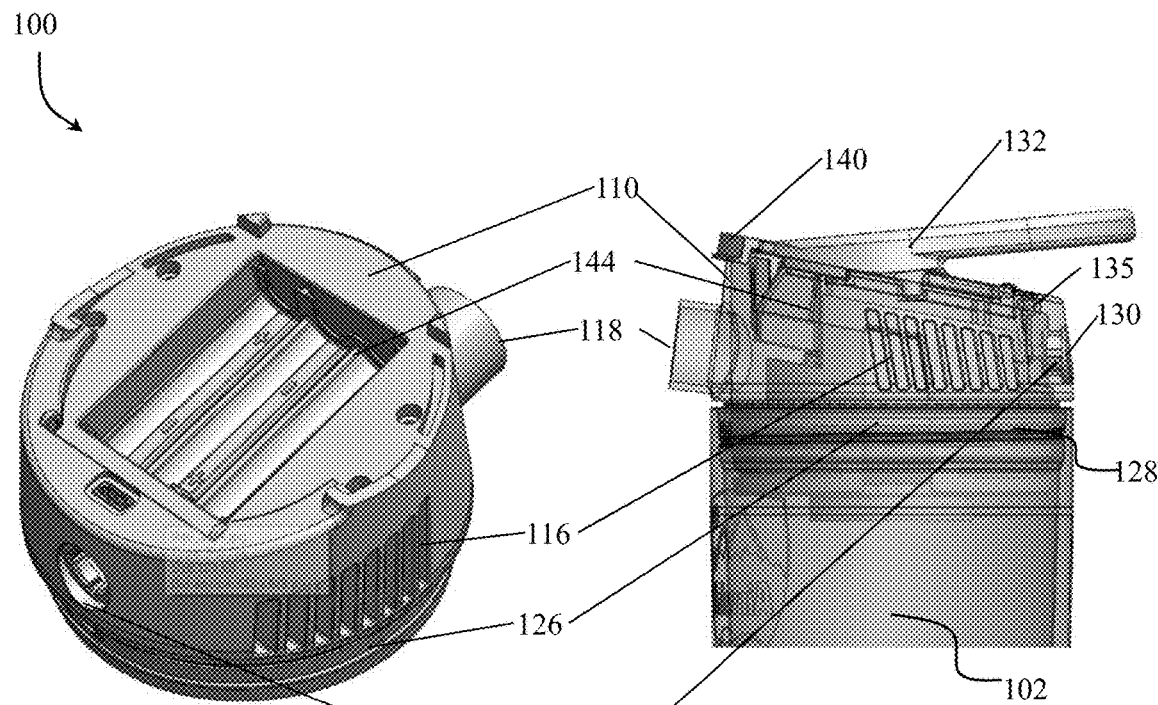
*Fig. 9A*
*Fig. 9B*
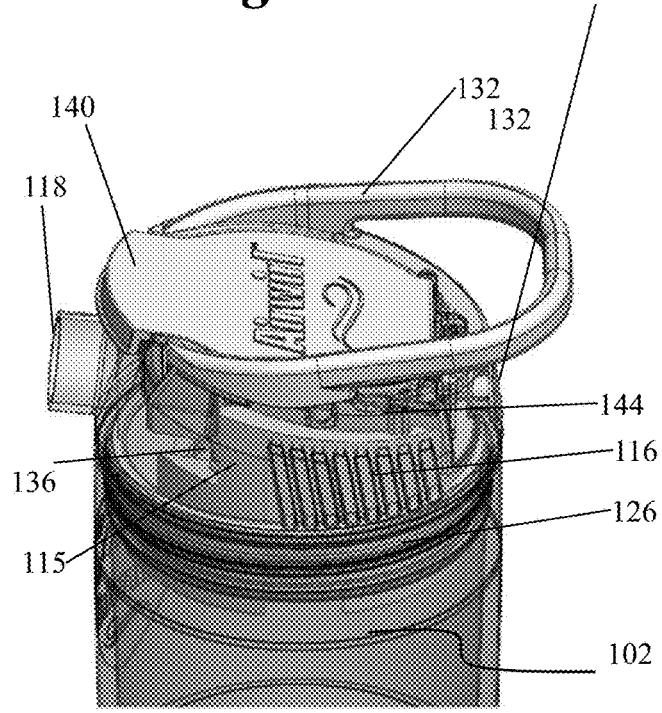
*Fig. 9C*

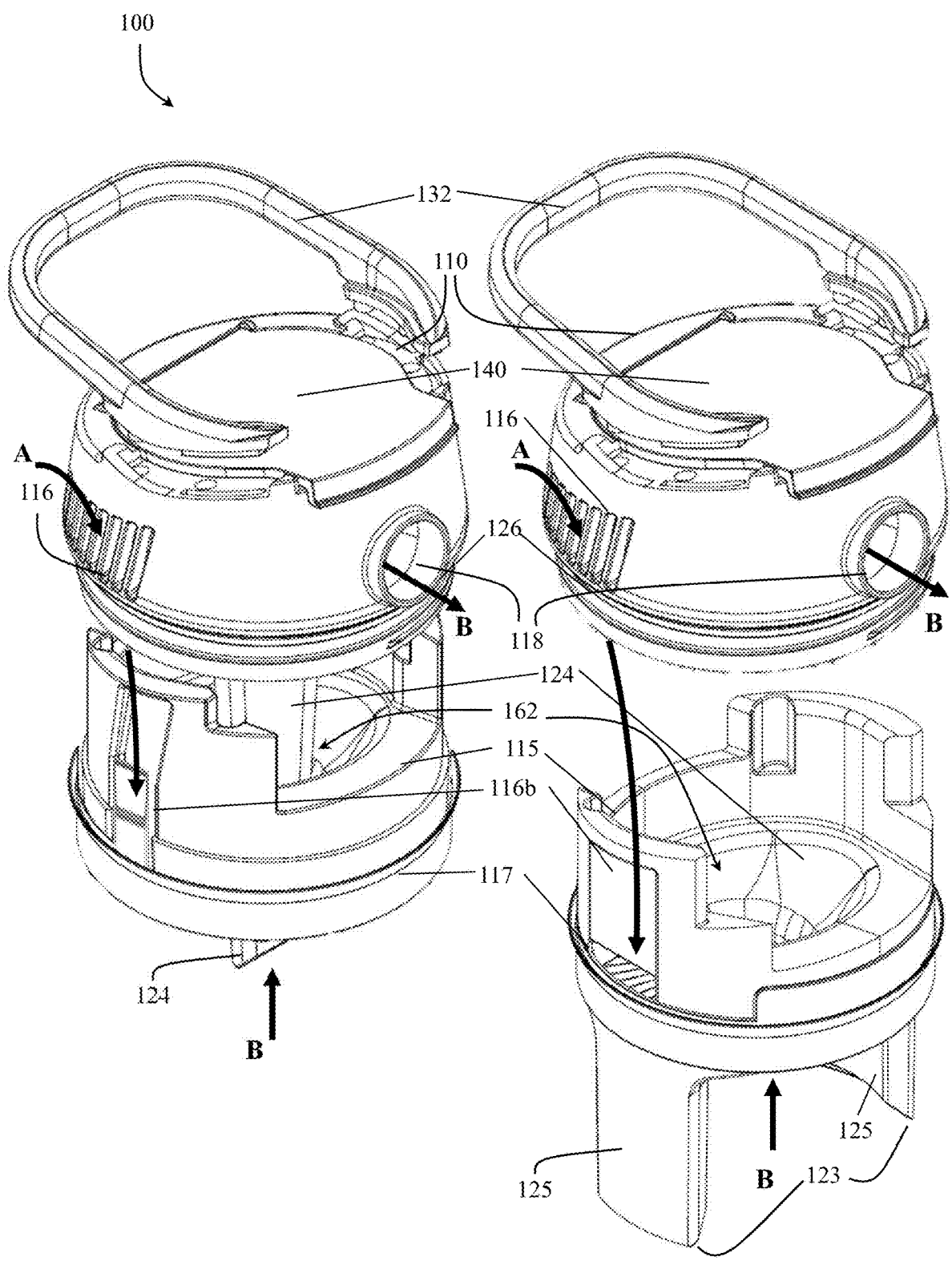
*Fig. 10A*    *Fig. 10B*

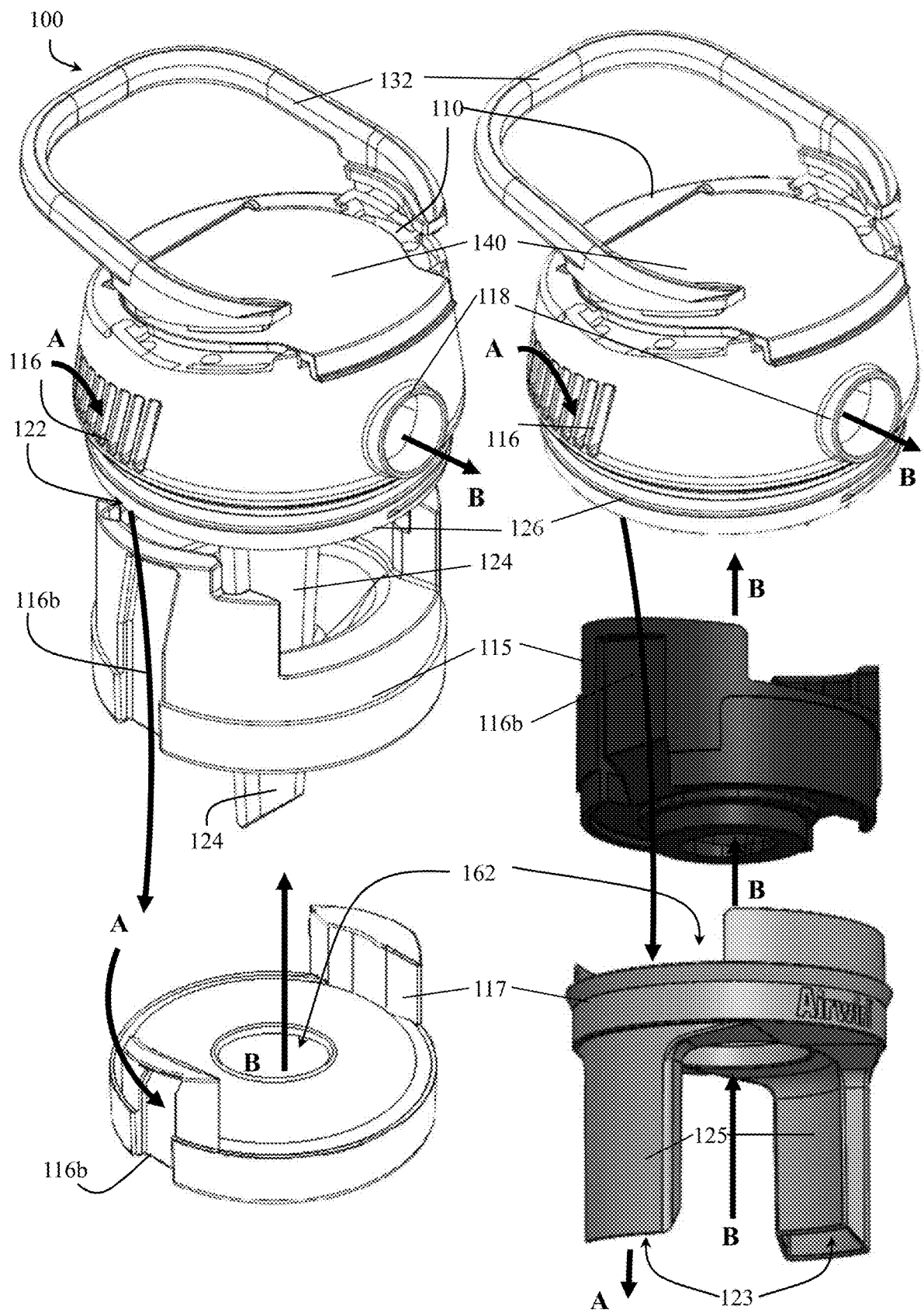
*Fig. 11A*      *Fig. 11B*

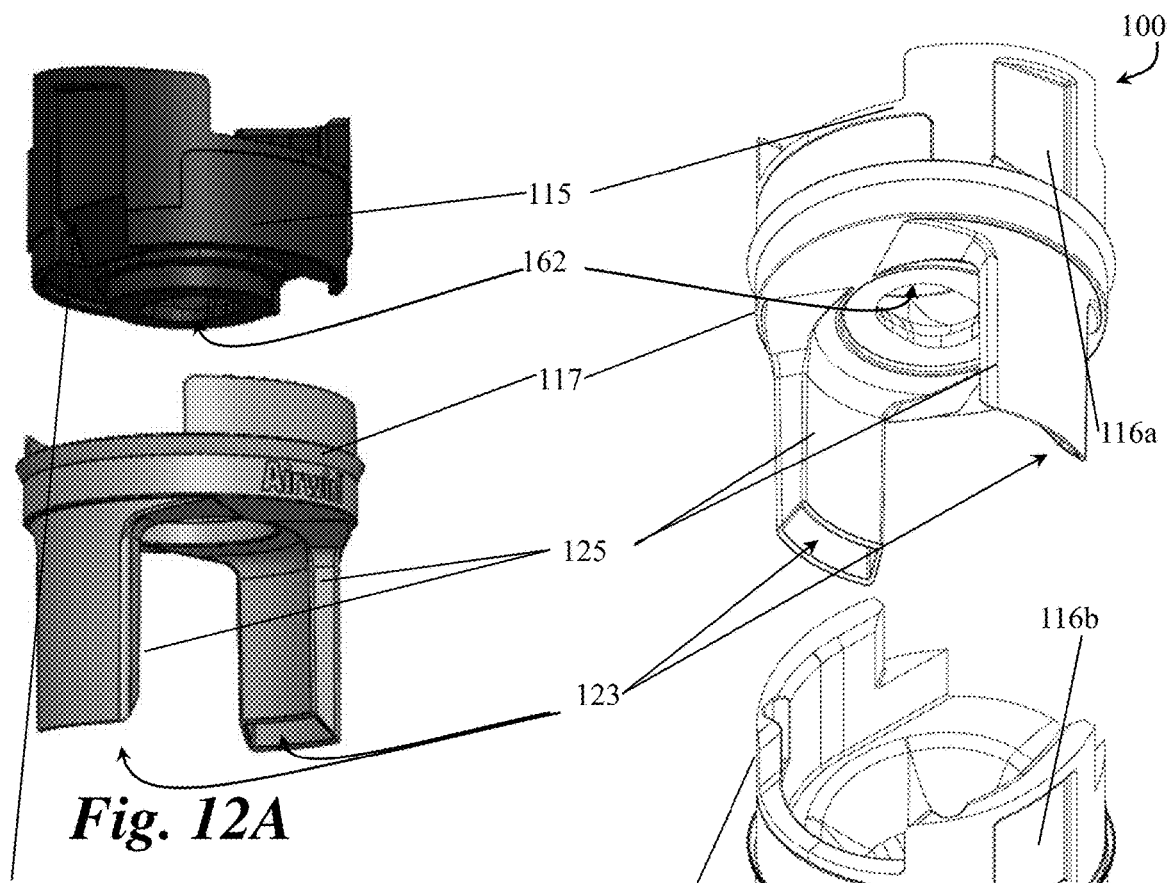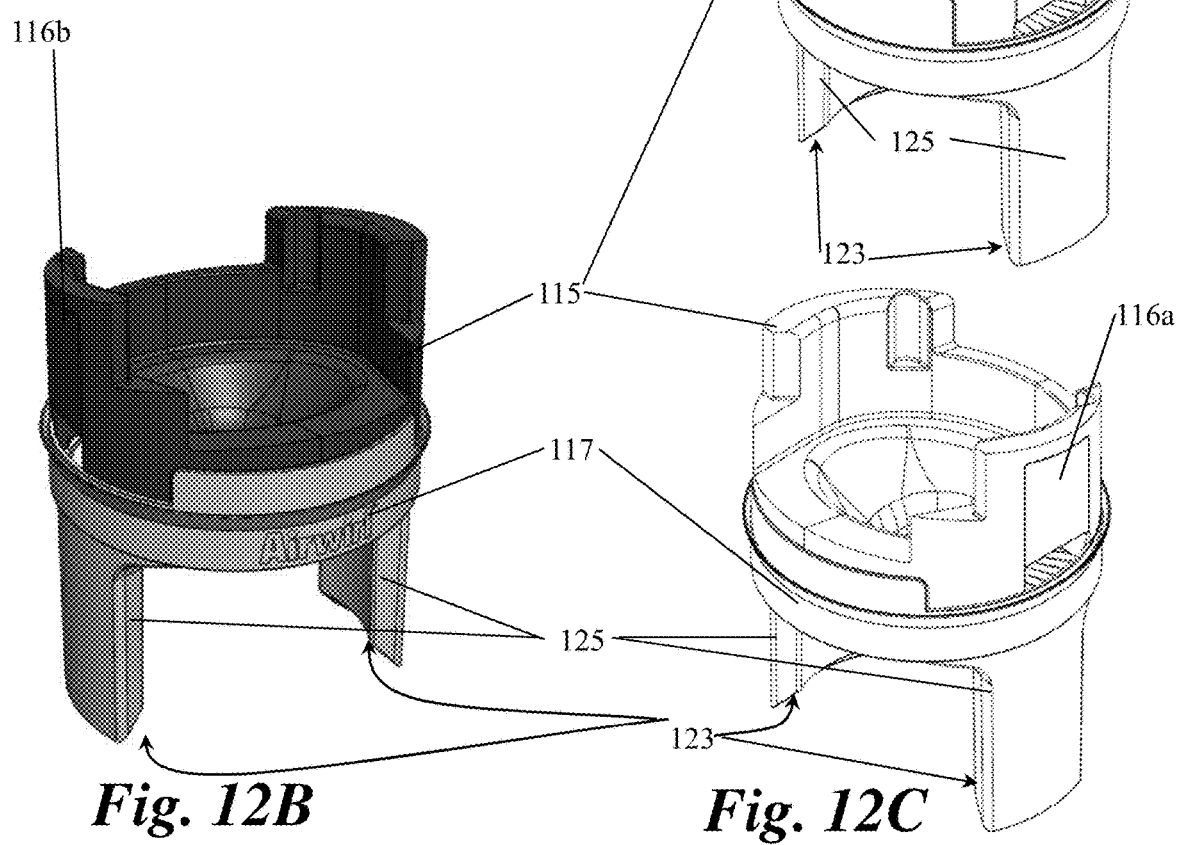
Fig. 12A
Fig. 12B
Fig. 12C

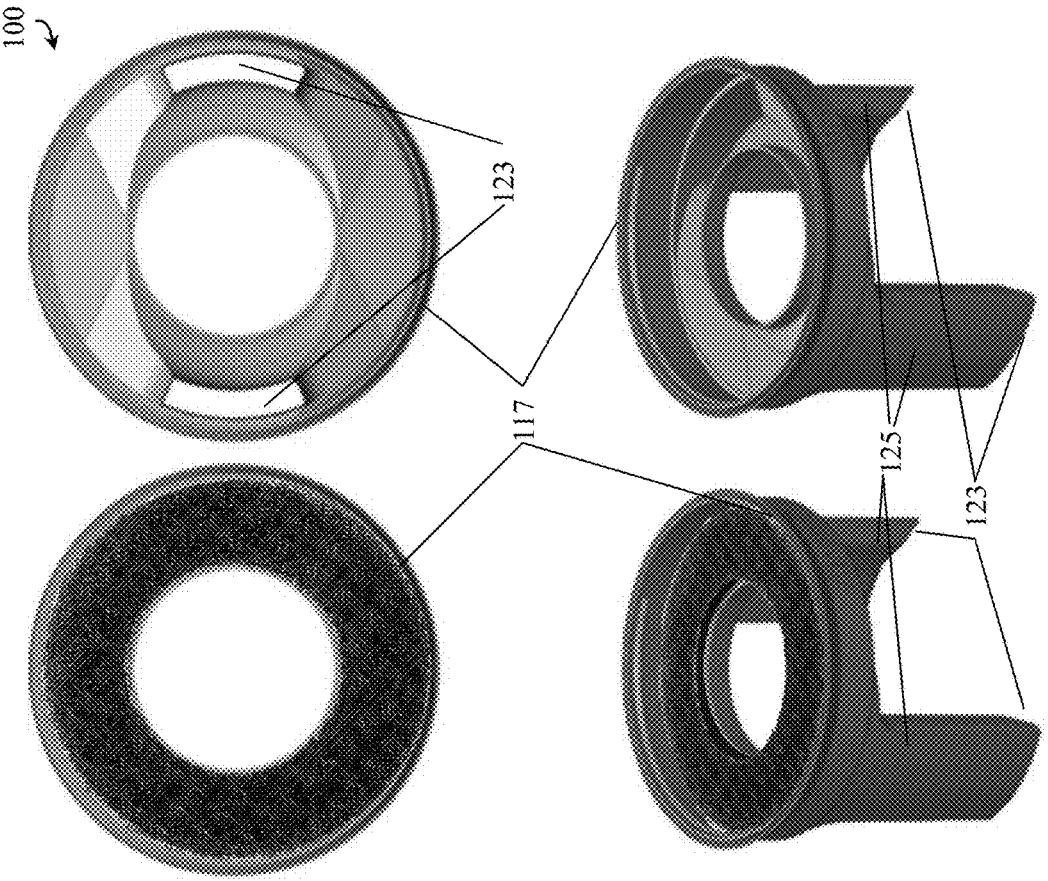
*Fig. 14A* *Fig. 14C* *Fig. 14E* *Fig. 14G*
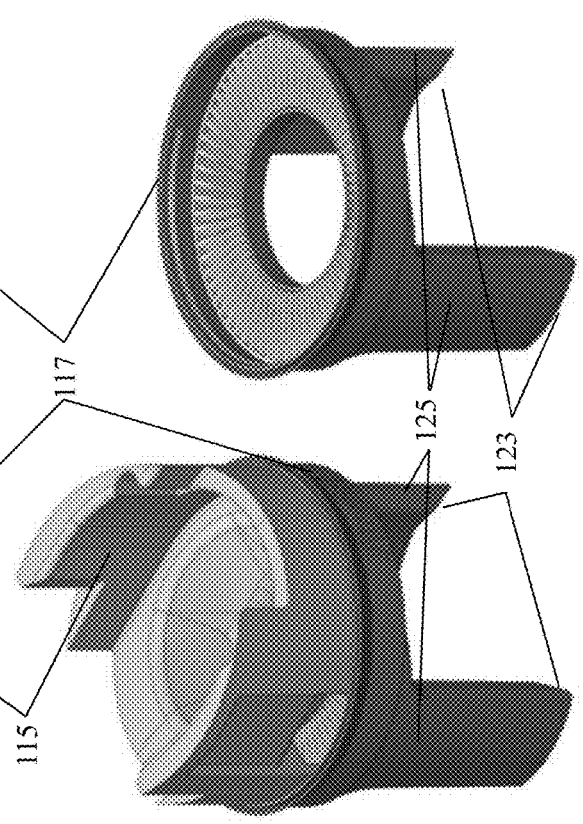
*Fig. 14B* *Fig. 14D* *Fig. 14F* *Fig. 14H*

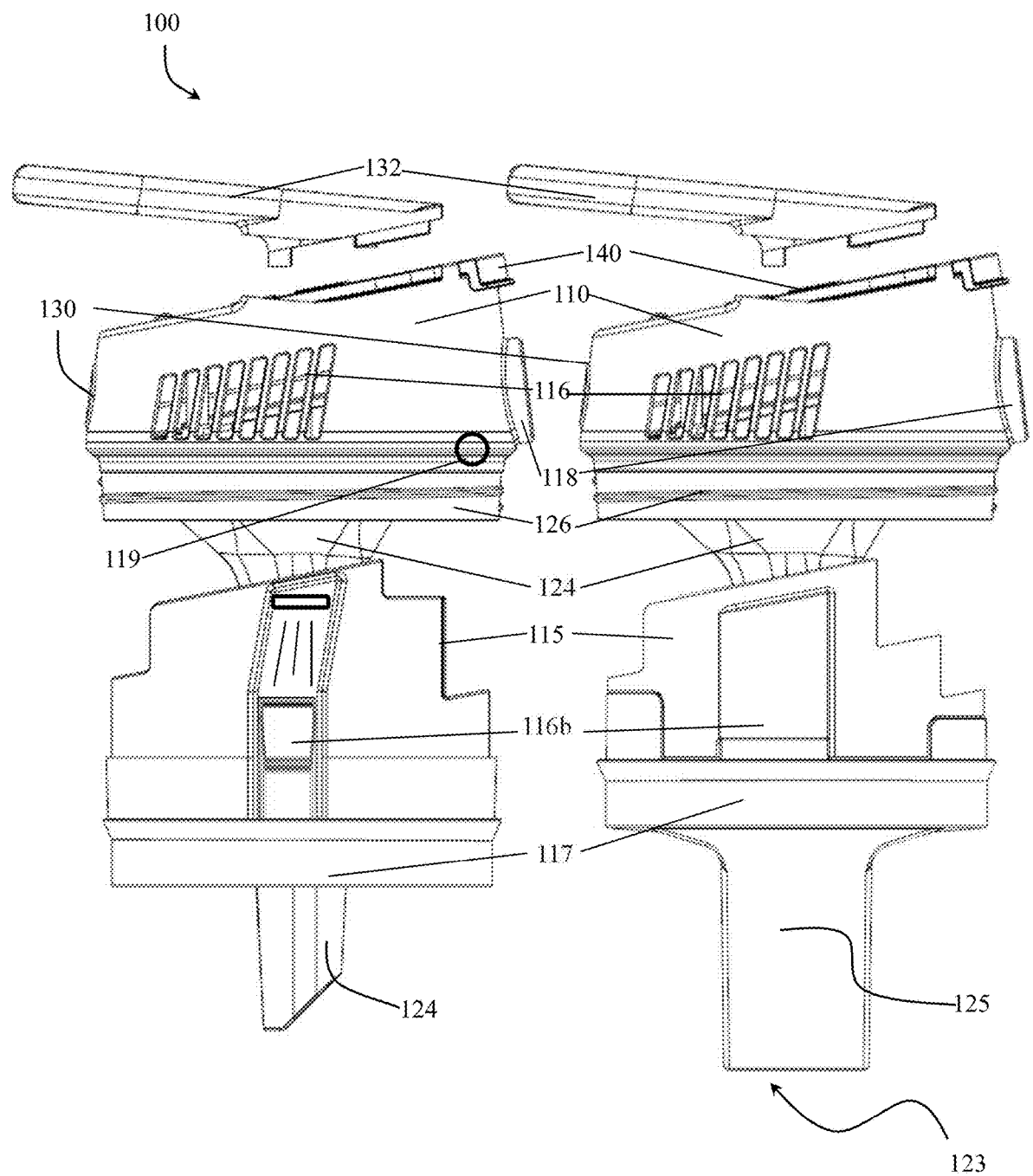
*Fig. 15A*  *Fig. 15B*

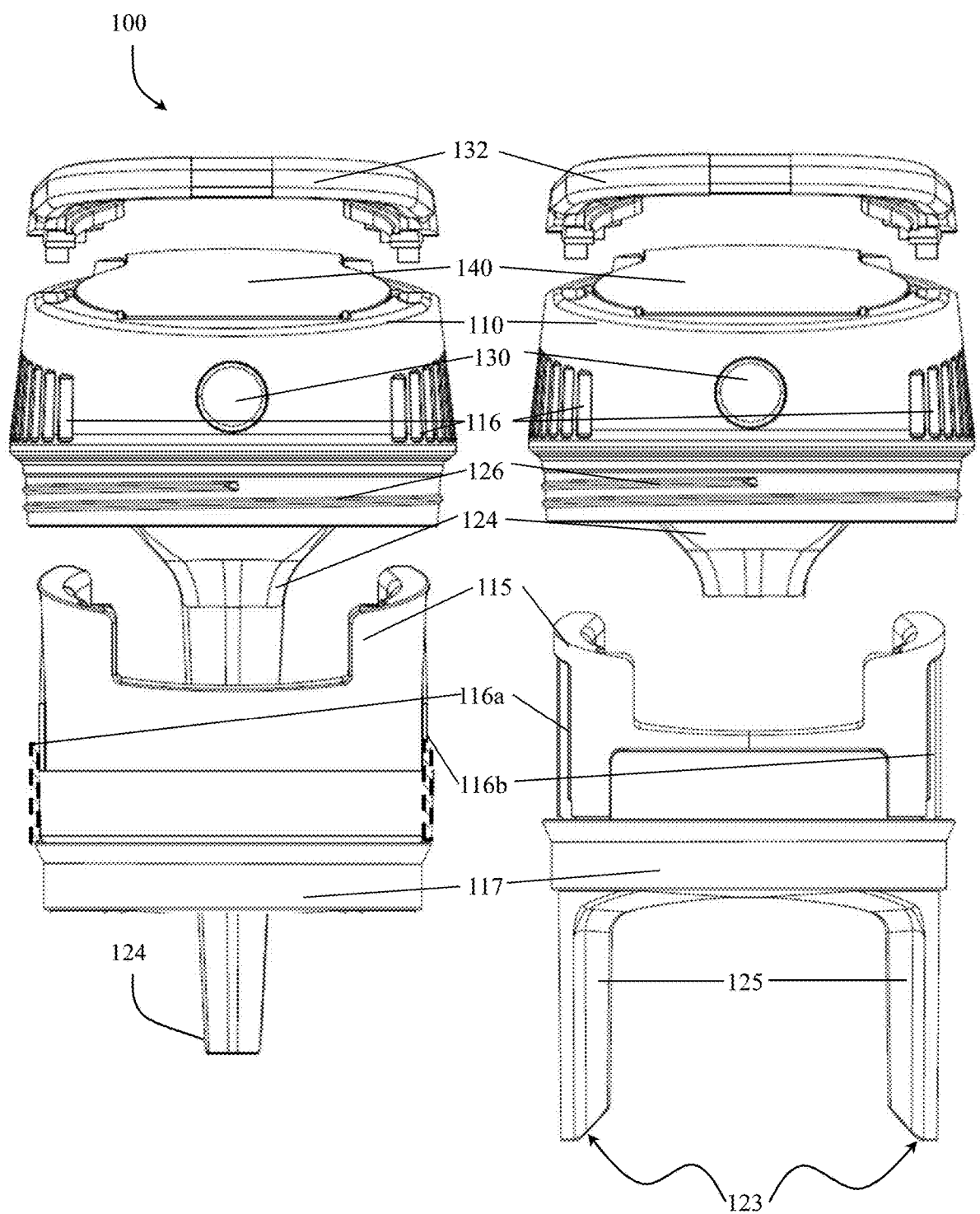
*Fig. 16A*  *Fig. 16B*

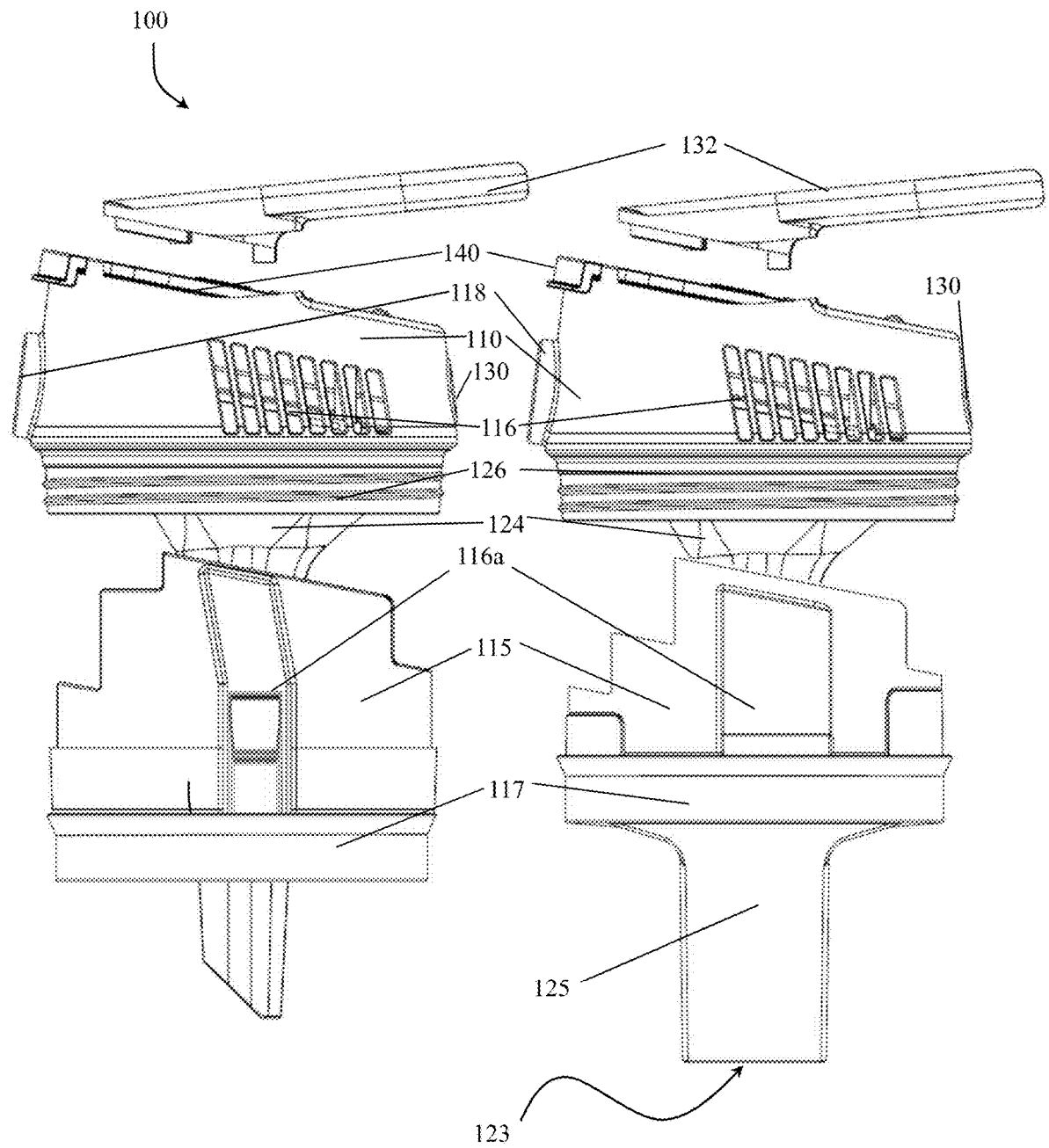
*Fig. 17A*  *Fig. 17B*

US 10,739,035 B2

PERSONAL AMBIENT AIR TEMPERATURE MODIFICATION, FILTRATION, AND PURIFICATION SYSTEM

CROSS-REFERENCE TO RELATED APPLICATION(S)

This application claims priority to, and the benefit of, U.S. Provisional Application No. 62/694,785, filed Jul. 6, 2018, U.S. Provisional Application No. 62/768,409, filed Nov. 16, 2018, U.S. Provisional Application No. 62/775,320, filed Dec. 4, 2018, for all subject matter common to both applications. The disclosure of said provisional applications are hereby incorporated by reference in their entirety.

FIELD OF THE INVENTION

The present invention relates to a personal ambient air temperature modification, filtration, and vapor purification system that is, in part, configured to be removably attached as an insert into a lid for a container.

BACKGROUND

Generally, personal cooling or heating devices come in a variety of shapes, sizes and functionalities designed with the intended purpose to cool or heat the associated user. Users frequently utilize such devices while traveling, attending events during long periods outside, and all day functions, etc. For example, depending on the time of year, users attending work, amusement parks, hiking, sporting events, concerts, etc. may desire to take advantage of the benefits of portable cooling or heating devices. Examples of conventional personal cooling devices include portable fans, spray bottles, cooling towels, etc. Examples of conventional personal heating devices and heating methods include chemically activated hand warmers, rechargeable battery operated hand warmers, battery operated thermal heaters found in fabric, gloves, boots and jackets that provide short term heat in close contact, various hats, gloves, scarves, etc. Any of the example devices or methods can also be combined to provide additional heating or cooling for the user.

However, these devices and methodologies experience some shortcomings. For example, most devices are intended for heating or for cooling, and cannot be converted to be used for both applications. Conventional personal heating or cooling devices also generally lack effective means for filtering or purifying air that is available for large, non-portable heating and cooling devices of the type that are installed in buildings. Additionally, several of the battery operated personal fans that are available can be carried and/or clipped onto an apparatus (e.g., a stroller element) by a user in close proximity to the user; however, such fan designs merely blow ambient temperature air from the surrounding area and do not actually provide heated or cooled air to the user. Similarly, some personal fan devices that can also be combined with a sprayer, sponge, or towel to be wet with water prior to use (or used individually without a fan) to provide evaporative air effects of airflow out from the fan. However, such devices do not adequately modify ambient temperature air as they are only simple fans and/or evaporative cooling effects, and they are incapable of heating air, cooling air, and filtering or purifying air with a single handheld device. Additionally, conventional insulated parts for containers form a barrier around the object entirely, such that they are not designed to enable airflow to pass through the insulating body to an interior of the insulated object and insulated parts for containers are not intended to be removable. Conventional filter designs also do not allow for removable filter assemblies that retain insulator functionality and conventional filter designs cannot use filters in close proximity to fluid vapor without having the fluid vapor compromise the efficacy of the filter. Moreover even smaller scale filtration units often do not provide users with perceptible reduction of airborne particles such as pollen, dust, and/or smoke particles because diffusion with unfiltered air reduces the concentration of filtered air delivered to the user. There are numerous other shortcomings associated with such conventional products as is well understood by those of skill in the art and by consumers of such products generally.

SUMMARY

There is a need for a portable system that provides heating and/or cooling as well as air filtration to a user with air purified, then heated or cooled from surrounding ambient temperature to a modified temperature, in a device that is compact, portable, able to be comfortably handheld, and configured to fit within a conventional cup holder, that address the above shortcomings. The present invention is directed toward further solutions to address these needs, in addition to having other desirable characteristics. Specifically, the present invention is directed to a personal ambient air temperature modification, filtration, and purification system that operates in combination with an insulated container, or the like, to provide improved filtration, heating and cooling to a user for an extending period of time. The system of the present invention includes a motorized lid for the container that provides an air flow, e.g., using a motorized air movement mechanism such as a fan or other powered air movement mechanism, of filtered, cool or hot air purified by vapor capture, created from the ambient temperature passing through an interior volume the container, the interior volume containing a cooling or heating combination fluid vapor source and thermal energy storage component, insulating components and an elongate air manifold.

In accordance with example embodiments of the present invention, a personal ambient air temperature modification, filtration, and purification system is provided. The system includes a container configured and adapted to be handheld. The container includes one or more thermally insulated walls defining an interior volume, each of the one or more thermally insulated walls having an interior side facing the interior volume and an exterior side opposite the interior side, and an air inlet providing opening disposed through a first end of the container, and a base disposed at a second end of the container opposite the first end, the base having an interior side facing the interior volume and an exterior side opposite the interior side. The container is sized, dimensioned, and adapted to fit in a cup holder. The system also includes a lid with an interior side facing the interior volume and an exterior side opposite the interior side, the lid removably and replaceably covering the opening in such a way that obstructs the opening when in a sealed position and exposes the opening when removed from the container. The lid includes an air inlet providing an opening into the container, a return port, an air channel fluidly coupling the air inlet and the interior volume of the container, and a motorized air movement mechanism disposed inside the lid that draws air through the air inlet and exhausts return air through the return port to an external environment external to the container and the lid. The system further includes at least one air channel fluidly coupling the air inlet and the interior volume of the container, the at least one air inlet positioned to draw supply air from an ambient environment external to the system to flow into the interior volume of the container. The system further includes at least one air filter disposed in the air channel to filter air as it passes through the air channel. The system also includes a thermal energy concentrator disposed in the interior volume of the container. The system also includes a motorized air movement mechanism fluidly coupling the thermal energy concentrator with an air return port, wherein operation of the motorized air movement mechanism draws air in through the air inlet, through the air channel, through the air filter, through the interior volume where the air flows across the at least one combination fluid vapor source and thermal energy storage component, through the thermal energy concentrator, in through the motorized air movement mechanism and out through the air return port, wherein the air passing through the air inlet is ambient air that transforms into filtered air by passing through the air filter; wherein the filtered air transforms into thermally modified, filtered, and vapor purified air by passing across the at least one combination fluid vapor source and thermal energy storage component and experiencing vapor particle entrapment; and wherein the thermally modified, filtered, and vapor purified air exits the system as exhaust air through the air return port.

In accordance with aspects of the present invention, the container can further comprise a base disposed at a second end of the container opposite the first end, the base having an interior side facing the interior volume and an exterior side opposite the interior side, and the one or more thermally insulated walls can have an interior side facing the interior volume and an exterior side opposite the interior side. The thermal energy concentrator can comprise an elongate air manifold having an air funnel opening at a first end and an intake opening at a second end in fluid communication with the interior volume. The container can further comprise a lid removably and replaceably coupled to and covering the container, obstructing the opening when in a sealed position and exposing the opening when removed from the container. The lid can include an interior side facing the interior volume and an exterior side opposite the interior side; and one or more air intake port disposed in the lid and positioned to draw supply air from an external environment to the air inlet to flow into the interior volume of the container, the air inlet providing an opening into the container in fluid communication with the interior volume of the container through the air channel positioned to draw ambient air from the external environment to flow into the interior volume of the container. The motorized air movement mechanism can be disposed inside the lid that draws air through the one or more air intake port, the air inlet, the internal volume of the container, and exhausts return air through the air return port disposed in the lid to an external environment external to the container and the lid. The container can further comprise at least one thermal diffusion blade disposed in the interior volume of the container, coupled to an air filter collar of the air filter and in fluid communication with the air filter. The at least one thermal diffusion blade can each comprise an elongate conduit blade having an air funnel opening at a first end and a supply opening at a second end, the air funnel opening and the air filter fluidly coupled with the one or more air intake port and the air channel, and the supply opening fluidly coupled with the interior volume of the container. When the lid is in the sealed position on the container, the motorized air movement mechanism is operating, and ambient air can be drawn through the one or more air intake port, into the at least one thermal diffusion blade, out through the supply openings and into the interior volume of the container and across at least one combination fluid vapor source and thermal energy storage component disposed in the interior volume of the container, the ambient air being treated by convection with the at least one thermal diffusion blade and the at least one combination fluid vapor source and thermal energy storage component before entering into the intake opening and through the elongate air manifold of the thermal energy concentrator.

In accordance with aspects of the present invention, the container can be manufactured of one or more of a plastic, composite, metal, rubber, elastomeric material, non-elastomeric material, or combinations thereof. The container can have a double wall configuration with one or more thermally insulating materials disposed between walls of the double wall configuration. The can be container is sized, dimensioned, and adapted to fit in a cup holder, and has a double wall configuration with an one or more thermally insulating materials or air gap disposed between walls of the double wall configuration, wherein the interior volume of the container is one of about 10 oz, about 15 oz, about 20 oz, about 24 oz, about 30 oz, about 36 oz, about 40 oz, about 45 oz, about 50 oz, about 55 oz, or about 60 oz. The container can have a lid removably and replaceably coupled to the container, and the lid can have an interior side facing the interior volume and an exterior side opposite the interior side where the air inlet can provide an opening into the container in fluid communication with the interior volume of the container through the air channel positioned to draw ambient air from an environment external to the personal ambient air temperature modification, filtration, and purification system to flow into the interior volume of the container, the motorized air movement mechanism, and the air return port disposed inside the lid. The return air can have a different temperature from the ambient air drawn through the at least one air intake port comprises a temperature difference of at least 1 degree Fahrenheit.

In accordance with aspects of the present invention, air the channel can include an insulating insert and an air filter collar, that are removably and replaceably inserted within and coupled to the lid proximate the interior side facing the interior volume to provide thermal or temperature, sound and vibration insulation or dampening, and are fluidly coupled to each other and other components of the air channel, wherein the air filter is removably and replaceably coupled to the air filter collar, which is removably, replaceably and fluidly coupled to the insulating insert.

In accordance with aspects of the present invention, the insulating insert can further comprise one or more air intake channels providing fluid communication between the one or more air intake port and the interior volume of the container when the lid is in the sealed position on the container. the air inlet can have two or more air intake ports and the air channel can be divided as a manifold through the insulating insert and the air filter collar can be configured to merge airflows of the air channel from the two or more air intake ports, changing a direction of the air as the air passes through a cross sectional area of a flat air filter layer of the air filter coupled to the air filter collar.

In accordance with aspects of the present invention, the insulating insert and the air filter collar can be coupled by clips to each other, to the lid and to the fan housing for the motorized air movement mechanism.

In accordance with aspects of the present invention, the insulating insert and the air filter collar can be comprised of a plastic, composite, metal, rubber, elastomeric material, non-elastomeric material, non-toxic insulating plastic foam insert, an insulating composite material, and combinations thereof. The container can be similarly manufactured of one or more of a plastic, composite, metal, rubber, elastomeric material, non-elastomeric material, or combinations thereof.

In accordance with aspects of the present invention, the insulating insert and the air filter collar can be configured to align upon insertion into and coupling with the lid, thereby forming a controlled airflow through the one or more air channels that maintain insulating properties in other areas of the insulating insert and the air filter collar to provide vibration-dampening, sound dampening, or temperature, sound and vibration insulation.

In accordance with aspects of the present invention, the system can further include a central aperture disposed completely through the insulating insert and the air filter to allow the thermally modified, filtered, and vapor purified air to bypass the insulating insert and the air filter while maintaining fluid separation during transport to the air return port and delivery to an environment external to the system.

In accordance with aspects of the present invention, the system can further include a washable and reusable insulating insert and air filter disposed in the air channel.

In accordance with aspects of the present invention, the system can further include an air filter disposed in the air channel that includes a high efficiency particulate air (HEPA) air filter layer.

In accordance with aspects of the present invention, the system can further include an air filter with an air filter layer comprised of carbon components disposed in the air channel.

In accordance with aspects of the present invention, the system can include one or more antimicrobial filter material components, such as but not limited to silver.

In accordance with aspects of the present invention, the system can include an antimicrobial agent disposed in the filter and/or the system. The antimicrobial agent disposed in the filter and/or the system can comprise an antimicrobial spray mist injected into each intake port during system use that destroys germs on contact and treats air with a fragrance to provide clean, fresh, sanitized air out of the return port of the system. The antimicrobial agent can comprise an aqueous solution comprising a broad spectrum antimicrobial compound operating by antiseptic contact to airborne particles entering the air filter and the system treated with the antimicrobial spray mist to destroy common disease causing germs, which benefits from the repeated use of the antimicrobial mist spray injected directly into the air intake ports. The antimicrobial agent can comprise a category 1 active ingredient safe for use on humans, and wherein the antimicrobial agent further comprises one or more of ethyl alcohol denat, aloe vera, glycererth-26 glyceryl ester, radish root ferment filtrate, mint extract or oil, lavender oil, lemon oil, lime oil, orange oil, multitudinous oil, humectant or lubricant.

In accordance with aspects of the present invention, the system can further include a disposable air filter or air filter layer.

In accordance with aspects of the present invention, the air filter disposed in the air channel can include two or more air filter layers wherein each of the two or more air filter layers is selected from the group consisting of a fiberglass air filter layer, a polyester air filter layer, a carbon air filter layer, a polypropylene fabric air filter layer, a HEPA air filter layer, and an air ionizing and purifying technology air filter layer.

In accordance with aspects of the present invention, the air filter disposed in the air channel can include 3 or 4 air filter layers with electrostatic properties, wherein electrostatic fiber construction traps airborne particles. The air filter can also further comprise 4 air filter layers of woven fibers of polypropylene fabric die cut or laser cut into a circular disc shape, wherein each filter layer is stacked and oriented at 30 to 90 degrees to an adjacent fabric layer to create a tortuous airflow pathway, trapping airborne particles while maintaining airflow. The woven fibers of polypropylene fabric can be individually mold and mildew resistant, free of chemical smell, and preserve temperature modification when used inside the air filter and the container.

In accordance with aspects of the present invention, the air filter disposed in the air channel can include one thermal diffusion blades wherein the each of the at least one thermal diffusion blade can have a central channel fluidly coupling the intake opening and the air funnel at the first end with the supply opening and the interior volume of the container at the second end. Each of the at least one thermal diffusion blade can have a plurality of channels fluidly coupling the intake opening and the air funnel at the first end with the supply opening and the interior volume of the container at the second end. Each of the at least one thermal diffusion blade can have a plurality thermally conductive surface features comprising one or more of fins, contours, finger projections, or combinations thereof, which increase a thermally conductive surface area of the air manifold relative to a smooth and linear surface. Each of the at least one thermal diffusion blade can have a tapered configuration with a narrower end of the tapered configuration being proximate the supply opening at the second end in such a way that the tapered configuration is an ice deflector when the container is filled with ice cubes, crushed ice, and or shaved ice, such that each of the at least one thermal diffusion blade pushes aside the ice as the lid is coupled with the container. Each of the at least one thermal diffusion blade can further comprise attachment means selected from the group consisting of posts, slots, ribs, or cups disposed along an outer surface of each of the at least one thermal diffusion blade for engaging with the one or more thermal energy storage components disposed inside the container. The at least one thermal diffusion blade can be comprised of a porous material or has a plurality of perforations throughout a length of the at least one thermal diffusion blade or a plurality of side wall openings. Each of the at least one thermal diffusion blade comprises one or more thermal energy generating device attachment means for placement within and removal from the container, or wherein each of the at least one thermal diffusion blade is removably and replaceably coupled with the lid or an insert disposed in the lid via a friction or interference fit, a latch mechanism, or a threaded coupling. Each of the at least one thermal diffusion blade is permanently coupled with the lid or an insert disposed in the lid.

In accordance with aspects of the present invention, each of the at least one thermal diffusion blade can be adapted to receive thermal energy from one or more thermal energy storage components disposed in the interior volume of the container, wherein the at least one combination fluid vapor source and thermal energy storage component comprises a thermal energy source comprising one or more of ice, ice packs, cold water, iron oxide pouches for generating heat, warm or cold gel packs, and battery generator heat packs, or combinations thereof. Each of the at least one thermal diffusion blade is adapted to receive thermal energy from one or more thermal energy storage components that are folded. Further, a length to width ratio of a length of each of the at least one thermal diffusion blade can be greater than 10% of a diameter of the motorized air movement mechanism.

In accordance with aspects of the present invention, the thermal energy concentrator, the combination fluid vapor source and thermal energy storage component, and the interior of the container can be configured to pass air across fluid vapor from the at least one combination fluid vapor source and thermal energy storage component as the air is drawn into the thermal energy concentrator by force generated by the motorized air movement mechanism thereby capturing particles in the air in fluid vapor. The configuration of the thermal energy concentrator, the at least one combination fluid vapor source and thermal energy storage component, and the interior volume of the container in relation to operation of the motorized air movement mechanism can cause the air to move in a direction that maintains separation between fluid vapor and the air filter.

In accordance with aspects of the present invention, the thermal energy concentrator can be made of a porous material and/or include a plurality of perforations throughout its length to aid in thermal energy concentration.

In accordance with aspects of the present invention, the system can further comprise a vibration absorption perimeter seal disposed along a lid perimeter and comprising an rubber ribbed gasket or elastomer gasket seal configured to form an airtight seal when inserted into the container and configured to engage with the container opening when the lid is in a sealed position on the container, providing vibration dampening, noise reduction, and thermal preservation between the container opening and the lid. The system can further comprise a mechanical coupling between the lid and the container consisting of one of a friction or interference fit, a latch mechanism, or a threaded coupling. The system can further comprise a non-slip vibration absorption or vibration dampening base disposed on a bottom surface of the personal ambient air temperature modification device upon which the device rests when placed on a surface.

In accordance with aspects of the present invention, the motorized air movement mechanism can be a variable speed fan with a compact turbine blade design and configuration of fan blades that enables thermal energy convection in compact motorized fan housing promoting vacuum generation and air return port thrust. The motorized air movement mechanism can comprise a centrifugal fan having curved fan blades, flat fan blades, or combinations thereof. The motorized air movement mechanism can include a fan housing with an aperture in fluid communication with the air funnel opening of the elongate manifold of the thermal energy concentrator and a fan movably coupled to a motor that is electronically coupled to a power supply and contained within a motor housing coupled to the fan housing and the lid. The fan housing, the motor housing and the lid can create a network of weather resistant closed compartments that prevent ambient temperature fluid condensation and modified temperature fluid condensation from infiltrating by using seals and insulating materials. The weather resistant closed compartments can contain and protect one or more electrically connected switches, one or more printed circuit boards (PCBs) comprising light emitting diodes (LEDs), electrical connections, and batteries. The lid can include a handle, a battery storage compartment, a hinged, weather resistant, or waterproof, battery door cover with a snap latch that locks over into a locked, sealed and closed position on the lid, wherein the personal ambient air temperature modification device is powered with rechargeable batteries, chargeable wirelessly or with a wired connection to a charger, a weather resistant on/off switch with LED indicator for controlling the operation of the motorized air movement mechanism or a variable speed control graphically indicating power levels that functions as an on/off switch electronically and controls supply of electrical power to the motor from the batteries in the battery storage compartment electronically connected to the variable speed control, a charging port, a light emitting diode (LED) on a top surface of the lid to indicate power status to a user or an LED power indicator that is illuminated when the device is on and not illuminated when the device is off, and an optional vibration absorption perimeter seal disposed along a lid perimeter and comprising an rubber ribbed gasket or elastomer o-ring configured to form an airtight seal when inserted into the container. The carry handle extending from the lid can be configured to enable horizontal placement of the personal ambient air temperature modification device onto a flat surface without rolling, and wherein the carry handle can be configured to block accidental on/off switch activation and block accidental power cord dislodgment when connected to an external power source.

In accordance with aspects of the present invention, the return port can output airflow that is 1 degree Fahrenheit or greater temperature differential versus ambient air input temperature into the device. The air return port can be articulable and include components that direct the air in a user selectable direction. The air return port further comprise a nozzle removably and replaceably coupled with the return port to increase airflow rate, and further comprising an exit filter coupled with the return port, to an attachable delivery tube or extension hose, wherein the air return port further comprises an internally located safety grill that prevents debris ejection and human contact with the motorized air movement mechanism, and wherein the air return port further comprises a push button battery operated LED light that emits light through the air return port.

In accordance with example embodiments of the present invention, a method for ambient air temperature modification, filtration, purification is provided. The method includes intaking air into a container having an interior volume through an air inlet providing an opening into the container, transporting the air through an air channel fluidly coupling the air inlet and the interior volume of the container, filtering the air as it passes through an air filter disposed in the air channel before entering the interior volume of the container, and purifying the air using vapor capture by passing the air across a combination fluid vapor source and thermal energy storage component disposed in the interior volume of the container. The method also includes modifying the temperature of the air by passing the air through a thermal energy concentrator comprising an elongate air manifold having an air funnel opening at a first end and an intake opening at a second end in fluid communication with the interior volume of the container thereby transforming the air into thermally modified, filtered, and vapor purified air, drawing the thermally modified, filtered, and vapor purified air through a motorized air movement mechanism fluidly coupling the thermal energy concentrator, and delivering the thermally modified, filtered, and vapor purified air into an environment through an exhaust air return port.

In accordance with example embodiments of the present invention, a method for operating an ambient air temperature modification, filtration, and purification system. The method includes the system intaking air into a container having an interior volume through an air inlet providing an opening into the container; the system transporting the air through an air channel fluidly coupling the air inlet and the interior volume of the container; the system filtering the air as it passes through an air filter disposed in the air channel before entering the interior volume of the container; the system purifying the air using vapor capture by passing the air across at least one combination fluid vapor source and thermal energy storage component disposed in the interior volume of the container. The system modifies the temperature of the air by passing the air through a thermal energy concentrator comprising an elongate air manifold having an air funnel opening at a first end and an intake opening at a second end in fluid communication with the interior volume of the container thereby transforming the air into thermally modified, filtered, and vapor purified air. The system draws the thermally modified, filtered, and vapor purified air through a motorized air movement mechanism fluidly coupling the thermal energy concentrator; and the system delivers the thermally modified, filtered, and vapor purified air into an environment through an exhaust air return port. The thermally modified, filtered, and vapor purified air is perceptible by a user to have a distinguishly different temperature from ambient air temperature in which the user is operating the system.

In accordance with aspects of the present invention, the return port outputs airflow that has a 1 degree Fahrenheit or greater temperature differential versus ambient air temperature input into the device.

In accordance with the present invention, the various embodiments disclosed and described herein are considered to be interchangeable in any operable combination and to fall within the scope of the present invention, as would be appreciated by those of skill in the art.

BRIEF DESCRIPTION OF THE FIGURES

These and other characteristics of the present invention will be more fully understood by reference to the following detailed description in conjunction with the attached drawings, in which:

FIG. 2A is cross-sectional view of a personal ambient air temperature modification, filtration, and purification system in accordance with embodiments of the present invention;

FIG. 2B is cross-sectional view of a personal ambient air temperature modification device with the container, lid, air filter and thermal diffusion blade in accordance with embodiments of the present invention;

FIGS. 4A, 4B, 4C, and 4D are cut-away illustrations of the lid, air filter, motorized air movement mechanism and thermal energy concentrator components;

FIG. 6A is a cross-sectional side view of the lid and a thermal diffusion blade;

FIG. 6B is a cross-sectional front view of the lid and a portion of at least one thermal diffusion blade;

FIG. 6C is a bottom isometric view of the lid and air manifold;

FIG. 9A is a perspective view of the lid and battery compartment and FIGS. 9B and 9C are side views of the lid mounted on the container of the device;

FIG. 10A is a front isometric exploded view of the lid, the insulating insert, the thermal energy concentrator, and an air filter of the personal ambient air temperature modification, filtration, and purification system and FIG. 10B is an isometric illustration of the lid and an insulating insert shown in exploded view that demonstrates the thermal diffusion blade alternative configuration;

FIG. 11A is a front isometric exploded view of the lid, the insulating insert, and thermal energy concentrator of the personal ambient air temperature modification, filtration, and purification system and FIG. 11B shows the insulating insert and the at least one thermal diffusion blade coupled together in full assembly configuration;

FIG. 12A is an exploded view of an insulating insert and the at least one thermal diffusion blade, FIG. 12B shows the insulating insert and the at least one thermal diffusion blade coupled together in full assembly configuration, and FIG. 12C shows alternate views of the insulating insert and the at least one thermal diffusion blade coupled together in full assembly configuration;

FIGS. 14A and 14B are a top view and an isometric side view of the insulating insert and the air filter with the at least one thermal diffusion blade coupled in full assembly configuration;

FIGS. 14C and 14D are a top view and an isometric side view of the at least one thermal diffusion blade, HEPA air filter layer, and air filter collar coupled in full assembly configuration; and FIGS. 14E and 14F are a top view and an isometric side view of the at least one thermal diffusion blade, woven poly fabric air filter layers, and air filter collar coupled in full assembly configuration; and FIGS. 14G and 14H are a top view and an isometric side view of the air filter and the at least one thermal diffusion blade coupled in full assembly configuration.

FIG. 15A is a right side exploded view of the lid, the insulating insert, the thermal energy concentrator, and the air filter of the personal ambient air temperature modification, filtration, and purification system and FIG. 15B shows the thermal diffusion blade alternative configuration for improved air flow thermal regulation prior to contact with thermal energy storage components;

FIG. 16A is a rear exploded view of the lid, the insulating insert, the thermal energy concentrator, and the air filter of the personal ambient air temperature modification, filtration, and purification system and FIG. 16B shows the thermal diffusion blade alternative configuration for improved air flow thermal regulation prior to contact with thermal energy storage components;

FIG. 17A is a left side exploded view of the lid, the insulating insert, the thermal energy concentrator, and the air filter of the personal ambient air temperature modification, filtration, and purification system and FIG. 17B shows the thermal diffusion blade alternative configuration for improved air flow thermal regulation prior to contact with thermal energy storage components;

DETAILED DESCRIPTION

Figures 1A, 1B:
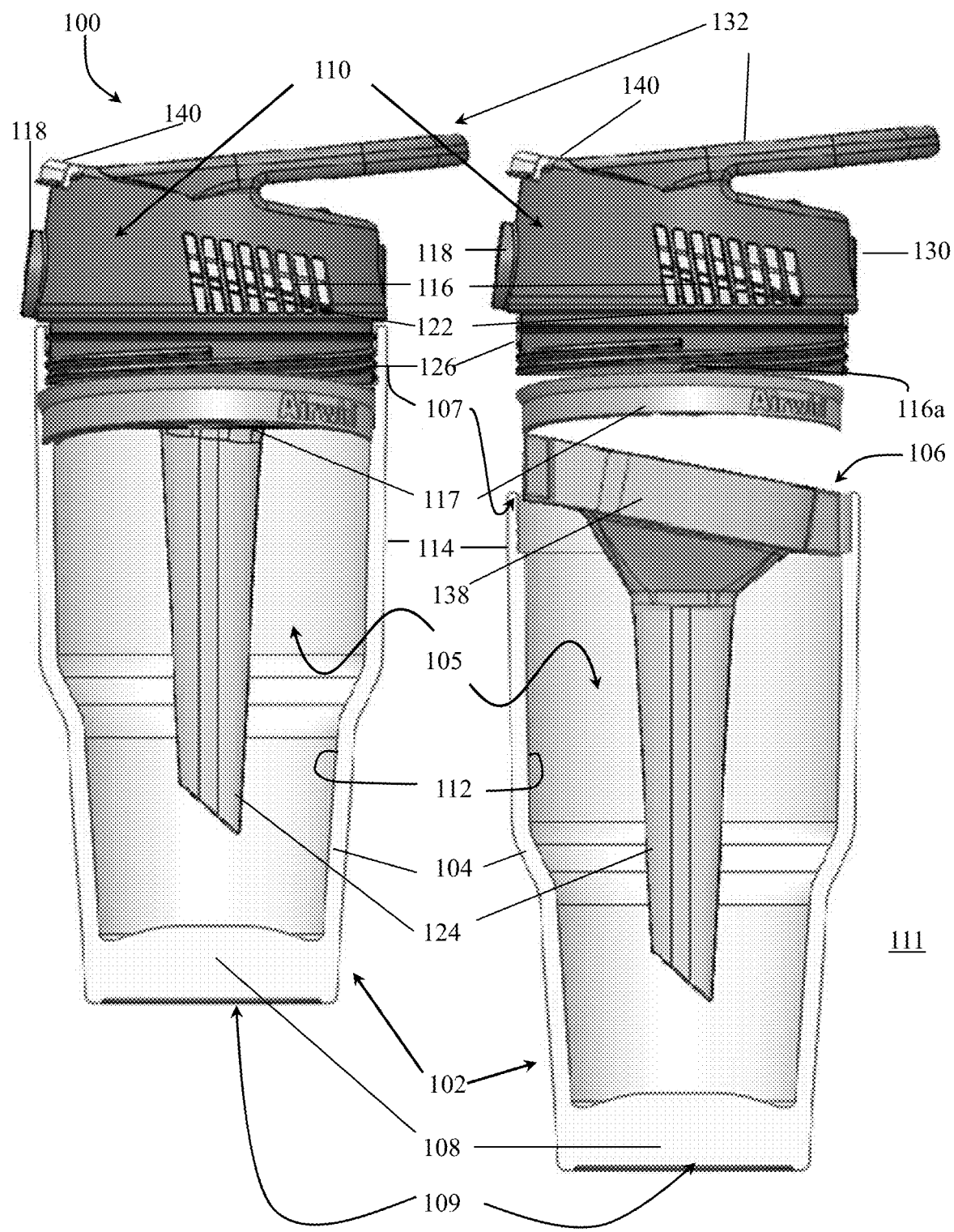
FIG. 1A is a side cross-sectional view of the container, lid, air filter and elongate air manifold components of a personal ambient air temperature modification, filtration, and purification system.
FIG. 1B is an exploded side cross-sectional view of the container, lid, air filter and elongate air manifold components of the system.

An illustrative embodiment of the present invention relates to a personal ambient air temperature modification, filtration, and purification system. The personal ambient air temperature modification, filtration, and purification system is designed to include a removable motorized lid in combination with an insulated container, such as a handheld liquid or ice container (e.g., a tumbler, thermos, etc.). The system includes a removable motorized lid in combination with an insulated container, such as a handheld liquid or ice container (e.g., a tumbler, thermos, etc.). The lid includes a powered or motorized air movement mechanism, such as a variable speed fan, and is coupled with an elongate air manifold that extends into an interior volume of the insulated container, where a thermal energy storage device may reside. Additionally, the system is designed to include air filter and insulating insert components designed to be removable for ease of cleaning both itself and the lid. One or more air filter layers can be provided in conjunction with the insulating insert to filter or purify air passing through the insulating insert along an airflow path. An optional positionable, bendable and flexible tube can be coupled with a return port to direct modified temperature airflow to a user to effect a localized beneficial temperature modification. The combined assembly of the air filter, the insulating insert, the lid, the container, the motorized air movement mechanism, the combination fluid vapor source and combination fluid vapor source and thermal energy storage component, and the thermal energy concentrator comprising the elongate air manifold form the system. The assembled system provides a personal sized portable container with a container motorized lid for use with any appropriately sized combination fluid vapor source and thermal energy storage components (e.g., ice, iron oxide or thermal preserving gel materials, or thermal battery heat generating system) to purify and then condition or modify ambient temperature air drawn into and through the system (e.g., via an air intake and the air manifold) and be returned out to the user via an air return opening in the lid producing purified air with a modified temperature (either heated or cooled from the ambient air temperature that was drawn into the system).

Additionally, an optional flexible and length extendable tube can be attached to a return port on the system to enable close proximity of modified ambient temperature air directed for close proximity personal use of the system of the present invention in different environmental temperature conditions. Furthermore, the entire device is sized, dimensioned, and configured to fit within a conventional cup holder, such as would be found in an automobile (e.g., including cup holders for holding conventionally sized drinks or cups, such as 12 ounce beverage cans, 8 ounce to 32 ounce cups including coffee cups or iced coffee cups, larger cups with smaller bases, etc.), and especially when implemented in a container embodiment. Accordingly, the present invention is configured to take advantage of the known thermal containment benefits of a double wall insulated container (such as a container handheld liquid container, or equivalent container); specifically, a container that can keep ice or warm water temperatures for an extended period of time and leverage such insulating capability to provide a heating or cooling functionality by exposing an airflow to an internal heating or cooling component with the airflow passing over the component, through an elongate air manifold, and out of the system with the lid sealed in place. The lid and the container can optionally include various vibration and sound absorption means to quite operation and provide non-slip placement on angled and/or wet surfaces, as well as provide insulated temperature preservation benefits on different temperature surfaces.

Unlike conventional personal fan systems that utilize localized airflow to merely move around ambient air, or perhaps add some water mist or vapor to leverage an evaporative cooling effect, the system and method of the present invention significantly modifies ambient air temperatures in a surrounding external environment by use of a double walled container with a motorized lid air movement assembly and unique internal air manifold that enables ambient temperature air to flow through an interior volume of the container, be heated or cooled depending on desired configuration, and be returned out from the container and delivered to a user to effect a localized temperature modification benefit, aka, heating or cooling of the air. In particular, ambient temperature air is pulled into an interior volume of the container device of the present invention, the air is filtered, the air is purified further using vapor capture techniques, the ambient temperature filtered, purified air is cooled or heated by contents stored within the system (depending on whether the user desires to experience cooling or heating) and the resulting cool or warm filtered, purified air is returned out from the interior volume of the container device and delivered to the user. The modified air returned from the system has proven to provide sufficient ambient air purity and temperature modification for hours with the system of the present invention. The change in ambient temperature is produced from a combination fluid vapor source and thermal energy storage component placed within the double wall insulated container, combined with the specifically configured elongate air manifold disposed in the interior volume and directing modified air to a return port (or coupled tube) directed at a user. In short, the present invention employs both a handheld liquid container sized motorized lid assembly with internal air channel means to effect a significant change in airflow purity and temperatures to a user.

FIGS. 1 through 19, wherein like parts are designated by like reference numerals throughout, illustrate an example embodiment or embodiments of a personal ambient air temperature modification, filtration, and purification system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIGS. 1 through 19 depict illustrative embodiment(s) of a personal ambient air temperature modification, filtration, and purification system 100, and method of use, in accordance with the present invention. In particular, FIG. 1A depicts in a side cross-sectional view the system 100 including a container 102 sized, dimensioned, and configured as a handheld liquid container 102 that is also sized, dimensioned, and configured to fit and be held by conventional cup holders such as would be found in automobiles, bicycles, couches, camping chairs, coolers, etc., and the like, as is well understood by those of skill in the art such that no additional description is required. In accordance with an example embodiment of the present invention, the container 102 includes one or more thermally insulated walls 104 defining an interior volume 105, each of the one or more thermally insulated walls 104 having an interior side 112 facing the interior volume 105 and an exterior side opposite the interior side. The interior volume 105 is configured to hold beverages and other substances (e.g., temperature modifying substance) for use by the present invention. Additionally, in one example implementation, the one or more thermally insulated walls 104 have a double-wall configuration (wherein the air gap between the walls is the mechanism by which they are considered thermally insulating, as would be understood by those of skill in the art).

The container 102 further includes an opening 106 disposed through a first end 107 of the container. A base 108 is disposed at a second end of the container 102 opposite the first end, the base 108 having an interior side 113 facing the interior volume 105 and an exterior side opposite the interior side, upon which the container 102 rests on a surface. In accordance with an example embodiment of the present invention, the container 102 further includes a non-slip vibration absorption layer 109 disposed on the exterior side of the base 108 of the container 102 configured in such a way that the container 102 rests on the vibration absorption layer 109 when sitting on a surface. The vibration absorption layer 109 is configured to minimize translation of any vibration generated by, e.g., a motorized air movement mechanism 120 comprising a motorized fan 120 during operation through to the surface upon which the container 102 rests, thereby maintaining quieter operation. The vibration absorption layer also provides sound an insulated benefit by reducing the motorized fan 120 noise on a surface, hence causing quieter operation. The vibration absorption layer further provides temperature preservation insulating benefits to preserve an internal temperature of the container 102 such that external surface/ambient air temperatures do not modify the internal temperature of the container 102.

As would be appreciated by one skilled in the art, the container 102 can be designed in any geometric shape, including round, square, triangle or hexagonal shape that fits into a standard size cup holder with an interior volume 105 of about 6 oz., about 8 oz., about 10 oz, about 12 oz., about 15 oz., about 16 oz., about 20 oz., about 24 oz., about 30 oz., about 36 oz., about 40 oz., about 45 oz., about 50 oz, about 55 oz, or about 60 oz. Similarly, the ratio of the length and width of the container 102 can vary be design and preferred interior volume 105 of the container. For example, the vibration absorption layer base width to wall width ratio of the container can be greater than 80% up to 150%. Additionally, the container 102 can include a universal grip shape to allow users with different hand sizes to easily handle the container 102 regardless of hand size. For example, the container 102 can include different shapes/grips sections including but not limited to any geometric shape, tapers shapes, flared shapes, contoured shapes, etc. Preferably, the container is sized and dimensioned at its base to fit within a conventional cup holder, such as would be found in an automobile.

As would be appreciated by one skilled in the art, the container 102, and components thereof, can be constructed from any materials known in the art and scaled to any size. For example, the container 102 can be manufactured of one or more of a plastic, composite, metal, rubber, elastomeric material, non-elastomeric material, or combinations thereof. Additionally, the container 102 can include any type of coating and/or exterior finish known in the art. For example, the container 102 can include a weather resistant soft touch coating (e.g., a two-shot hard plastic and soft elastomer areas on 5% or greater external surface area of motorized lid 110) for providing a non-slip grip in different weather conditions.

Continuing with FIG. 1A, the personal ambient air temperature modification, filtration, and purification system 100 also includes a lid 110. The lid 110 removably and replaceably covers the opening 106 of the container 102 in such a way that the lid 110 obstructs the opening 106 when in a sealed position and exposes the opening 106 when in an unsealed position or removed from the container 102. The interior side 112 of the container 102 is configured to face the interior volume 105 of the container 102 and the exterior side 114 opposite the interior side 112. As would be appreciated by one skilled in the art, the lid 110 can be designed in any geometric shape, including round, square, triangle or hexagonal shape matching an opening 106 shape of a double walled thermal energy holding container 102 that fits into a standard size cup holder.

FIG. 1B depicts an exploded side cross-sectional view of the system 100 including container 102, lid 110, air filter 117 and elongate air manifold of the thermal energy concentrator 124 components of the system 100 of FIG. 1A. FIG. 1B demonstrates how the air filter 117 may be inserted into the lid 110 and how the elongate manifold of the thermal energy concentrator 124 is coupled to the motorized air movement mechanism 120 and the fan housing 138 that is then inserted within the lid 110. The air filter 117 and the elongate manifold coupled to motorized air movement mechanism 120 and the fan housing 138 are configured to accommodate each other so as to maintain separate air channels that preserve airflow throughout the system 100. One of ordinary skill in the art understands that their shapes may vary but these shapes will be of a diameter and configuration to fit within the lid 110 and not impair operation of the other components.

FIG. 2A depicts in a side cross-sectional view of the system 100 of FIG. 1A, further including the combination fluid vapor source and thermal energy storage components 121 disposed in the interior volume 105 of the container 102. Examples of combination fluid vapor source and thermal energy storage components 121 include but are not limited to hand warmer pouches of iron oxide crystals, ice cubes, freezable or heatable blocks, chemically activated gel packs, rechargeable battery packs, or freezable gel pouches. Additionally, the elongate air manifold of the thermal energy concentrator 124 can have a tapered end configuration with a narrower end of the tapered configuration to act as an ice deflector when the container 102 is filled with temperature modifying substances (e.g., ice cubes, crushed ice, shaved ice, etc.) such that the elongate air manifold of the thermal energy concentrator 124 pushes aside the temperature modifying substances as the lid 110 is coupled with the container 102. FIG. 2B depicts in a side cross-sectional view an alternate embodiment of the system 100 of FIG. 1A, wherein the air filter 117 comprises an additional one or more thermal diffusion blades 125.

FIG. 8 is an exploded view of the device and all components that combine to form the device in full assembly. The components are configured to nest and interlock to reduce space and form an air tight seal to prevent leakage into the environment 111 of thermal characteristics of the interior volume 105 of the container 102, improving efficiency in air delivery by the system 100.

FIGS. 4A-4D depict multiple detailed illustrative examples of the lid 110 as shown in FIG. 1A. In accordance with an example embodiment of the present invention, the lid 110 includes an air inlet 122, air intake port 116, a return port 118, and a motorized air movement mechanism 120, such as a motorized fan 120 disposed inside the lid 110 and configured to draw air into an air inlet 122, through an air filter 117 disposed in an air channel 116a, through elongate air manifold of the thermal energy concentrator 124 and exhausts return air through the air return port 118 to an external environment 111 of the container 102 and the lid 110. Note that the motorized air movement mechanism 120 in the illustrative embodiment is depicted as the motorized fan 120. However, one of skill in the art will appreciate that any suitable air movement mechanism can be utilized so long as it fits within the dimensional and power requirements of the present invention. For purposes of brevity, the air movement mechanism is referred to throughout the present invention as the motorized fan 120, but the present invention is not limited to only a fan-specific mechanism. Any reference to a fan is intended to encompass all such suitable motorized air movement mechanisms 120, including but not limited to fans, turbines, pressurized vessels, air nozzles, air pumps, and the like.

The at least one air intake port 116 is in fluid communication with the interior volume 105 of the container 102. In particular, the at least one air intake port 116 is configured and positioned to draw supply air from an ambient external environment 111 (external to the system 100) to the system 100 into the interior volume 105 of the container 102. As would be appreciated by one skilled in the art, the at least one air intake port 116 and air inlet 122 can include multiple cut outs, filters, and locations throughout the lid 110. For example, the at least one air intake port 116 can be disposed proximal the first end of the container 102. Likewise, the at least one air intake port 116 could be located in the upper portion of the thermally insulated wall 104 of the container 102 in addition, or as an alternative, to being disposed in the lid 110.

The return port 118 is utilized to provide the purified, modified (e.g., heated or cooled) airflow created by the present invention to a user. The return port 118 can be fixed, articulable, or a combination thereof, to enable the user to direct the return air in a desired direction. It can also include an internally located safety grill to prevent debris or small fingers from entering the motorized fan 120 blades.

In accordance with an example embodiment of the present invention, the fan 120 is a centrifugal or turbine fan including multiple curved blades which enable improved thrust in a smaller space while creating less noise than a traditional flat blade fan design. More specifically, a compact turbine blade design enables more thermal energy convection in compact motorized fan housing with efficient vacuum generation and return port thrust, ideal for ambient temperature convection through a compact space without a large amount of air flow noise. Additionally, the centrifugal or turbine fan design enables the return port 118 to be located 90 degrees to the motor shaft for the fan 120 for compact airflow efficiency and temperature preservation of the thermally changed expelled air flow. As would be appreciated by one skilled in the art, the motorized centrifugal fan 120 can include any combination of curved fan blades, flat fan blades, or angled fan blades. Similarly, any type of fan design or other mechanism can be utilized to draw air from the external environment 111 into the system 100 and exhaust air return through the return port 118 without departing from the scope of the present invention.

As the fan 120 draws in air from the external environment 111, the fan 120 draws in modified temperature air from the interior volume 105 of the container 102 through the air inlet 122 and the elongate air manifold of the thermal energy concentrator 124 and exhaust that air through the return port 118. The air inlet 122 is positioned underneath a center point of the fan 120 and can be located at any location on the intake side of the fan 120. The fan 120 draws are in through the air inlet 122 proximate to the center of the fan 120 blades and then distributes the air out along the fan blades to the return port 118. When the lid 110 is in the sealed position on the container 102, the motorized centrifugal fan 120 is operating, and one or more combination fluid vapor source and thermal energy storage components 121 are disposed in the interior volume 105 of the container 102, then ambient air from the external environment 111 is drawn through the at least one air intake port 116, if a filter 117 is in place then through that filter 117, into the interior volume 105 of the container 102 and across the one or more combination fluid vapor source and thermal energy storage components 121. The air continues to flow, passing through an intake opening 123 at a second end of the thermal energy concentrator 124, through the thermal energy concentrator 124, the ambient air being converted to thermally modified air via convection with the one or more combination fluid vapor source and thermal energy storage components 12*l* and the thermal energy concentrator 124. The thermally modified, (alternatively) filtered, and vapor purified air then continues through an air funnel 127 opening, into the air inlet 122, and out through the return port 118 as return air having a different temperature from the ambient air drawn through the at least one air intake port 116. As would be appreciated by one skilled in the art, the elongate air manifold of the thermal energy concentrator 124 is sufficiently long such that the temperature of the air traversing therethrough will be modified.

In accordance with an example embodiment of the present invention, the air inlet 122 is coupled to the elongate air manifold of the thermal energy concentrator 124 positioned underneath the fan and extending into the interior volume 105 of the container 102. The thermal energy concentrator 124 has an air funnel 127 opening at a first end and the intake opening 123 at a second end, the air funnel 127 opening fluidly coupled with the air inlet 122 and the intake opening 123 fluidly coupled with the interior volume 105 of the container 102, as depicted in FIG. 1. As would be appreciated by one skilled in the art, the thermal energy concentrator 124 can have a variety of designs for facilitating the flow of air into and out of the interior volume 105 of the container 102 via the air inlet 122. For example, the thermal energy concentrator 124 can have one central channel fluidly coupling an air funnel 127 at the first end with the intake opening at the second end or the thermal energy concentrator 124 can have a plurality of channels fluidly coupling an air funnel 127 at the first end with the intake opening at the second end. Similarly, the ratio of length to width of the elongate air manifold of the thermal energy concentrator 124 can vary based on a size and dimension of the container 102 and the interior volume 105 of the container 102. For example, the elongate air manifold of the thermal energy concentrator 124 length to width ratio can be greater than 10% of the fan diameter.

Additionally, the thermal energy concentrator 124 can also have a plurality of side wall openings for enabling distribution of airflow throughout the interior volume 105 of the container 102. In accordance with an example embodiment of the present invention, the thermal energy concentrator 124 includes a plurality of thermally conductive surface features. For example, the thermal energy concentrator 124 includes one or more of fins, contours, finger projections, or combinations thereof, as would be readily understood by those of skill in the art based on the present disclosure, which increase a thermally conductive surface area of the elongate air manifold of the thermal energy concentrator 124 relative to a and smooth and linear surface.

The thermal energy concentrator 124 is elongate such that it has a length greater than the width of the fan that it feeds with air.

In accordance with an example embodiment of the present invention, the thermal energy concentrator 124 includes attachment means for engaging the elongate air manifold of the thermal energy concentrator 124 with the one or more combination fluid vapor source and thermal energy storage components disposed inside the container 102. For example, the thermal energy concentrator 124 can include attachment means in the form of posts, slots, ribs, or cups disposed along an outer surface of the elongate air manifold of the thermal energy concentrator 124 for attachment of the combination fluid vapor source and thermal energy storage components 121 to the elongate air manifold of the thermal energy concentrator 124 (and/or for attachment to the container 102). The combination fluid vapor source and thermal energy storage components 121 can include any temperature modifying substances capable of changing a temperature of airflow. Examples of combination fluid vapor source and thermal energy storage components 121 include but are not limited to hand warmer pouches of iron oxide crystals, ice cubes, freezable or heatable blocks, chemically activated gel packs, rechargeable battery packs, or freezable gel pouches. Additionally, the thermal energy concentrator 124 can have a tapered end configuration with a narrower end of the tapered configuration being proximate the intake opening 123 at the second end in such a way that the tapered configuration is an ice deflector when the container 102 is filled with temperature modifying substances (e.g., ice cubes, crushed ice, shaved ice, etc.) such that the elongate air manifold of the thermal energy concentrator 124 pushes aside the temperature modifying substances as the lid 110 is coupled with the container 102. In particular, the thermal energy concentrator 124 is sized, shaped, and tapered to prevent the lid 110 and elongate air manifold of the thermal energy concentrator 124 from becoming wedged or locked by contents (e.g., temperature modification substances such as ice) included within the interior volume 105 of the container 102. More specifically, the tapered shape allows for the lid 110 (with the thermal energy concentrator 124 attached thereto) to be forcibly removed by displacing any contents (e.g., ice cubes) in the container 102 without getting lodged between those contents. Additionally, the shape of the elongate air manifold of the thermal energy concentrator 124 can vary without departing from the scope of the present invention. For example, the elongate air manifold of the thermal energy concentrator 124 can be round, square, triangle, pentagon, spiral, hexagon, octagonal shaped or corrugated.

The combination of the at least one air intake port 116, the fan 120, the air inlet 122, the thermal energy concentrator 124, and the return port 118 enable the system 100 to draw in ambient air from the external environment 111 and circulate the air through the interior volume 105 of the container 102 before being exhausted through the return port 118. The addition of temperature modifying substances and/or thermal generating containers or materials will cause the ambient air drawing in through the at least one air intake port 116 to be modified while in the interior volume 105 of the container 102 such that the return air (exhaust through the return port 118) will have a different temperature from the ambient air drawn. As would be appreciated by one skilled in the art, the temperature will vary based on the temperature of the interior volume 105 and the temperature modifying substances and/or the at least one combination fluid vapor source and thermal energy storage components 121 within the container. For example, the materials can produce and exhaust an air flow temperature difference of at least 1 degree Fahrenheit from the original ambient air temperature in the external environment 111. Similarly, the air flow temperature change will vary depending on proximity of a user to the return port 118 of the lid 110. For example, if a user is within 2" inches or 5 cm to 6" inches or 15 cm from the return port 118 opening to the user may experience a temperature difference between the ambient environment and the air return of about 1 degree Fahrenheit.

Figure 4C:
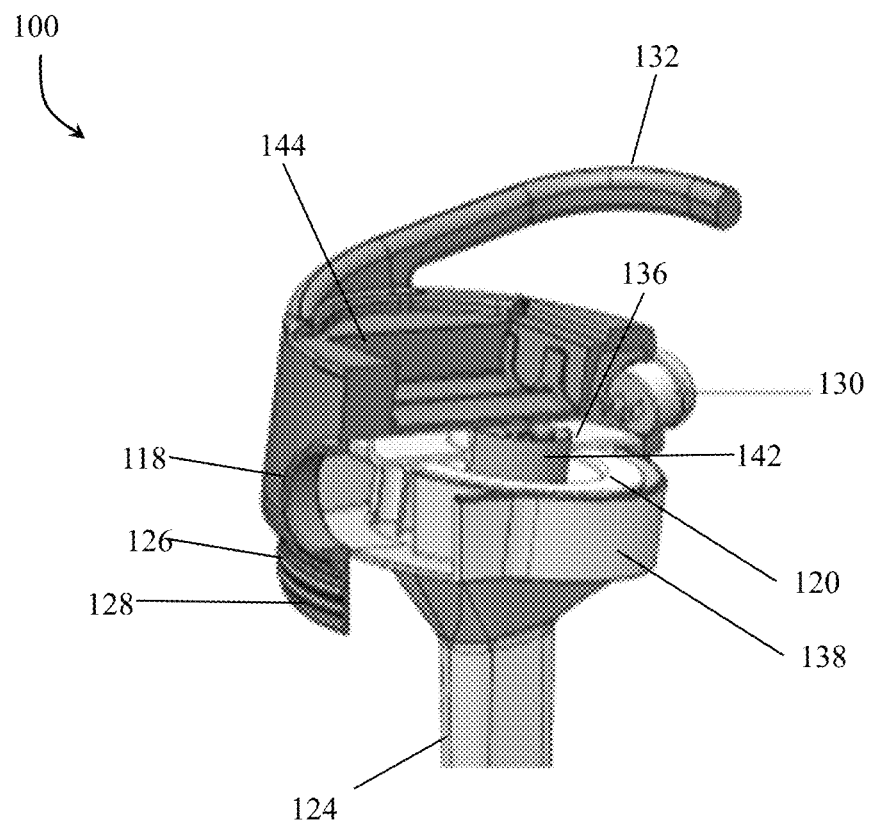
Figure 4D:
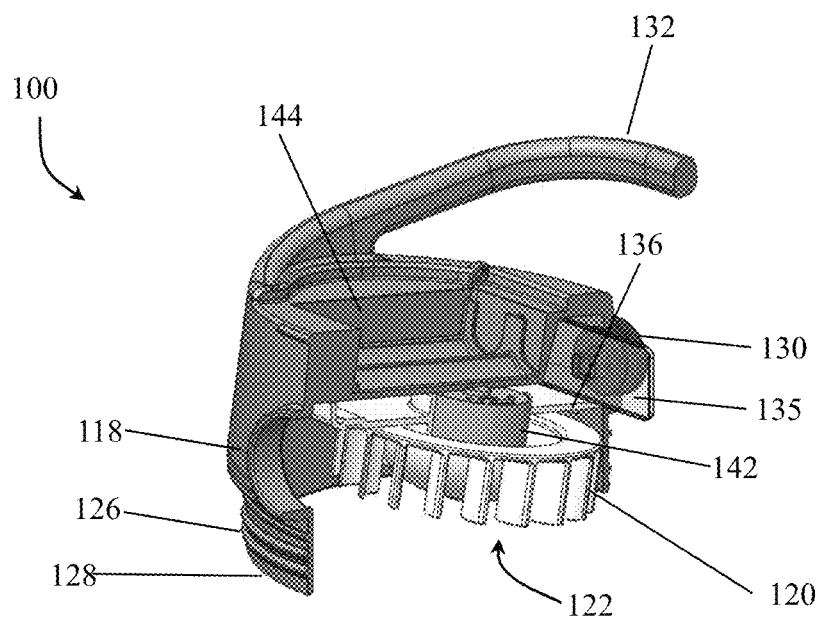

FIGS. 4A-4D depict more detailed views of the lid 110 and thermal energy concentrator 124. In particular, FIGS. 4A-4B are side cross-sectional views of the lid 110 with the thermal energy concentrator attached thereto. FIGS. 4C and 4D depict cut-away perspective views of the lid 110.

As discussed with respect to FIG. 1 and depicted in FIGS. 4A-4D, the lid 110 is designed for removable attachment to the opening 106 of the container 102. As would be appreciated by one skilled in the art, the lid 110 can include any combination of mechanical coupling means for removably attaching the lid 110 to the container 102. For example, the lid 110 can include a mechanical coupling means, such as a threaded coupling 126, or one of a friction or interference fit, a latch mechanism, or a magnetic coupling. In accordance with an example embodiment of the present invention, the lid 110 also includes a gasket seal 128 disposed about the lid 110 that is configured to engage with the container 102 opening 106 when the lid 110 is in a sealed position on the container 102. The gasket seal 128 can include an elastomer gasket seal, a rubber ribbed gasket, an O-ring, or any other gasket seal known in the art (or no gasket may be required to secure an air tight seal). In addition to creating an air tight seal between the lid 110 and the container 102, the gasket seal 128 also provides vibration dampening, noise reduction, and thermal preservation between the container 102 opening 106 and the lid 110. In particular, the gasket seal 128 provides a vibration absorption perimeter disposed along the entire perimeter of the lid 110, and is sized and dimensioned to form a friction fit with the interior side of the one or more walls of the container 102 and seal the opening 106 of the container 102 when the lid 110 is inserted into the opening 106.

The lid 110 is configured to house the components for controlling the airflow from the external environment 111 into and through the interior volume 105 of the container 102 and exhausting the air out through the return port 118. FIG. 4A depicts the external components of the lid 110 housing. The external components of the lid 110 housing include the at least one air intake port 116, the return port 118, a power button 130 for operation of the fan 120, and a handle 132. Additionally, the lid 110 is removably or fixedly attached to the air inlet 122 and the thermal energy concentrator 124. Further, the lid 110 can include an internal battery compartment or an externally connected battery compartment for supplying power to the fan motor 142. It can also include a rechargeable battery cord plug or direct current power cord plug outlet, a battery indicator, or fan speed indicator. The battery compartment can be weather resistant and include a hinge with a clip, screw, or other mechanical fastener to contain the batteries even during device impact such as if it were dropped on a floor.

As discussed with respect to FIG. 1A, the at least one air intake port 116 is the location where ambient air from the external environment 111 is pulled into the system 100 (e.g., via the fan 120). In accordance with an example embodiment of the present invention, the at least one air intake port 116 includes one or more internally mounted or externally located movable doors (not depicted) positioned and configured to close or open access to the at least one air intake port. The one or more movable doors can be closed to block the at least one air intake port 116 or opened to provide access to the at least one air intake port 116 in such a way that the door(s) can be closed when the fan 120 is not activated, thereby preserving thermal energy within the container 102. As would be appreciated by one skilled in the art, the one or more movable door(s) can also be partially opened/closed to manually control the airflow.

In accordance with an example embodiment of the present invention, the lid 110 can include one or more insulating temperature preservation and sound insulating foam inserts to fill the empty space around and under the assembled fan lid 110. The one or more insulating foam insets (not depicted) can be utilized in place of or in addition to the one or more movable doors for the at least one air intake port 116. The one or more insulating foam inserts can partially block the at least one air intake port 116 (e.g., one or more vents creating the at least one air intake port 116) to statically control the amount of airflow needed for the system 100 to operate efficiently while preserving the inside temperature of the container 102. By partially covering portions of the at least one air intake port 116 the insulating foam inserts reduce an amount of ambient temperature air inadvertently impacting a temperature of the interior volume 105 of the container 102. Likewise, how the filter material such as a HEPA type construction can further help control the amount of airflow volume that passes through the insulated foam collar air channel(s) prior to airflow passing into the vapor temperature chamber.

Continuing with FIG. 4A, the lid 110 includes or is otherwise attached to the air inlet 122. The air inlet 122 and the thermal energy concentrator 124 can be permanently fixed or friction paired for easy attachment to the fan lid 110 housing opening or sealable fixed and mated to the lid 110 by means of a compression fitting elastomeric gasket. As discussed with respect to FIG. 1A, the air inlet 122 and the thermal energy concentrator 124 are configured to provide contained air flow channels for circulating airflow (e.g., from the at least one air intake port 116) through the interior volume 105 of the container.

In accordance with an example embodiment of the present invention, the lid 110 includes a handle 132 extending therefrom. The handle 132 can be a molded handle 131a is coupled to the lid 110, as depicted in FIGS. 1A and 4A-4D or the handle 132 can be removably attached to the lid 110 and configured to pivot about the coupling point with the lid 110. For the removable handle 132, the lid 110 can include cutouts in which an end of the handle 132 can be inserted to form a friction fit and rotate freely. This way the user can attach various length handles as needed. Regardless of implementation, the handle 132 is configured to enable a user to carry and hold the system 100 during use. The handle 132 also allows a user to place the system 100 horizontally onto a flat surface and prevent the system 100 from unintentional rolling. Additionally, the handle 132 is sized, shaped, and oriented to support a mobile phone or mobile tablet device at a desired viewing angle for display, prevent accidental on/off switch activation, and/or block accidental power cord dislodgment when connected to an external power source.

Continuing with FIG. 4A, the fan 120 power state is controlled by the switch/button 130. In accordance with an example embodiment of the present invention, the fan 120 is a variable speed fan and the button 130 is a variable speed fan control. Additionally, the button 130 can include variable fan speed graphics including on/off positions (e.g., after low is off, and low through higher is on). As would be appreciated by one skilled in the art, any combination of buttons can be utilized for the button 130 without departing from the scope of the present invention. For example, the button can be a digital switch, an analog switch, a haptic feedback switch, or a combination thereof.

FIG. 4B depicts some of the internal components of the lid 110 through the cross sectional perspective. In particular, in addition to the components discussed with respect to FIG. 4A, FIG. 4B depicts a motor housing 136, a fan housing 138, and a battery door cover 140. In accordance with an example embodiment of the present invention, the motor housing 136, the fan housing 138, and the battery door cover 140 form a network of closed compartments configured to prevent ambient temperature air water condensation and modified temperature air water condensation from contact with the connected electrical components located within such compartments. For example, the network of closed compartments contain can protect the one or more electrically connected switches, printed circuit boards (PCBs), light emitting diodes (LEDs), and batteries. As would be appreciated by one skilled in the art, the motor housing 136 and a fan housing 138 can be constructed from any materials known in the art and are designed to safely house a motor 142, the electrical components, and the fan 120 components. Additionally, the protection can be provided through any combination of methods and systems known in the art. For example, protection from ambient temperature air, water condensation, etc. can be provided by a combination of seals containers and insulation materials. The fan housing 138 includes an opening adjacent to the at least one air intake port 116 to allow air from the external environment 111 to be pulled into the fan housing 138 and the air inlet 122. In accordance with an example embodiment of the present invention, the fan housing 138 includes one or more fins in the opening to control the flow of air and prevent large debris from being pulled into the fan housing 138. The fan housing 138 also includes a hinged battery door cover 140 and a snap latch that locks over into a locked of closed position.

Continuing with FIG. 4B, the battery door cover 140 is a cover protecting a battery storage compartment 144 for housing and facilitating power transfer from a power source to the motor 142. The battery door cover 140 is configured to provide access to and protect the battery storage compartment 144 and the contents thereof (e.g., batteries). For access purposes, the battery door cover 140 can include any combination of mechanical door covers known in the art. For example, the battery door cover 140 can be a hinged door, a removable battery cover (e.g., secured by a screw or other locking mechanism), or other door cover known in the art. When closed and secured (e.g., via screw or other locking mechanism), the battery door cover 140 provides a weather resistant, waterproof, dust resistant seal for the battery storage compartment 144. In accordance with an example embodiment of the present invention, the battery door cover 140 is equipped for magnetic power cord attachment for plug-free, wireless re-chargeable battery charging, or other power transfer mechanism to convey power to/from a power source within the battery storage compartment 144 without having to open the battery door cover 140. Additionally, the battery door cover 140 can have a raised or protruding holding tab to place a cell phone or tablet screen face up for viewing on top of the lid 110 handle 132 and battery cover holding tab. The lid handle 132 engages the cell phone screen or tablet screen at a desired viewing angle and is held in position by the battery cover tab.

Figure 3:
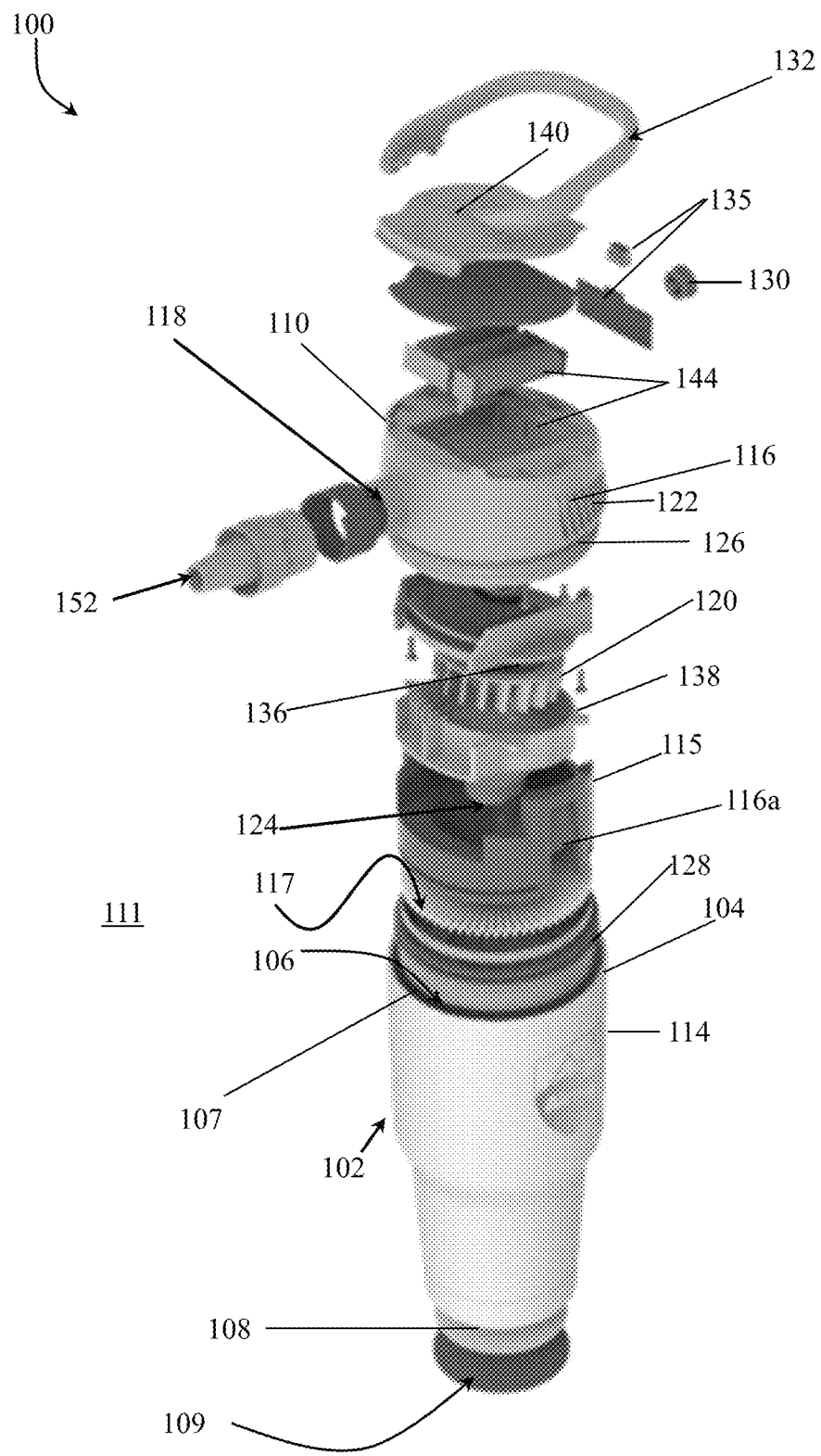
FIG. 3 is an exploded view of the device and all components that combine to form the device in full assembly.

FIG. 4B depicts some of the internal components of the lid 110 (e.g., components within the motor housing and the fan housing 138) through the cross sectional perspective. In particular, in addition to the components discussed with respect to FIGS. 3 and 4A, FIG. 4B depicts the fan motor 142, the fan 120, and the battery storage compartment 144 accessible via the battery door cover 140. The fan motor 142 controls the rotation of the fan 120 and is powered by the power source located within the battery storage compartment 144. The power source can include any combination of fixedly attached storage (e.g., power cell, fixed rechargeable battery, etc.) and/or replaceable power sources (e.g., batteries, rechargeable batteries, etc.). As would be appreciated by one skilled in the art, the system 100 can be powered by any combination of disposable or rechargeable batteries (e.g., AA, AAA, D, etc.), lithium battery, alternating current (AC) micro universal serial bus (USB) power cable, solar energy sources, etc. Additionally, the power source can be recharged and/or provide energy to other devices (e.g., smartphone) through a wireless or wired connection to a charger (e.g., via wireless charging, USB, micro-USB, multi-pin dock connector, and lighting power connector, etc.). The battery storage compartment 144 houses the power source and electronically connects the power source to the motor 142. Additionally, the button 130 is connected to both the power source and the motor 142 and controls the power output to the motor 142.

FIGS. 4C and 4D depict cross-sectional views of the lid 110 and components included therein. In particular, FIGS. 4C and 4D depict alternate views of the components discussed with respect to FIGS. 3 and 4A-4B. The three-quarter perspective shows how the motor 142, fan 120, the fan housing 138, the air inlet 122, the air manifold and thermal energy concentrator 124, and other components relate to one another. Additionally, FIG. 4D depicts the multiple curved fan blade design of the fan 120. Additionally, the lid 110 and components included therein are weather resistant to protect the internal mechanical and electrical operation of the components.

In accordance with an example embodiment of the present invention, the lid 110 can include other electronic components stored within the housings 136, 138, 144 and powered/controlled by the power source and button 130. The electronic components can include a printed circuit board or equivalent for a light emitting diode(s) (LED(s)) incorporated within the lid 110 (e.g., on top the top surface of the lid 110) to indicate to a user, the power status of the system 100 (or present other alerts/notifications). As would be appreciated by one skilled in the art, the LED indicator(s) can be viewable from any interior or exterior surface of the lid 110 and is not limited to a top surface of the lid 110. In an example, with an LED(s) on the interior of the lid 110, light can be provided through the air return port 118 (or an extension delivery tube). Similarly, the LED(s) can provide light for viewing the interior volume 105 of the container 102 or be used as a night light. The LED(s) can provide other feedback to a user including but not limited to an on/off status, a battery level, a fan speed, etc. Additionally, in accordance with an example embodiment, the lid 110 can include an internal temperature sensor connected to the LED. The internal temperature sensor can be configured to read an internal air temperature within the interior volume 105 of the container and update the LED based on the measure temperature. For example, indicate a LED color of white, green, blue for cooler temperatures and yellow, red, orange for warmer temperatures.

The electronic components can also include a wireless communication component configured to wirelessly communicate using one or more of radio frequency (RF), Wi-Fi, cellular, Bluetooth, Bluetooth Low Energy, personal area network (PAN), short-wavelength UHF, or combinations thereof. The wireless communication component can be coupled with a control mechanism that is controlling the fan 120 operation in such a way that the fan 120 is controllable by separate device (e.g., smartphone) in wireless communication with the control mechanism via the wireless communication component. The electronic components can further include a microphone configured receive voice commands translated to commands for a control mechanism controlling operation of the fan 120. As would be appreciated by one skilled in the art, the lid 110 can include any combination of electronic components found in electrically controlled portable devices.

In accordance with an example embodiment of the present invention, the system is configured to be compatible with a number of different accessory and optional features (not depicted). Some optional accessories and features include but are not limited to a removable insulating jacket cover sized, dimensioned, and configured to fit around the container 102, a temperature sensor, and corresponding temperature display, disposed on the system 100 for sensing air temperature, an ultrasonic electronic water mist generator for supplying water mist to the return port 118, an aromatic diffuser for supplying aroma to the return port 118, a liquid medication diffuser for supplying air flow medication out through the return port 118, a water mist generator coupled with a water source, one or more washable and reusable air filtering layers coupled to a collar with two or more air intake channels in fluid communication with air intake ports 116 and an additional a washable and reusable air filter coupled with the return port 118, to an attachable delivery tube, or both. As would be appreciated by one skilled in the art, the filtering layers and filters 117 can include any combination of a disposable air filter, carbon based filter, a HEPA air filter, etc. Likewise, the filtering layers and filters 117 can include any combination of antimicrobial component, such as but not limited to silver or other antimicrobial materials or technologies as would be understood by those of skill in the art. The lid 110 is configured to couple with an extendable, multi-position flexible delivery tube (not shown, but readily understood by those of skill in the art) via a friction fitting at the air return port 118 whereby the user installs the tube to direct air flow remotely away from the system 100. As would be appreciated by one skilled in the art, the tube can be affixed to the air return port 118 utilizing any mechanism known in the art. The tube is positionable by making the tube flexible, such as for example, by constructing the tube of a rubber or plastic material, which could be corrugated. In operation, the tube enables remote placement of the system 100 while providing the benefits of the system 100 to the user. Additionally, the tube can further include a mounting clip (not shown, but readily understood by those of skill in the art) configured to removably attach the tube at a desired location to directionally control blowing air emitted therefrom. The combination of an air return port 118 and/or the extendable and positionable tube enables the system 100 to deliver the temperature modified air flow at a distal location away from the lid 110 and container 102 assembly, resulting in a quieter, more convenient temperature modifying experience for the user. As would be appreciated by one skilled in the art, the tube can be provided in any combination of lengths and diameters without departing from the functionality of the present invention. The benefit of remote airflow delivery is to reduce noise and vibration, as well as obscure the motorized device from the intended benefactor In accordance with an example embodiment of the present invention, the lid 110 includes a fixed carry ring element (not depicted) configured for attachment to another storage or carrying device. For example, the lid 110 can include a carabiner for attachment to a backpack or other type of bag to enable hands free carrying of the system 100. As would be appreciated by one skilled in the art, the carry ring element can be positioned anywhere on the outer surface of the lid 110 that enables such an attachment.

In accordance with an example embodiment of the present invention, the overall assembled system 100 is sized, dimensioned, and configured in such a way that the system 100 is portable and removably and replaceably mounts in a conventional cup holder, such as would be found in an automobile, a stroller, a shopping cart, or the like. As would be appreciated by one skilled in the art, the system 100 can be sized, shaped, and configured in any dimensions known in the art without departing from the functionality of the present invention in terms of heating and cooling operation (but not necessarily with respect to being able to fit within a conventional cup holder). Similarly, the lid 110 can be sized, shaped, and dimensions to universally fit a variety of existing commercial available containers. Additionally, the external sides of the lid 110, including a battery door cover 140, the button 130 and any other switches, the handle 132 are constructed of less-heat absorbing materials, finishes, or colors to reduce heat absorption by the fan 120 for use in extreme ambient temperatures or sunlight.

The system 100 can be constructed utilizing any combination of manufacturing methods known in the art and can include any number of pieces coupled together or a single molded/printed device. Additionally, each of the components of the system 100 can be constructed from any combination of materials known in the art. Preferably the system 100 is constructed from light weight components to provide a light weight portable system 100. For example, ideally, the total system 100 weighs less than 10 lbs, preferably less than 5 lbs, and more preferably less than 2 lbs.

Figures 5A, 5B, 5C:
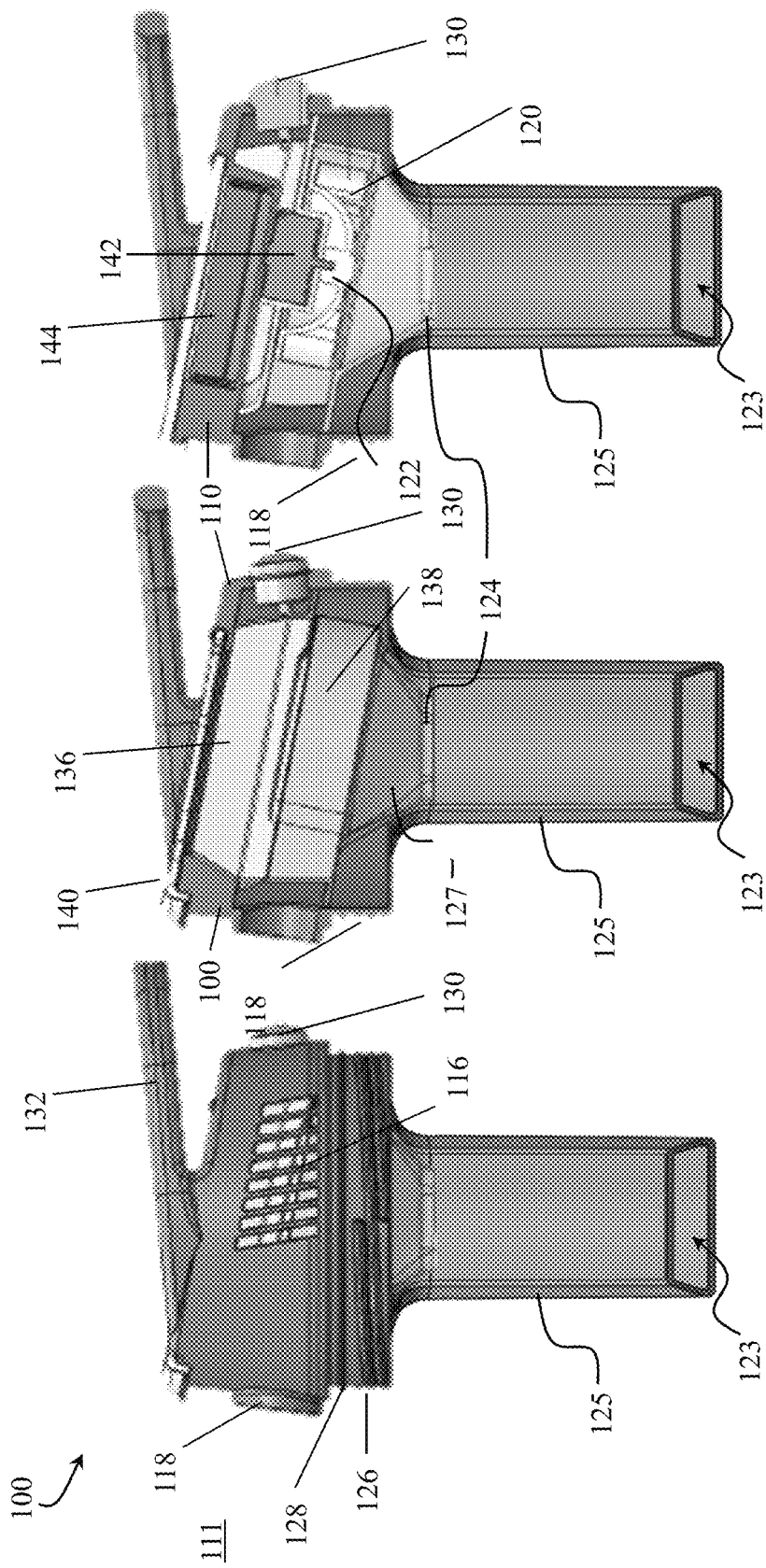
FIG. 5A is a side view of lid, thermal diffuser, and thermal energy concentrator components of the device of FIG. 1A.
FIGS. 5B, and 5C, are cut-away illustrations of the lid, thermal diffuser, and thermal energy concentrator components shown in FIG. 5A.

FIGS. 5A-5C depict multiple detailed illustrative examples of the lid 110 as shown in FIG. 1A. In accordance with an alternative example embodiment of the present invention, the lid 110 includes an air intake port 116, a return port 118, and a motorized air movement mechanism, such as a motorized fan 120 disposed inside the lid 110 and configured to draw air into the interior volume 105 of the container 102 through one or more air intake port 116 each feeding one of at least one thermal diffusion blade 125 prior to contact with the at least one combination fluid vapor source and thermal energy storage components 121 and after processing the air, then exhausts return air through the return port 118 to an external environment 111 of the container 102 and the lid 110. Note that the motorized air movement mechanism in the illustrative embodiment is depicted as the motorized fan 120. For purposes of brevity, the configuration and steps of this embodiment including one or more thermal diffusers 125 repeat, after contact with the at least one combination fluid vapor source and thermal energy storage components 121, the configuration and steps described above with respect to FIGS. 4A-4B, and are incorporated by reference.

The one or more air intake port 116 is in fluid communication with the interior volume 105 of the container 102. In particular, the one or more air intake port 116 are configured and positioned to draw supply air from an ambient external environment 111 (external to the system 100) to the system 100 into the interior volume 105 of the container 102. As would be appreciated by one skilled in the art, the one or more air intake port 116 and can include multiple cut outs, filters, and locations throughout the lid 110. Likewise, the one or more air intake port 116 could be located in the upper portion of the thermally insulated wall 104 of the container 102 in addition, or as an alternative, to being disposed in the lid 110. The one or more air intake port is 116 is depicted in the example embodiment as two ports, one on each side of the lid; however, other numbers and arrangement of air intake port are anticipated by the invention and the present description, as would be readily appreciated by those of skill in the art.

In accordance with an alternative example embodiment of the present invention, the fan 120 is a centrifugal or turbine fan including multiple curved blades which enable improved thrust in a smaller space while creating less noise than a traditional flat blade fan design. More specifically, a compact turbine blade design enables more thermal energy convection in compact motorized fan housing with efficient vacuum generation and return port thrust, ideal for ambient temperature convection through a compact space without a large amount of air flow noise. As would be appreciated by one skilled in the art, the motorized centrifugal fan 120 can include any combination of curved fan blades, flat fan blades, or angled fan blades. Similarly, any type of fan design or other mechanism can be utilized to draw air from the external environment 111 into the system 100 and exhaust air return through the return port 118 without departing from the scope of the present invention.

As the fan 120 draws in air from the external environment 111, the fan 120 draws in modified temperature air from the interior volume 105 of the container 102 through the air inlet 122 and the elongate air manifold of the thermal energy concentrator 124 and exhausts that air out through the return port 118. The fan 120 draws are in through the air inlet 122 proximate to the center of the fan 120 blades and then distributes the air out along the fan blades to the return port 118. When the lid 110 is in the sealed position on the container 102, the motorized centrifugal fan 120 is operating, and one or more thermal energy storage components 121 are disposed in the interior volume 105 of the container 102, then ambient air from the external environment 111 is drawn through the one or more air intake port 116, into the interior volume 105 of the container 102, down through the at least one thermal diffusion blade 125, into the interior volume 105 and across the one or more thermal energy storage components 121. The air continues to flow, passing through the air manifold of the thermal energy concentrator 124, the ambient air being converted to thermally modified air via convection with the one or more thermal energy storage components **12*l* and the air manifold and thermal energy concentrator 124. The thermally modified air then continues through an air funnel 127** opening, into the air inlet 122, and out through the return port 118 as return air having a different temperature from the ambient air drawn through the one or more air intake port 116. As would be appreciated by one skilled in the art, the at least one thermal diffusion blade 125 is sufficiently long such that the temperature of the air traversing therethrough will be modified to a desired temperature differentiation versus the ambient air temperature to be noticeably warmer or cooler to the user.

In accordance with an alternative example embodiment of the present invention, the supply opening 123 of the at least one thermal diffusion blade can have a plurality of channels fluidly coupling supply opening 123 with the interior volume 105. Similarly, the ratio of length to width of the at least one thermal diffusion blade 125 can vary based on a size and dimension of the container 102 and the interior volume 105 of the container 102. For example, the thermal diffusion blade 125 length to width ratio can be greater than 10% of the fan diameter.

Additionally, the at least one thermal diffusion blade 125 can also have a plurality of side wall openings for enabling distribution of airflow throughout the interior volume 105 of the container 102. In accordance with an example embodiment of the present invention, the at least one thermal diffusion blade 125 include a plurality of thermally conductive surface features. For example, the at least one thermal diffusion blade 125 can include one or more of fins, contours, finger projections, or combinations thereof, as would be readily understood by those of skill in the art based on the present disclosure, which increase a thermally conductive surface area of the elongate air manifold of the thermal energy concentrator 124 relative to a and smooth and linear surface.

Each of the at least one thermal diffusion blade 125 is elongate such that it has a length greater than the width, and they are sized and dimensioned to reach into a mid-section, vertically measured, of the interior volume with the supply opening 123 so as to draw air into and over the thermal energy storage components 121 before it is drawn back out of the interior volume 105. As referenced and depicted herein, there is at least one thermal diffusion blade; however, those of skill in the art will appreciate that there can be, two (as depicted) three, four, or more thermal diffusion blades. The determination of number of blades rests in part on a desired total amount of surface area desired for conductive and convective heat transfer, as well as the total amount of cross-sectional conduit or channel area desired for air intake, as would be appreciated by those of skill in the art given the teachings of the present description and figures. It has been found through experimentation that with two thermal diffusion blades 125, the size of the blade and the length of the blade enable the blade to be positioned on either side of the interior volume and reach into a middle 25% area 158 of the interior volume 105. The middle 25% area 158 is depicted in FIG. 1A. This is a generally middle area or region, relative to vertical dimension of the container, that the supply opening 123 of the at least one thermal diffusion blade 125 preferably opens to supply the air from the one or more air intake port 116 and draw it down through the at least one thermal diffusion blade 125 and diffuse and disperse the air into the interior volume 105 of the container 102 to wash over the thermal energy storage components 121. If the at least one thermal diffusion blade 125 is to short and the supply opening 123 is too close to the elongate air manifold of the thermal energy concentrator 124 (i.e., in the upper 25% vertically of the interior volume 105), then the air short-circuits between the supply opening 123 and the elongate air manifold of the thermal energy concentrator 124 and does not enable a sufficient level of convection to occur with the thermal energy storage components 121. If the at least one thermal diffusion blade 125 is too long and the supply opening 123 opens in the bottom 25% of vertical area of the interior volume 105, then the supply opening 123 can experience blockage by contact with the thermal energy storage components 121 blocking the supply opening 123, or if the thermal energy storage components 121 generate liquid over time (such as when ice melts), then the liquid in the bottom of the container can undesirably block the supply opening 123, hindering airflow into the interior volume 105. All of these considerations must be taken into account when one of skill in the art sizes the quantity and dimensions of the at least one thermal diffusion blade 125.

In accordance with an example embodiment of the present invention, the at least one thermal diffusion blade 125 include attachment means for engaging the at least one thermal diffusion blade 125 include with the one or more thermal energy storage components 121 disposed inside the container 102. For example, the at least one thermal diffusion blade 125 include can include attachment means in the form of posts, slots, ribs, or cups disposed along an outer surface of the at least one thermal diffusion blade 125 include for attachment of the thermal energy storage components 121 to the at least one thermal diffusion blade 125 include (and/or for attachment to the container 102). The thermal energy storage components 121 can include any temperature modifying substances capable of changing a temperature of airflow. Examples of thermal energy storage components 121 include but are not limited to hand warmer pouches of iron oxide crystals, ice cubes, freezable or heatable blocks, chemically activated gel packs, rechargeable battery packs, or freezable gel pouches. Additionally, the at least one thermal diffusion blade 125 include can have a tapered end configuration with a narrower end of the tapered configuration being proximate the supply opening 123 at the second end in such a way that the tapered configuration is an ice deflector when the container 102 is filled with temperature modifying substances (e.g., ice cubes, crushed ice, shaved ice, etc.) such that the each of the at least one thermal diffusion blade 125 pushes aside the temperature modifying substances as the lid 110 is coupled with the container 102. In particular, each of the at least one thermal diffusion blade 125 is sized, shaped, and tapered to prevent the lid 110 and each of the at least one thermal diffusion blade 125 from becoming wedged or locked by contents (e.g., temperature modification substances such as ice) included within the interior volume 105 of the container 102. More specifically, the shape allows for the lid 110 (with the each of the at least one thermal diffusion blade 125 attached thereto) to be forcibly removed by displacing any contents (e.g., ice cubes) in the container 102 without getting lodged between those contents. Additionally, the shape of the elongate air manifold of the thermal energy concentrator 124 can vary without departing from the scope of the present invention. For example, the elongate air manifold of the thermal energy concentrator 124 can be round, square, triangle, pentagon, spiral, hexagon, octagonal shaped or corrugated.

The combination of the one or more air intake port 116, the fan 120, the air inlet 122, each of the at least one thermal diffusion blade 125, the air manifold and thermal energy concentrator 124, and the return port 118 enable the system 100 to draw in ambient air from the external environment 111 and circulate the air through the interior volume 105 of the container 102 before being exhausted through the return port 118. The addition of temperature modifying substances and/or thermal generating containers or materials will cause the ambient air drawing in through the one or more air intake port 116 to be modified while traveling in and down through each of the at least one thermal diffusion blade 125 and also while inside the interior volume 105 of the container 102 such that the return air (exhaust through the return port 118) will have a different temperature from the ambient air drawn.

FIGS. 5A-5C depict more detailed views of the lid 110 and air manifold and thermal energy concentrator 124. In particular, FIG. 5A is a side view and FIGS. 5B-5C are side cross-sectional views of the lid 110 with the air manifold attached thereto. As discussed with respect to FIG. 1A and depicted in FIGS. 5A-5C, as well as FIGS. 4A-4D, the lid 110 is designed for removable attachment to the opening 106 of the container 102. The lid 110 is configured to house the components for controlling the airflow from the external environment 111 into and through the interior volume 105 of the container 102 and exhausting the air out through the return port 118. FIG. 5A depicts the external components of the lid 110 housing. The external components of the lid 110 housing include the one or more air intake port 116, the return port 118, a power button 130 for operation of the fan 120, and a handle 132. Additionally, the lid 110 is removably or fixedly attached to the air inlet 122, each of the at least one thermal diffusion blade 125, and the thermal energy concentrator 124. Further, the lid 110 can include an internal battery compartment or an externally connected battery compartment for supplying power to the fan motor 142.

Continuing with FIG. 5A, the fan 120 power state is controlled by the switch/button 130. In accordance with an example embodiment of the present invention, the fan 120 is a variable speed fan and the button 130 is a variable speed fan control. Additionally, the button 130 can include variable fan speed graphics including on/off positions (e.g., after low is off, and low through higher is on). The button 130 can be in communication with an internal control that can implement a timer when the button 130 is activated. For example, the timer can be pre-set to operate the fan 120 for a predetermined amount of time, such as e.g., 20 minutes, after which the fan 120 automatically shuts off. In addition the button 130 and the internal control (e.g., PCB board) can be further configured to implement a low power and high power fan setting, or other different step level fan settings, as would be appreciated by those of skill in the art. As would be appreciated by one skilled in the art, any combination of buttons can be utilized for the button 130 without departing from the scope of the present invention. For example, the button can be a digital switch, an analog switch, a haptic feedback switch, or a combination thereof.

FIG. 5B depicts some of the internal components of the lid 110 through the cross sectional perspective. In particular, in addition to the components discussed with respect to FIG. 5A, FIG. 5B depicts, similarly to incorporated FIG. 4B, a motor housing 136, a fan housing 138, and a battery door cover 140. FIG. 5C depicts some of the internal components of the lid 110 (e.g., components within the motor housing and the fan housing 138) through the cross sectional perspective. In particular, in addition to the components discussed with respect to FIGS. 5A and 5B, FIG. 5C depicts, similarly to incorporated FIG. 4C, the fan motor 142, the fan 120, and the battery storage compartment 144 accessible via the battery door cover 140.

In particular, FIGS. 5A-5C depict alternate views of the components discussed with respect to FIGS. 4A-4D, and includes the description with respect thereto incorporated and applied to the thermal diffuser 125 embodiments. Additionally, the lid 110 and components included therein are weather resistant to protect the internal mechanical and electrical operation of the components. FIG. 6A is a cross-sectional side view of the lid and a thermal diffusion blade. FIG. 6B is a cross-sectional front view of the lid and a portion of at least one thermal diffusion blade. FIG. 6C is a bottom isometric view of the lid and air manifold.

Figure 7A:
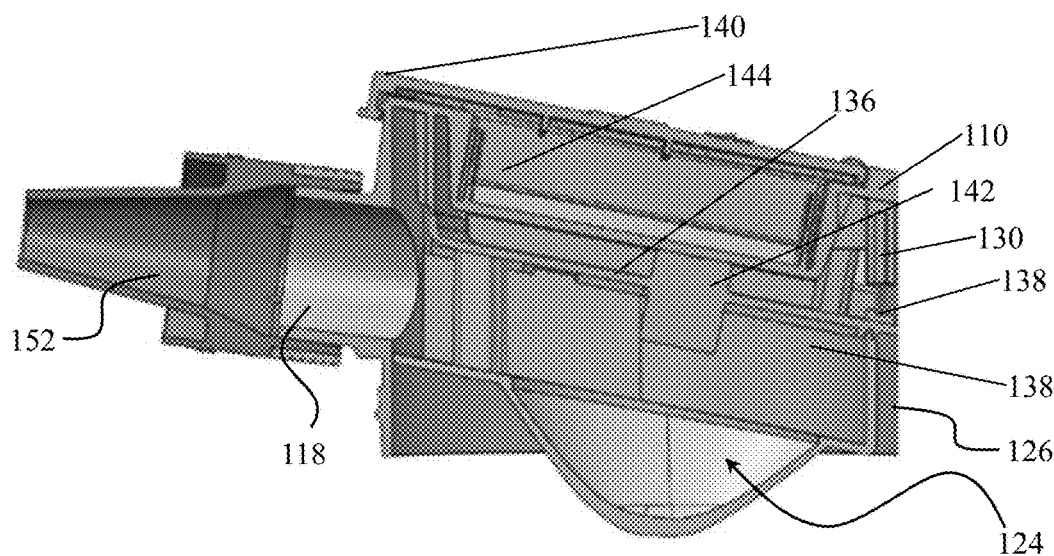
FIGS. 7A and 7B are illustrations of the lid with a nozzle attached to a return port of the lid with an extension hose extending therefrom.
Figure 7B:
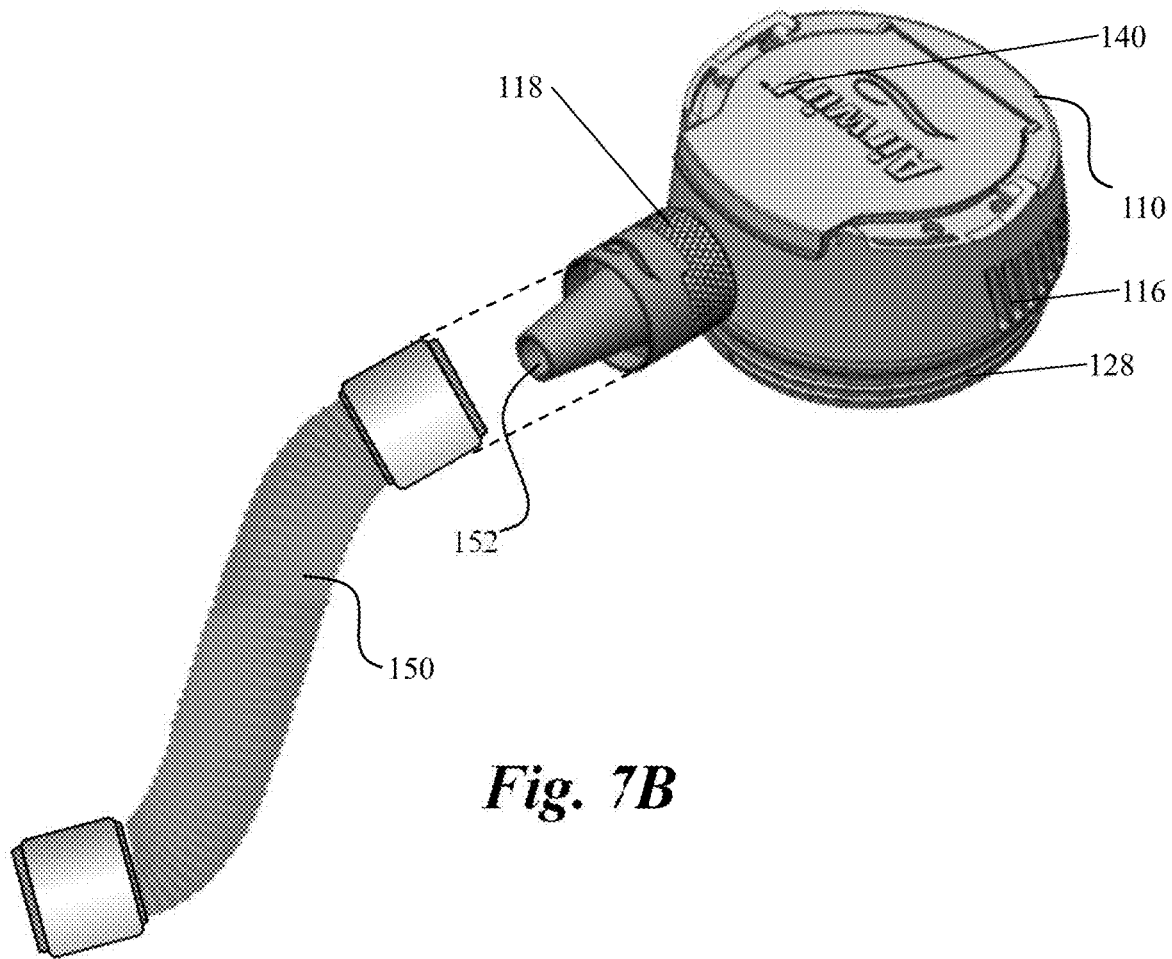

In accordance with an example embodiment of the present invention, the lid 110 is configured to couple with an extendable, multi-position flexible delivery tube 150. FIG. 7B depicts example implementations of the lid 110 with the tube 150 attached thereto. In particular, FIG. 7B depicts tube 150 attached to the lid 110 via a friction fitting at the air return port 118 whereby the user installs the tube 150 to direct air flow remotely away from the system 100. As would be appreciated by one skilled in the art, the tube 150 can be affixed to the air return port 118 utilizing any mechanism known in the art. The tube 150 is positionable in a plurality of different directions so as to enable the user to direct airflow as desired. In accordance with one illustrative embodiment of the present invention, the positionable functionality is achieved by making the tube 150 flexible, such as for example, by constructing the tube of a rubber or plastic material, which could be corrugated. In operation, the tube 150 enables remote placement of the system 100 while providing the benefits of the system 100 to the user.

Additionally, the tube 150 can further include a mounting clip (not shown, but readily understood by those of skill in the art) configured to removably attach the tube 150 at a desired location to directionally control blowing air emitted therefrom. The combination of an air return port 118 and/or the extendable and positionable tube 150 enables the system 100 to deliver the temperature modified air flow at a distal location away from the lid 110 and container 102 assembly, resulting in a quieter, more convenient temperature modifying experience for the user. For example, the container 102, with the lid 110 in place, can be placed into a cup holder of a stroller, and when the system 100 is activated the modified temperature airflow out from the system 100 can be delivered and directed to a nearby child seated in the stroller via the extendable tube 150. As would be appreciated by one skilled in the art, the tube 150 can be provided in any combination of lengths and diameters without departing from the functionality of the present invention. For example, the tube 150 can be configured to extend in ¼" increments from approximately 6" to 28". Similarly, the tube 150 can be flexible in design and configured to hold its shape. For example, a user can extend the tube 150 around 90 degree corners without effect to airflow. The benefit of remote airflow delivery is to reduce noise and vibration, as well as obscure the motorized device from the intended benefactor.

In operation, when the lid 110 is in the sealed position on the container 102, the motorized centrifugal fan 120 is operating, and one or more thermal energy storage components are disposed in the interior volume 105 of the container 102, then ambient air is drawn through the one or more air intake port 116, in through the at least one thermal diffusion blade 125, out through the supply openings 123 into the interior volume 105 of the container 102 and across the one or more thermal energy storage components, through the air manifold and thermal energy concentrator 124, the ambient air being converted to thermally modified air via convection with the one or more thermal energy storage components and the at least one thermal diffusion blade 125, the thermally modified air then continuing through the air funnel 127 opening (e.g., in the fan housing 138), into the air inlet 122, and out through the return port 118 as return air having a different temperature from the ambient air drawn through the one or more air intake port 116.

In short, when activated, the system 100 of the present invention provides either a cooling air flow or a heating airflow based on a temperature of the contents with the interior volume 105 of the container 102 relative to ambient air temperature in the external environment 111. In particular, the combination of the contents of the interior volume 105 (e.g., ice, heat packs, etc.), the air manifold, and the lid 110 assembly containing the fan 120 create a heating or cooling effect by heating or cooling an ambient temperature air intake with the contents of the container 102 and transferring the thermal energy into the airflow of the air manifold and thermal energy concentrator 124. More specifically, transfer of thermal energy occurs when the air enters remotely from one or more air intake port 116 and flows downward or in the direction of a flow path A instigated by the fan 120 generated vacuum, which air flow passes alongside the elongate air manifold of the thermal energy concentrator 124 within the container. The resulting modified airflow is then exhausted out through the return port 118 via flow path B toward a user. Each of the at least one thermal diffusion blade 125 is fluidly coupled with the respective air intake channel 156 on the left or right side of the system 100. The airflow path flows down through the insulating insert 154, and down through the interior conduits or channels of each of the at least one thermal diffusion blade 125. Each of the at least one thermal diffusion blade 125 is immersed in the interior volume 105 of the device where the thermal energy storage components 121 provide either heating or cooling energy (depending on what form of thermal energy storage component 121 is being utilized). Conduction occurs between the thermal energy storage components 121, and any liquid in the interior volume (such as what may result from melting ice) and the at least one thermal diffusion blade. As the intake airflow travels down into the device through the at least one thermal diffusion blade 125, convection thermal energy transfer occurs between the airflow and the at least one thermal diffusion blade 125 through which the air is traveling. The airflow exits the at least one thermal diffusion blade 125 at the supply openings 123 and spills into the interior volume, washing over, around, and through the thermal energy storage components 121. The air is now thermally modified and the draw force of the motorized air movement mechanism such as a motorized fan 120 draws the thermally modified air up through the elongate air manifold of the thermal energy concentrator 124 and out through the return port 118 to either a nozzle 152 coupled with the return port 118 and or the flexible hose extension hose 150 for delivery to the user as shown in FIGS. 7A and 7B. The use of the nozzle 152, which can be a Venturi style nozzle, or other nozzle for boosting air velocity, increases and focuses the velocity of the airflow out of the system 100. By increasing the velocity, and focusing the air into a narrower stream, the air projects further out from the device, enabling the device to be placed, e.g., on a desk in front of the user and for the user to experience thermally modified air (heated or cooled) at a distance of 2 to 4 feet from the system 100.

Figure 8A:
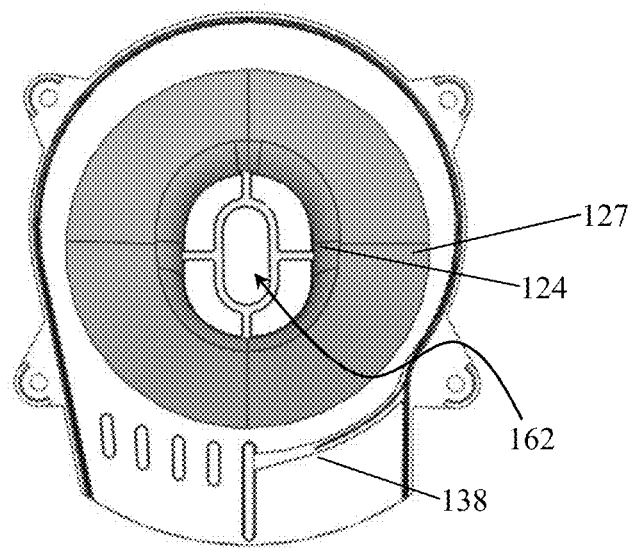
FIG. 8A shows a bottom view of the lid and FIG. 8B shows a front view of the lid and return port.
Figure 8B:
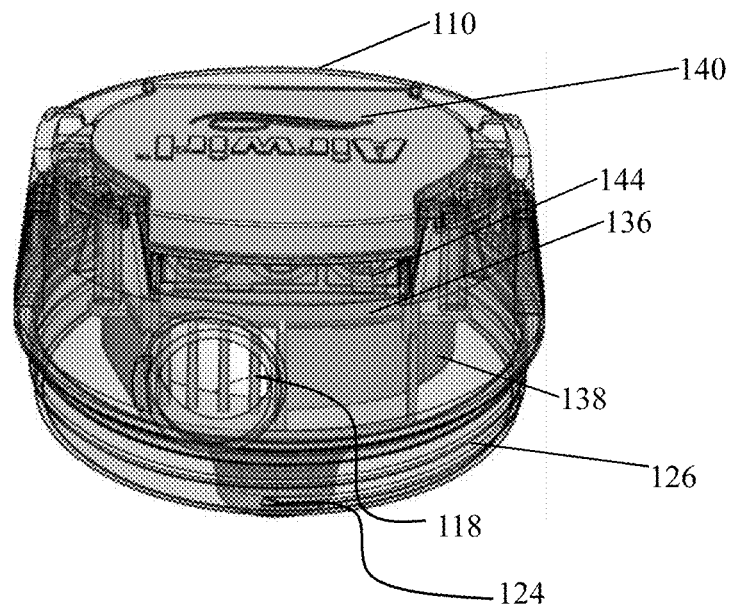
Figures 13A, 13B:
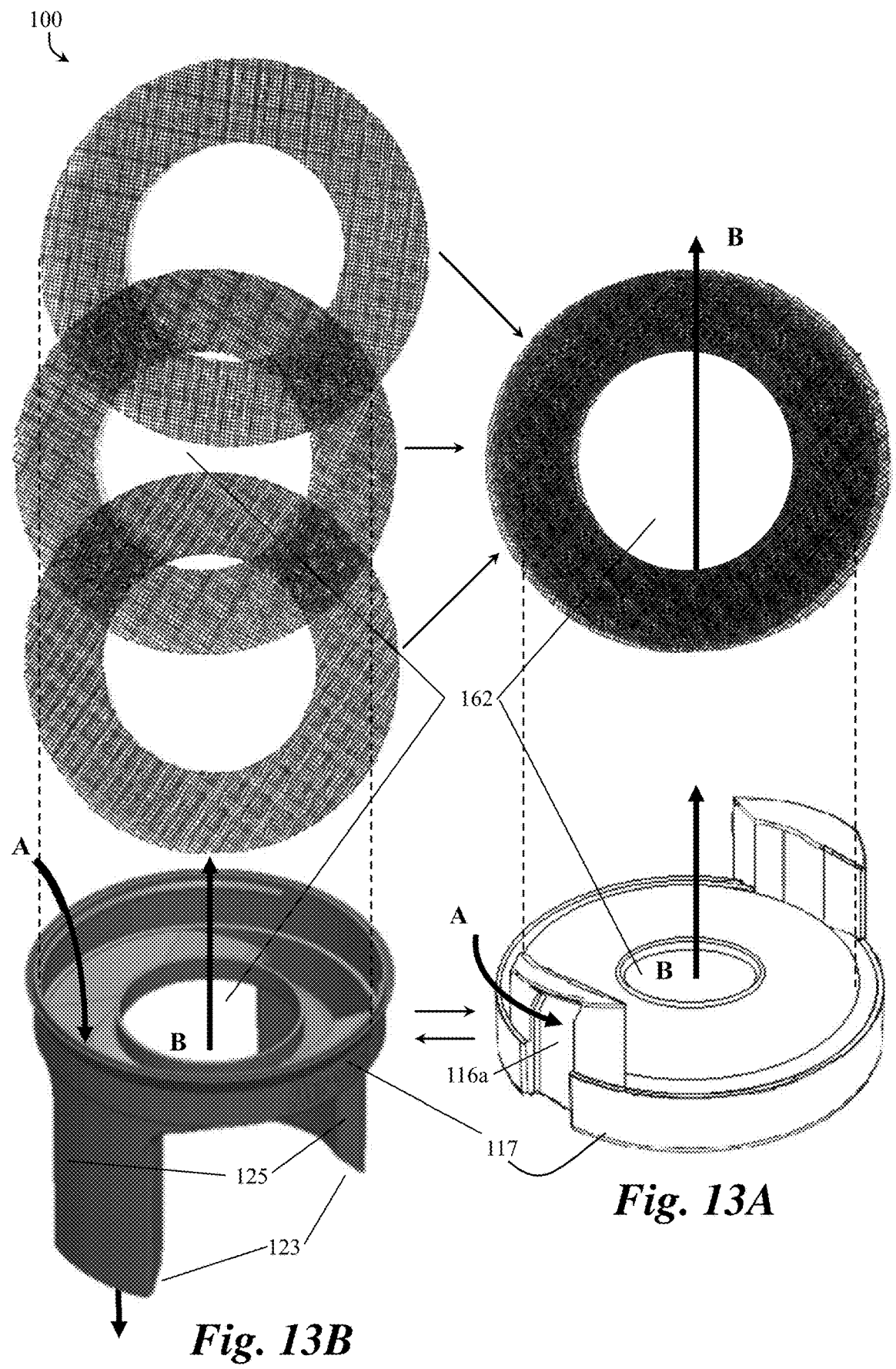
FIG. 13A is a front isometric view of the filter and woven poly fabric air filter layers inserted into the filter of the personal ambient air temperature modification, filtration, and purification system.
FIG. 13B is a front isometric exploded view of the filter and woven poly fabric air filter layers inserted into the filter showing a thermal diffuser alternative arrangement.

FIG. 8A shows a bottom view of the lid and FIG. 8B shows a front view of the lid and return port. The return port 118 is utilized to provide the modified (e.g., heated or cooled) airflow created by the present invention to a user. The return port 118 can be fixed, articulable, or a combination thereof, to enable the user to direct the return air in a desired direction. It can also include an internally located safety grill to prevent debris or small fingers from entering the motorized fan 120 blades. A nozzle 152 can be coupled with the return port 118 sized, dimensioned, and configured to increase airflow velocity, and/or focus the airflow, as would be appreciated by those of skill in the art.

FIG. 9A is a perspective view of the lid and battery compartment and FIGS. 9B and 9C are side views of the lid mounted on the container of the system 100.

In operation (and as shown in FIGS. 10A and 10B; 11A and 11B), when the lid 110 is in the sealed position on the container 102, the motorized centrifugal fan 120 is operating, and one or more combination fluid vapor source and thermal energy storage components are disposed in the interior volume 105 of the container 102, then ambient air is drawn through the at least one air intake port 116 and air inlet 122, through a filtering layer and filter 117, into the interior volume 105 of the container 102 and across the one or more combination fluid vapor source and thermal energy storage components, through the elongate air manifold and thermal energy concentrator 124, the ambient air being converted to thermally modified, filtered, and vapor purified air via convection with the one or more combination fluid vapor source and thermal energy storage components and the elongate air manifold and thermal energy concentrator 124, via having passed through the filtering layer and filter 117, and via any remaining particles adhering to liquid vapor within the interior volume 105 of the container 102. The thermally modified, filtered, and vapor purified air then continues through the air funnel 127 opening (e.g., in the fan housing 138), and out through the return port 118 as return air having a different temperature from the ambient air drawn through the at least one air intake port 116.

In short, when activated, the system 100 of the present invention provides either a cooling air flow or a heating airflow based on a temperature of the contents with the interior volume 105 of the container 102 relative to ambient air temperature in the external environment 111. In particular, the combination of the contents of the interior volume 105 (e.g., ice, heat packs, etc.), the air manifold, and the lid 110 assembly containing the fan 120 create a heating or cooling effect by heating or cooling an ambient temperature air intake with the contents of the container 102 and transferring the thermal energy into the airflow of the air manifold and thermal energy concentrator 124. More specifically, transfer of thermal energy occurs when the air enters remotely from at least one air intake port 116 and flows downward or in the direction of a flow path instigated by the fan 120 generated vacuum, which air flow passes alongside the elongate air manifold of the thermal energy concentrator 124 within the container 102. The resulting modified airflow is then exhausted out through the return port 118 toward a user. This modified airflow (thermally modified, filtered, and vapor purified) has as part of its properties a perceptible temperature difference relative to the ambient air. As such, when a user/operate of the system 100 is attempting to direct filtered air to a target location, such as their own face or another location), even if the airflow is minimal the perceptible temperature difference between the modified airflow and the ambient air is sensed by the user/operator. When the system 100 is heating, the perceptible temperature difference is one of warmer air versus ambient air temperature. When the system 100 is cooling, the perceptible temperature difference is one of cooler air versus ambient air temperature. Specifically, and as an illustrative example, when the system 100 is heating a temperature of the modified airflow exhausting out through the return port 118 as return air can have a temperature of about 120° F. As a further illustrative example, when the system is cooling a temperature of the modified airflow exhausting out through the return port 118 as return air can have a temperature of about 50° F. When ambient air is room temperature, or about 76° F., there is a 26 degree difference versus cooled modified air and a 44 degree difference versus heated modified air. When ambient air temperature is much cooler, such as outside in a cold climate, temperature differences between ambient air and heated modified airflow exhausting out through the return port 118 (e.g., if it is 32° F. ambient air temperature, then a heating modified airflow of 110° F.) are extremely perceptible. When ambient air temperature is much warmer, such as outside in a hot climate, temperature differences between ambient air and cold modified airflow exhausting out through the return port 118 (e.g., if it is 95° F. ambient air temperature, then a cooling modified airflow of 60° F.) are extremely perceptible).

Those of skill in the art will appreciate that a temperature difference of 1-2 degrees on the Fahrenheit scale are perceptible temperature variations or differences. As such, in an illustrative example of an ambient temperature of 76° F., a cooled modified airflow of 74° F. is considered as it relates to the present invention to be a perceptible temperature difference. Likewise, a heated modified airflow of 78° F. is also considered to be a perceptible temperature difference. Those of skill in the art will appreciate that a heated or cooled temperature difference of greater than 1-2 degrees differential is even more perceptible, and therefore falls within the scope of the present invention as it relates to generation of a modified airflow that has a perceptible temperature difference relative to ambient air temperature. Those of skill in the art will further appreciate that ambient air temperature will impact the temperature of the modified airflow exhausting out the return port 118. The system 100 of the present invention generates a temperature differential between intake ambient air and exhausted return air. As such, if the ambient air is at a room temperature of 76°, the temperature of the modified airflow will be similar to the above example (e.g., 76° F. ambient will result in about a 120° F. heated modified airflow temperature, or a 50° F. cooled modified airflow temperature). When the temperature of the ambient air is substantially cooler (e.g., such as 32° F.) then the exhausted return air will likely not achieve 120° F., but a lower temperature (e.g., of about 75° F.). When the temperature of the ambient air is substantially warmer (e.g., such as 90° F.) then the exhausted return air will likely not achieve 50° F., but a warmer temperature (e.g., of about 65° F.). Those of skill in the art will appreciate that all of the temperatures provided herein are merely illustrative examples, and in no way limit the present invention to these temperatures. There are numerous thermodynamic principals and factors that contribute to the specific exhaust airflow temperatures that will result from operation of the system 100 of the present invention, each of which is calculable with certain variables being known, and all of which fall within the teachings of the present invention as it relates to modified airflow temperatures. It is important to note that the temperature differential between the exhaust airflow temperatures and the ambient air temperature is not due to a wind chill factor, but rather to an actual difference in temperature.

What is important to understand with regard to the present invention is the perceptible temperature difference between ambient air and the modified air (thermally modified, filtered, and vapor purified) is that the temperature difference being perceptible provides for a method by which the user/operator is enabled to sense when heated or cooled modified airflow is being directed as desired. The user/operator can place their hand or face or other exposed skin area into the airflow and sense or perceive the temperature difference. With that perceptible temperature difference, the user/operator is able to distinguish where the thermally modified, filtered, and vapor purified airflow is flowing, and direct it accordingly. For example, if the user/operator is outside on a Spring day of 85° F. outdoor temperature (ambient air temperature), and it is pollen season, the user/operator is enabled by the system 100 of the present invention to direct cooled modified air toward, e.g., their face, and sense a temperature difference (e.g., a difference of about 25 degrees with a cooled modified airflow temperature of about 60° F.) and know exactly where the temperature modified and filtered air is flowing. This airflow can be directed toward the user's face and they can have certainty that the air is filtered and pollen has been removed. Thus, the user/operator receives the benefit of both the temperature modification and the air filtration, in the airflow that is directed as desired. With conventional air filtration devices, it can often be difficult or impossible to perceive where the airflow is coming from, and whether the user is experiencing turbulent air that is disrupted by the conventional air filtration device, or whether the user is experiencing the filtered air directly from the conventional air filtration device, because there is no temperature differential (conventional devices merely filter the air, they don't also modify the temperature of the air) especially in situations where the airflow is low flow (so as to avoid being noisy or disruptive to the user). For a user/operator to be able to receive the benefits of temperature modified and filtered airflow, whether at a higher rate of airflow that is easily felt but may be noisy or disruptive, or at a much lower rate of airflow that is more difficult to perceive just based on rate of airflow but also therefore not otherwise disruptive and noisy, the user/operator must make use of a device such as the system 100 of the present invention that provides temperature modified and filtered air, as disclosed and described herein.

FIGS. 10A to 17B depict exemplary exploded views of the lid 110, the insulating insert 115, the thermal energy concentrator 124, an air filter 117, and how they fit together to form the personal ambient air temperature modification, filtration, and purification system 100. FIG. 10A is a front isometric exploded view of the lid 110, the insulating insert 115, the air filter 117, and the thermal energy concentrator 124 of the personal ambient air temperature modification, filtration, and purification system 100. FIG. 10BA depicts in a side cross-sectional view an alternate embodiment of the system 100 of FIG. 10A, wherein the air filter 117 comprises an additional one or more thermal diffusion blades 125. FIG. 11A is a front isometric exploded view of the lid 110, the insulating insert 115, the air filter 117, and the thermal energy concentrator 124 of the personal ambient air temperature modification, filtration, and purification system 100 wherein the air filter 117 is disengaged from the insulating insert 115 so as to show the surface of the filter layer. FIG. 11B depicts in a side cross-sectional view an alternate embodiment of the system 100 of FIG. 11A, wherein the air filter 117 comprises an additional one or more thermal diffusion blades 125. FIG. 12A is an exploded view of an insulating insert and the at least one thermal diffusion blade, and FIG. 12B shows the insulating insert and the at least one thermal diffusion blade coupled together in full assembly configuration; and FIG. 12C shows alternate views of the insulating insert and the at least one thermal diffusion blade coupled together in full assembly configuration. FIG. 13A is a front isometric exploded view of the filter and woven poly fabric layers inserted into the filter FIG. 13B of the personal ambient air temperature modification, filtration, and purification system.

FIGS. 14A and 14B are a top view and an isometric side view of the insulating insert and the at least one thermal diffusion blade coupled in full assembly configuration.

FIGS. 14C and 14D are a top view and an isometric side view of the at least one thermal diffusion blade and an air filter coupled in full assembly configuration.

FIGS. 14E and 14F are a top view and an isometric side view of the at least one thermal diffusion blade and an air filter coupled in full assembly configuration.

FIGS. 14G and 14H are a top view and an isometric side view of the at least one thermal diffusion blade coupled in full assembly configuration. FIG. 15A is a right side exploded view of the lid 110, the insulating insert 115, the air filter 117, and the thermal energy concentrator 124 of the personal ambient air temperature modification, filtration, and purification system 100. FIG. 15B depicts in a side cross-sectional view an alternate embodiment of the system 100 of FIG. 15A, wherein the air filter 117 comprises an additional one or more thermal diffusion blades 125. FIG. 16A is a rear exploded view of the lid 110, the insulating insert 115, the air filter 117, and the thermal energy concentrator 124 of the personal ambient air temperature modification, filtration, and purification system 100. FIG. 16B depicts in a side cross-sectional view an alternate embodiment of the system 100 of FIG. 16A, wherein the air filter 117 comprises an additional one or more thermal diffusion blades 125. FIG. 17A is a left side exploded view of the lid 110, the insulating insert 115, the air filter 117, and the thermal energy concentrator 124 of the personal ambient air temperature modification, filtration, and purification system 100. FIG. 17B depicts in a side cross-sectional view an alternate embodiment of the system 100 of FIG. 17A, wherein the air filter 117 comprises an additional one or more thermal diffusion blades 125. Those of skill in the art will appreciate that an alternative embodiment of the system 100 can remove the requirement for the thermal energy concentrator 124. Absent the thermal energy concentrator 124, the air can be drawn into the interior volume 105 of the container 102 and in a turbulent and chaotic manner mix around and then exhausted out as return air through return port 118. Though an embodiment without some form of thermal energy concentrator to direct air more completely or thoroughly through the whole of the interior volume 105 volume of the container 102 will, as would be appreciated by those of skill in the art, be less thermally efficient in transferring thermal energy to the air before it exhausts the system.

In operation, (and as shown in FIGS. 10A-17B), the insulating insert 115 enables the container 102 that the insulating insert 115 is attached thereto/therein (e.g., the personal ambient air temperature modification, filtration, and purification system 100) to be significantly more efficient in maintaining an internal temperature in either hot or cold weather for extended periods of time. In the example embodiment of the personal ambient air temperature modification, filtration, and purification system 100, the insulating insert 115 provides an insulated intake air flow channel to isolate core air flow channel from ambient temperature. The insulated body of the insulating insert 115 isolates container 102 space from exterior lid 110 components (e.g., fan) to maximize insulation properties of a motorized lid 110 constructed with a motorized fan air intake opening within a closed personal ambient air temperature modification, filtration, and purification system 100.

The air filter 117 can take a number of different forms and be made of different materials, as would be understood by those of skill in the art. For example, the air filter 117 can be a fiberglass filter, a polyester filter, a carbon filter, or a high efficiency particulate air (HEPA) filter, or alternatively an air ionizing and purifying technology. The air filter 117 as shown is removable and replaceable. It fits within the air channels 116a, 116b, and is removably and replaceably coupled with the insulating insert 115. Other structures that place the air filter in the path of airflow A can be appreciated by those of skill in the art based on the teachings herein to fall within the scope of the present invention. The air filter 117 can additionally be formed as part of the insulating insert 115, or can be a separate component. The air filter can be made available in different colors to readily indicate to a user the type of particulate that is being filtered (e.g., black for smoke, yellow for pollen, etc.). An LED indicator 119 (see FIG. 7) can be provided to indicate the status of the air filter based on predetermined parameters, such as operating time of a motorized air movement mechanism 120, such as a fan, that causes movement of air through the system. Air passing through the air filter 117 is filtered and/or purified depending on the structure of the air filter 117. Likewise, referencing FIG. 7, an LED or other light source 125 can be provided positioned and configured to illuminate the air channels 116a, 116b (shown in FIG. 6 with respect to air channel 116b, but can be implemented in a number of different arrangements and configurations as would be understood by those of skill in the art). The light source 125 can be single color or multi-colored, and can be powered by the same power source as a personal ambient air temperature modification, filtration, and purification system 100 in which it is mounted. The personal ambient air temperature modification, filtration, and purification system 100 is formed from the assembly of the lid 110, the thermal energy concentrator 124, the air filter 117 and the insulation insert 106 being installed on a container 102. In particular, the lid 110 is threaded into the opening of the container 102 with the thermal energy concentrator 124 located within the interior volume of the container 102. Note that intake airflow A comes into the lid 110, travels down the interior side of the container 102 and back up through the thermal energy concentrator 124 as exhausted return airflow B as depicted and described below, without the intake airflow A pooling or otherwise interacting with the exhausted return airflow B.

FIGS. 10A-17B depict example airflows and how the airflow intake and airflow exhaust are separated by the insulating insert 115 and air filter 117. In particular, an intake airflow A is pulled into the lid 110 through the air inlet 122 by a motorized fan within the lid 110, as discussed in greater detail with respect to U.S. patent application Ser. No. 15/699,472. From the air inlet 122, air channels 116a, 116b drive the air down into the side of the container 102. The combination of the channels 116a, 116b, and the forces proved by a motorized fan within the lid 110 prevents air from lingering at the top of the container 102. Instead, the airflow A flows down along the wall of the container 102 into an interior of the container 102. Driving the air down the inside walls of the container 102 makes a significant difference because it thermally isolates the ambient air within the container 102 away from the modified air exhausting from the container 102 (e.g., airflow B through exhaust port). It is beneficial to keep the ambient air intake and modified air exhaust as separate and thermally isolated as possible in order to prevent heat transfer between the two (if the ambient air heats up the exhaust port because there is insufficient insulation between the two, then the output air is not as cold or as hot as it otherwise could be). For example, if there is cold thermal material within the interior volume of the container 102, as ambient air is pulled in through the air inlet 122/channels 116*a*, 116*b* and along the sidewalls of the container 102 (e.g., airflow A) the ambient air is being cooled by the cold thermal material in the interior volume. Thereafter the temperature modified air is exhausted out toward a user (e.g., airflow B). Again, as the air flows along airflow A, when an air filter 117 is in position as depicted herein, the air passing therethrough is filtered and/or purified based on the structure of the air filter 117. As would be appreciated by one skilled in the art, the air filter 117 may comprise an air filter collar that couples to the insulator insert and functions to hold multiple air filter layers, where the air filter layers and air filters 117 can include any combination of a disposable air filter, fiberglass filter, polyester filter, carbon filter, or a high efficiency particulate air (HEPA) filter, etc.

After proceeding through the air filter 117, the filtered ambient air is drawn through the interior volume 105 of the container 102 and across a combination fluid vapor source and thermal energy storage component 121 disposed in the interior volume 105. The combination fluid vapor source and thermal energy storage component 121 uses simple thermal energy, by heating or cooling, to modify the humidity and proportionate composition of liquid, gas, and vapor in the interior volume 105 of the container 102 where interaction of matter of different temperatures results in heat transfer inducing phase transitions, thereby generating, through processes including sublimation, melting, evaporation, convection and condensation, a net of fluid droplets, that may take the form of fluid vapor, that bind and entrap airborne particles from the filtered air flowing through the interior volume 105 of the container 102, effectively capturing the particulates and preventing their introduction back into an environment. Alternatively or additionally, the motorized air movement mechanism draws air through the interior volume 105 of the container 102 so as to change pressure in the container, impacting phase transition dynamics and specific thermal energy storage components 121 can undergo chemical reactions that absorb air but not water molecules or produce additional water molecules as a byproduct of reactions using air as a reagent. In each instance, variables of the ideal gas equation (e.g. temperature or pressure) are manipulated to impact phase transitions related to the combination of the air, the thermal energy storage components 121, and the thermal energy related thereto. Particulates include, but are not limited to, pollen, dust, and smoke, or any particulate that is able to pass through the filter 117 (or other similarly situated filter) undeterred. Fluid droplets adhere to airborne particles passing through the interior volume 105 of the container 102 by collision, electromagnetic attraction, chemical reaction, or as a result of surface condensation, effectively capturing that particle. Once captured, the resulting combination of particle and droplet have increased in size and mass such that it is not possible to ascend with the airflow moving up through the thermal energy concentrator 124 and so remain detained within the interior volume 105 of the container 102, not to be delivered into an external environment 111. Filtration by a mechanical air filter 117 combined with particle vapor adhesion and capture reduces the amount of airborne particles diffused back into an environment, providing a user with a concentrated dose of thermally modified, filtered, and vapor purified air that is perceptibly different to a user, providing a "sense of the reduction" of airborne particulates that is not possible with other purification systems and methods that immediately diffuse the results of purification. When the air passes from the air filter 117 into the interior volume 105 of the container 102 after undergoing mechanical filtration, the thermal change in air temperature interacts with the thermal energy storage components 121 and, by processes including sublimation and condensation, creates complex moisture surfaces inside the container 102, including the interior side 112 of the container 102 facing the interior volume 105 and the thermal energy concentrator comprising an elongate air manifold and thermal energy concentrator 124. In alternative embodiments without a thermal energy concentrator, air flows through the interior volume 105 of the container 102 in a more turbulent and random manner. Fluid droplets and complex moisture surfaces enable small and large particulates to adhere to the interior of the system, further reducing the amount of airborne particles diffused back into an environment. The vapor adhesion can be explained as follows. As the air circulates through the interior volume 105 that contains the water vapor (fluid droplets), these water particle surfaces have a valence potential for attracting microscopic airborne particles found in the filtered air. As the mechanically filtered air comes into contact with these chilled or heated wet surfaces inside the container 102, smaller airborne particles passing through the interior volume 105 are attracted to the water vapor particles, and captured. This process can be referred to as vapor particle entrapment, or VPE. Hence, the combination of both a conventional mechanical filtration system for particles larger than 0.3 microns, such as pollen, ragweed and common dust size particles, together with the VPE technology for attracting smaller, airborne particulates to the wet surfaces and water droplets generated by both ice and exothermic heat pods, results in further purification of the filtered air.

The thermal energy used combination fluid vapor source and thermal energy storage component 121 to perform these processes, defined herein as vapor capture that creates vapor purified air, can be supplied by any of the thermal energy sources contemplated by this invention (e.g., ice, ice packs, cold water, iron oxide, gel pack, battery generator heat pack) or readily apparent to those skilled in the art. As detailed herein, the combination fluid vapor source and thermal energy storage component may also be configured to use more than one thermal energy source to perform these processes.

As it relates to filtration and vapor purification as disclosed and described herein, the system 100 of the present invention provides substantially improved cleaning of air. Those of skill in the art will appreciate that HEPA filters, or HEPA-type filters, have different classes related to the amount of particulates removed. For example, in terms of efficiency ratings, E10 is >85%, E11 is >95%, E12 is >99.5%, and the like, up to U17 >99.999995%. The addition of the vapor purification adhering to particles that make it through the filter 117 removes additional particles from the air, making the resulting temperature modified, filtered, and vapor purified air some degree cleaner than air that has been simply filtered and not water vapor purified. As such, the present invention achieves an improved air quality relative to other known air filtration systems or devices that do not combine mechanical or other filtration with adhesion via passing the air through a water vapor enhanced environment.

In accordance with an example embodiment of the present invention, air is transformed into vapor purified air by vapor capture when air in interior volume 105 of the container 102 flows through ice cubes lowering ambient air temperature, whereby passage through tortuous ice surfaces creates phase changes in the ice and air including sublimation followed by condensation and this exposure of the passing air to water droplets and water vapor, creates vapor adhesion and particle capture, and also forces modified temperature air to pass through a mechanical airflow system at a different temperature than ambient temperature, enabling increased airborne particle entrapment, thereby improving filtration beyond use of mechanical filtration alone.

In accordance with alternative example embodiment of the present invention, as the air passes over the thermal energy storage component, the thermal energy storage component reacts with the air, removing air but leaving fluid molecules, for example water molecules present in ambient air, and adds heat and can additionally add water as a byproduct of the reaction with the thermal energy storage component. This coupled with any change in pressure imparted from the motorized air movement mechanism results in the presence of additional fluid droplets, including in the form of vapor and condensation that capture airborne particulates. The air passing inside the interior volume 105 of the container 102 is additionally warmed by exothermic heating provided by thermal energy sources (e.g. a chemically induced heat pack that can include Air-activated hand warmers containing cellulose, iron, water, activated carbon, vermiculite (water reservoir) and salt, and produce heat from the exothermic oxidation of iron when exposed to air.) of the fluid vapor source and thermal energy storage component 121, which uses thermal energy to promote evaporation, humidity changes, vapor movement and subsequent condensation within the interior volume 105 of the container 102, including the thermal energy concentrator comprising an elongate air manifold and thermal energy concentrator 124, creating complex moisture surfaces that enable small and large particulates to adhere to the interior of the system, and thereby forcing modified temperature air to pass through a mechanical airflow system at a different temperature than ambient temperature, enabling increased airborne particle entrapment, thereby further reducing the amount of airborne particles and improving filtration beyond use of mechanical filtration alone.

In accordance with an alternative example embodiment of the present invention, the insulating insert 115 and the air filter 117 can together form a multi-channel airflow manager that when the fan 120 is operating, supply air flows in to the interior volume 105 of the container 102 through an air inlet 122 that comprises two or more air intake ports 116 and a plurality of airflow channels 116a, 116b, etc., divided as a manifold through the insulating insert 115, and then the air filter 117 collar is configured to merge airflows of the air channels 116a, 116b, etc. from the two or more air intake ports 116, changing a direction of the air as the air passes through a cross sectional area of a flat air filter layer of the air filter 117 coupled to the air filter collar. The insulating insert 115 and the air filter 117 can also be formed as a single removable insert with an air filter 117 that attaches to the base of the insulating insert 115 that in turn functions as a multi-channel airflow manager supplying air through multiple air channels 116a, 116b, etc., into the interior volume 105 of the container 102 where the filtered air transforms into thermally modified, filtered, and vapor purified air by passing across the at least one combination fluid vapor source and thermal energy storage component 121 through thermal energy concentrator comprising an elongate air manifold of the thermal energy concentrator 124 as part of a separate central air channel 162 insulated from the other air channels 116a, 116b, etc., formed by the insulating insert 115, before the motorized air movement mechanism 120 delivers the air out the air return port 118.

In accordance with an alternative example embodiment of the present invention, 10 FIGS. 10B, 11B, 12B, 13B, 14 A-H, 15B, 16B, and 17B show the insulating insert 115 and the air filter 117 can together form a multi-channel airflow manager that when the fan 120 is operating, supply air flows in to the interior volume 105 of the container 102 through an air inlet 122 that comprises two or more air intake ports 116 and a plurality of airflow channels 116a, 116b, etc., divided as a manifold through the insulating insert 115, and then the air filter 117 collar is configured to merge airflows of the air channels 116a, 116b, etc. from the two or more air intake ports 116, changing a direction of the air as the air passes through a cross sectional area of one or more flat air filter layers of the air filter 117 coupled to the air filter collar. The air filter layers can be the 4 air filter layers of woven fibers of polypropylene fabric die cut or laser cut into a circular disc shape, wherein each filter layer is stacked and oriented at 30 to 90 degrees to an adjacent fabric layer to create a tortuous airflow pathway, trapping airborne particles while maintaining airflow. Passing through the air filter layers, the air filter 117 can include, or be coupled to, at least one thermal diffuser 125, for improved air flow thermal regulation prior to contact with thermal energy storage components, where, prior to exiting the supply opening 123 of each of the thermal diffusers 125, filtered air from the air filter layers of the air filter 117 is exposed to convection occurring due to the increased surface area of the each of the longitudinal bodies of thermal diffusers 125, thereby transferring thermal energy, hot or cold, and imparting it into the airflow in the same manner as the elongate manifold of the thermal energy concentrator 124, only this convection uses the temperature characteristics created in the interior volume 105 of the container 102 created by the at least one combination fluid vapor source and thermal energy storage component 121 prior to direct contact with the at least one combination fluid vapor source and thermal energy storage component 121. The process of filtration, purification, and temperature modification then proceeds as in the other embodiments, moving from contact with the at least one combination fluid vapor source and thermal energy storage component 121 to entrance into the intake of the thermal energy concentrator 124 and eventually out of the air return port 118 into the environment 111 of the user.

Figure 18:
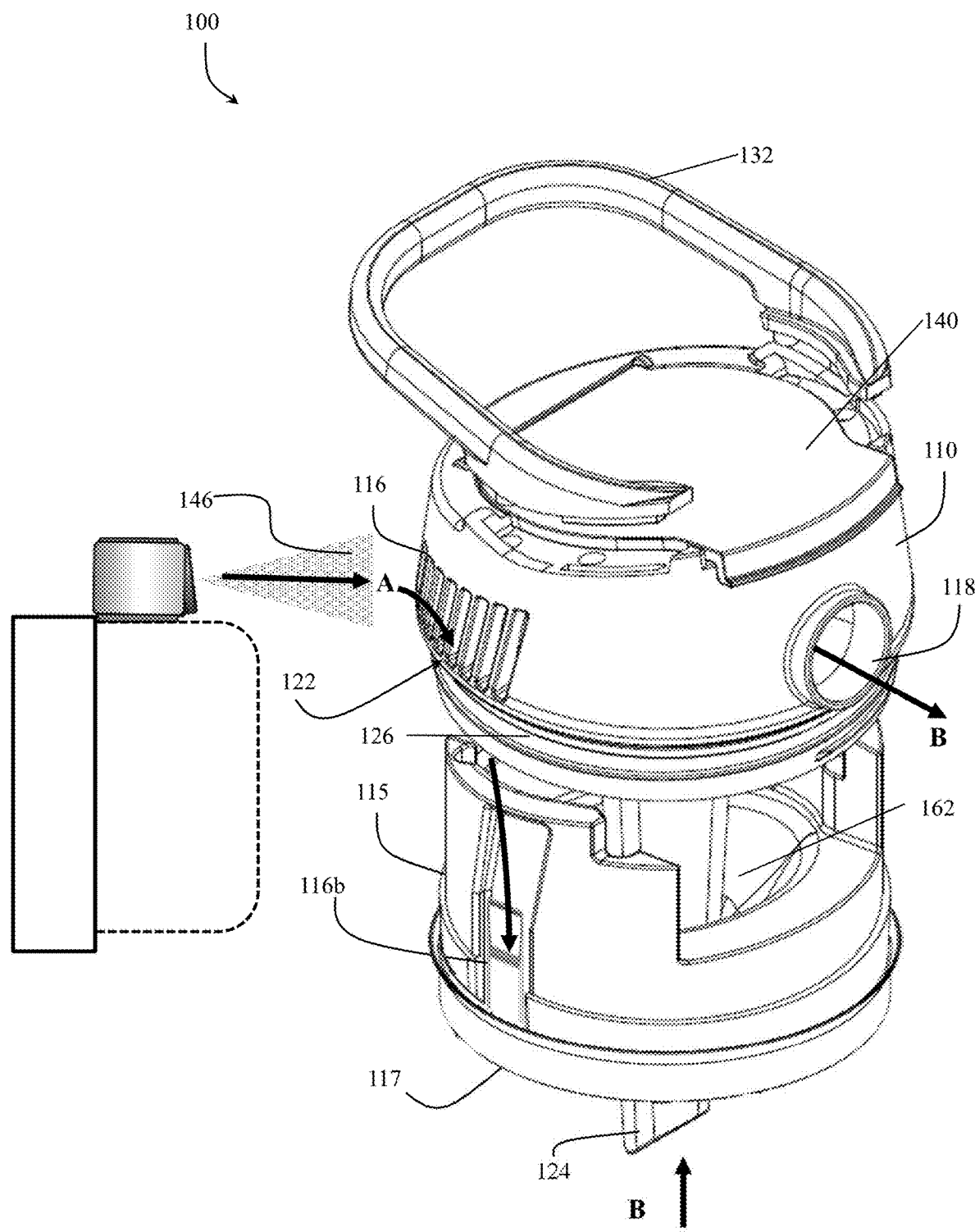
FIG. 18 is an isometric illustration of the lid and an insulating insert shown in exploded view that is configured to fit within the lid when fully assembled that shows application of the antimicrobial spray mist.

In accordance with an alternative example embodiment of the present invention, FIG. 18 depicts an isometric illustration of the lid and an insulating insert shown in exploded view that that shows application of the antimicrobial agent, defined to include antiviral, antibacterial, antimicrobial, antiseptic, and germicidal compounds or chemicals known in the art. The antimicrobial agent is applied as a spray or mist injected into the intake ports 116 of the lid 110 of the system 100, to create a two stage air purifier filter where air flow characteristics of the system 100 operate to create an even distribution of antimicrobial agent for an extended period of time duration following application that destroys germs on contact and serves as an all purpose sanitizer spray and air purifier filter sanitizer to clean and disinfect system 100 component during operation. The antimicrobial agent may be present in an aqueous solution, or may additionally comprise scented elements that serve to freshen air in the system with a subtle fragrance to further enhance filter, purified, temperature controlled exhaust air delivered to the user. The antimicrobial agent and/or sanitizer spray or mist functions by "antiseptic contact" to airborne particles entering the system 100 and air filter 117 treated with the antimicrobial spray. Unlike traditional HEPA air filter devices, that cannot get wet without destroying the efficacy of, or HEPA filter itself, the system 100 and air filter 117 can operate in a weather resistant configuration, that can further benefit from the repeated use of an antimicrobial or sanitizing spray mist to help disinfect or sanitize 99% of the common disease causing germ particles that come in contact with the surfaces of the system 100 and air filter 117. One spray on each intake port or vent during system 100 use supplies clean, fresh, sanitized air to further improve purified air quality. Application of the agent can be freshened with several fragrance choices including all natural ingredients to enhance the experience and can be further applied to help freshen/sanitize shoes, stroller seat/baby car seats diaper bags, car air vents, and/or ports caps/hats/athletic apparel. Each formulation of the antimicrobial agent can comprise a category 1 active ingredient, making it safe and effective for use on humans when used as directed, and may possess additional beneficial properties such as moisturizing, and may be further formulated to prevent the smell of alcohol from disturbing users. Antimicrobial agents or active ingredients thereof may include one or more of ethyl alcohol denat (denatured alcohol), aloe vera, glycererth-26 glyceryl ester, radish root ferment filtrate, mint extract or oil, lavender oil, sage oil, lemon oil, lime oil, orange oil, multitudinous oil, humectant or lubricant, or combinations thereof.

Figure 19:
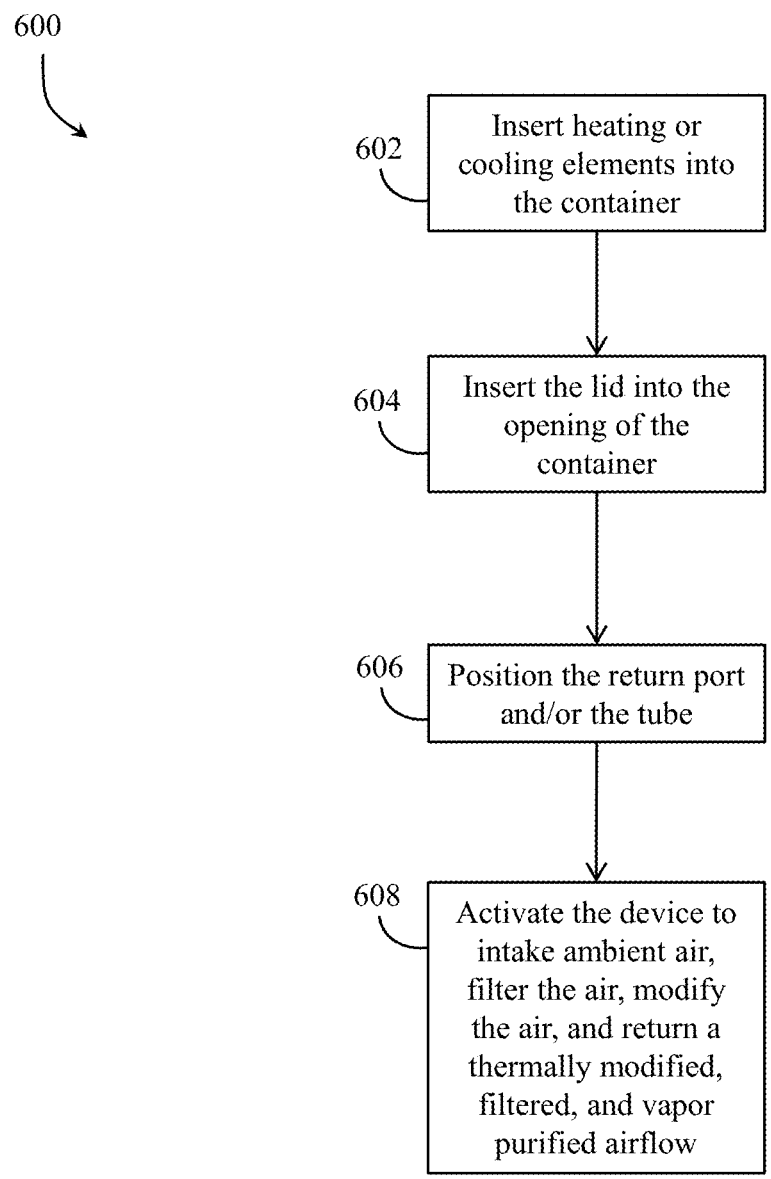
FIG. 19 is an illustrative flowchart depicting the method of use of a personal ambient air temperature modification, filtration, and purification system.

FIG. 19 shows an exemplary flowchart depicting operation of the present invention. Specifically, FIG. 19 depicts an exemplary flowchart showing the process 600 for carrying out the operation of the system 100 to provide cooling or heating to a user. At step 602, the user inserts the heating or cooling elements (e.g., the combination fluid vapor source and thermal energy storage components 121) into the interior volume 105 within the container 102 (and attached to the air manifold and thermal energy concentrator 124). At step 602, the user inserts the lid 110 into the opening 106 of the container 102. The lid 110 is sealed, by the vibration absorption perimeter gasket seal 128, within the opening 106 of the container 102. At step 606, the user directs the positioning of the return port 118 and/or the tube in the direction that the modified airflow is desired. Step 606 can also include attaching the optional the tube to the return port 118 of the lid 110.

At step 608, the user activates the system 100 (e.g., turning on the variable speed fan control 130) and the system 100 intakes ambient air, filters the air, purifies the air, modifies the air and produces the thermally modified, filtered, and vapor purified air output from the ambient temperature air intake. In accordance with an example embodiment of the present invention, during operation, the user can modify the fan speed by adjusting the variable speed fan control 130. The importance of the fan speed is that when the system 100 is used with different materials providing thermal energy sources (e.g., ice, ice packs, cold water, iron oxide, gel pack, battery generator heat pack) the fan speed can be tailored to provide the most beneficial temperature difference out from the container 102. For example, higher fan speeds can cause the ambient air to pass more quickly through the system 100 and therefore have less opportunity to absorb thermal energy (resulting in cooler warm air flow if attempting to heat, or warmer cool air flow if attempting to cool as it exits through the return port 118). Likewise, lower fan speeds may be more desirable for ambient air temperature modification when used for small children and or pets. Lower fan speeds can also cause less vibration and less collateral noise generation.

Continuing with step 608, operation of the system 100 includes an intake of ambient temperature air through the at least one air intake port 116 and air inlet 122. While the air from the air inlet 122 is forced through the air channel 116a it passes through an air filter 117 and across the combination fluid vapor source and thermal energy storage component 121 thereby filtering and purifying the air. While the ambient temperature filter, purified air is forced through the air manifold and thermal energy concentrator 124, the ambient temperature air is exposed to multiple temperature modifying surfaces adjacent to the elongate air manifold of the thermal energy concentrator 124 prior to being drawn into a type fan housing 138 and out toward a localized area user through the return port 118 (and optionally through the tube coupled with the return port 118), thereby supplying temperature-modified air to the user.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for personal ambient air temperature modification, filtration, and purification, comprising:
    a container configured to be handheld, having one or more thermally insulated walls defining an interior volume and an air inlet providing opening disposed through a first end of the container;
    an air channel fluidly coupling the air inlet and the interior volume of the container;
    an air filter disposed in the air channel;
    at least one combination fluid vapor source and thermal energy storage component disposed in the interior volume;
    an air manifold air manifold having an air funnel opening at a first end and an intake opening at a second end in fluid communication with the interior volume;
    a motorized air movement mechanism fluidly coupling the air manifold with an air return port, wherein operation of the motorized air movement mechanism draws air in through the air inlet, through the air channel, through the air filter, through the interior volume where the air flows across the at least one combination fluid vapor source and thermal energy storage component, through the air manifold, in through the motorized air movement mechanism and out through the air return port;
    wherein the air passing through the air inlet is ambient air that transforms into filtered air by passing through the air filter;
    wherein the filtered air transforms into thermally modified, filtered, and vapor purified air by passing across the at least one combination fluid vapor source and thermal energy storage component and experiencing vapor particle entrapment; and
    wherein the thermally modified, filtered, and vapor purified air exits the system as exhaust air through the air return port;
    a base disposed at a second end of the container opposite the first end, the base having an interior side facing the interior volume and an exterior side opposite the interior side;
    the one or more thermally insulated walls having an interior side facing the interior volume and an exterior side opposite the interior side;
    a lid removably and replaceably coupled to and covering the container, obstructing the opening when in a sealed position and exposing the opening when removed from the container, the lid comprising:
        an interior side facing the interior volume and an exterior side opposite the interior side;
        one or more air intake port disposed in the lid and positioned to draw supply air from an external environment to the air inlet to flow into the interior volume of the container, the air inlet providing an opening into the container in fluid communication with the interior volume of the container through the air channel positioned to draw ambient air from the external environment to flow into the interior volume of the container;
        the motorized air movement mechanism disposed inside the lid that draws air through the one or more air intake port, the air inlet, the internal volume of the container, and exhausts return air through the air return port disposed in the lid to an external environment external to the container and the lid; and
    at least one thermal diffusion blade disposed in the interior volume of the container, the at least one thermal diffusion blade each comprising:
        an elongate conduit blade having a first end and a supply opening at a second end, first end fluidly coupled with the one or more air intake port and the air channel, and the supply opening fluidly coupled with the interior volume of the container;
    wherein when the lid is in the sealed position on the container, the motorized air movement mechanism is operating, and ambient air is drawn through the one or more air intake port, into the at least one thermal diffusion blade, out through the supply openings and into the interior volume of the container and across at least one combination fluid vapor source and thermal energy storage component disposed in the interior volume of the container, the ambient air being treated by convection with the at least one thermal diffusion blade and the at least one combination fluid vapor source and thermal energy storage component before entering into the intake opening and through the air manifold.

2. The system of claim 1, wherein the container is sized, dimensioned, and adapted to fit in a cup holder, and has a double wall configuration with an one or more thermally insulating materials or air gap disposed between walls of the double wall configuration, wherein the interior volume of the container is one of about 10 oz, about 15 oz, about 20 oz, about 24 oz, about 30 oz, about 36 oz, about 40 oz, about 45 oz, about 50 oz, about 55 oz, or about 60 oz.

3. The system of claim 1, wherein the air channel further comprises an insulating insert removably and replaceably inserted within and coupled to the lid proximate the interior side facing the interior volume to provide thermal or temperature, sound and vibration insulation or dampening, and
    wherein an air filter is removably and replaceably coupled to an air filter collar, which is removably, replaceably and fluidly coupled to the insulating insert.

4. The system of claim 3, wherein the insulating insert further comprises one or more air intake channels providing fluid communication between the one or more air intake port and the interior volume of the container when the lid is in the sealed position on the container, wherein the air inlet comprises two or more air intake ports and the air channel is divided as a manifold through the insulating insert and the air filter collar is configured to merge airflows of the air channel from the two or more air intake ports, changing a direction of the air as the air passes through a cross sectional area of a flat air filter layer of the air filter coupled to the air filter collar.

5. The system of claim 3, wherein the insulating insert and the air filter collar are coupled by clips, and then coupled to the lid that is then coupled to a fan housing for the motorized air movement mechanism.

6. The system of claim 3, wherein the insulating insert and the air filter collar comprise a plastic, composite, metal, rubber, elastomeric material, non-elastomeric material, non-toxic insulating plastic foam insert, an insulating composite material, or combinations thereof.

7. The system of claim 3, wherein the container is manufactured of one or more of a plastic, composite, metal, rubber, elastomeric material, non-elastomeric material, or combinations thereof.

8. The system of claim 3, wherein the insulating insert and the air filter collar are configured to align upon insertion into and coupling with the lid, thereby forming a controlled airflow through the one or more air channels that maintain insulating properties in other areas of the insulating insert and the air filter collar to provide vibration-dampening, sound dampening, or temperature, sound and vibration insulation.

9. The system of claim 3, further comprising a central aperture disposed completely through the insulating insert and the air filter to allow the thermally modified, filtered, and vapor purified air to bypass the insulating insert and the air filter while maintaining fluid separation during transport to the air return port and delivery to an environment external to the system.

10. The system of claim 3, wherein the insulating insert and the air filter are washable and reusable.

11. The system of claim 3, wherein the air filter further comprises a high efficiency particulate air (HEPA) air filter layer.

12. The system of claim 3, wherein the air filter further comprises an air filter layer comprised of carbon components.

13. The system of claim 3, wherein the air filter further comprises an antimicrobial material.

14. The system of claim 3, further comprising an antimicrobial agent disposed in the filter and/or the system.

15. The system of claim 14, wherein the antimicrobial agent disposed in the filter and/or the system comprises an antimicrobial spray mist injected into each intake port during system use that destroys germs on contact and treats air with a fragrance to provide clean, fresh, sanitized air out of the return port of the system.

16. The system of claim 15, wherein the antimicrobial agent comprises an aqueous solution comprising a broad spectrum antimicrobial compound operating by antiseptic contact to airborne particles entering the air filter and the system treated with the antimicrobial spray mist to destroy common disease causing germs, that benefits from the repeated use of the antimicrobial mist spray injected directly into the air intake ports.

17. The system of claim 15, wherein the antimicrobial agent comprises a category 1 active ingredient safe for use on humans, and wherein the antimicrobial agent further comprises one or more of ethyl alcohol denat, aloe vera, glycererth-26 glyceryl ester, radish root ferment filtrate, mint extract or oil, lavender oil, lemon oil, lime oil, orange oil, multitudinous oil, humectant or lubricant, or combinations thereof.

18. The system of claim 3, wherein the air filter further comprises a disposable air filter layer.

19. The system of claim 3, wherein the air filter disposed in the air channel further comprises two or more air filter layers wherein each of the two or more air filter layers is selected from the group consisting of a fiberglass air filter layer, a polyester air filter layer, a carbon air filter layer, polypropylene fabric air filter layer, a HEPA air filter layer, and an air ionizing and purifying technology air filter layer.

20. The system of claim 3, wherein the air filter further comprises 3 or 4 air filter layers with electrostatic properties, wherein electrostatic fiber construction traps airborne particles.

21. The system of claim 20, wherein the air filter further comprises 4 air filter layers of woven fibers of polypropylene fabric die cut or laser cut into a circular disc shape, wherein each filter layer is stacked and oriented at 30 to 90 degrees to an adjacent fabric layer to create a tortuous airflow pathway, trapping airborne particles while maintaining airflow.

22. The system of claim 21, wherein woven fibers of polypropylene fabric are individually mold and mildew resistant, free of chemical smell, and preserve temperature modification when used inside the air filter and the container.

23. The system of claim 3, wherein the each of the at least one thermal diffusion blade has a central channel fluidly coupling the intake opening and the air funnel at the first end with the supply opening and the interior volume of the container at the second end.

24. The system of claim 3, wherein the each of the at least one thermal diffusion blade has a plurality of channels fluidly coupling the intake opening and the air funnel at the first end with the supply opening and the interior volume of the container at the second end.

25. The system of claim 3, wherein each of the at least one thermal diffusion blade has a plurality thermally conductive surface features comprising one or more of fins, contours, finger projections, or combinations thereof, which increase a thermally conductive surface area of the air manifold relative to a smooth and linear surface.

26. The system of claim 3, wherein each of the at least one thermal diffusion blade has a tapered configuration with a narrower end of the tapered configuration being proximate the supply opening at the second end in such a way that the tapered configuration is an ice deflector when the container is filled with ice cubes, crushed ice, and or shaved ice, such that each of the at least one thermal diffusion blade pushes aside the ice as the lid is coupled with the container.

27. The system of claim 3, wherein each of the at least one thermal diffusion blade further comprises attachment means selected from the group consisting of posts, slots, ribs, or cups disposed along an outer surface of each of the at least one thermal diffusion blade for engaging with the one or more thermal energy storage components disposed inside the container.

28. The system of claim 3, wherein the at least one thermal diffusion blade is comprised of a porous material or has a plurality of perforations throughout a length of the at least one thermal diffusion blade or a plurality of side wall openings.

29. The system of claim 3, wherein each of the at least one thermal diffusion blade comprises one or more thermal energy generating device attachment means for placement within and removal from the container, or wherein each of the at least one thermal diffusion blade is removably and replaceably coupled with the lid or an insert disposed in the lid via a friction or interference fit, a latch mechanism, or a threaded coupling.

30. The system of claim 3, wherein each of the at least one thermal diffusion blade is permanently coupled with the lid or an insert disposed in the lid.

31. The system of claim 3, wherein each of the at least one thermal diffusion blade is adapted to receive thermal energy from one or more thermal energy storage components disposed in the interior volume of the container, wherein the at least one combination fluid vapor source and thermal energy storage component comprises a thermal energy source comprising one or more of ice, ice packs, cold water, iron oxide pouches for generating heat, warm or cold gel packs, and battery generator heat packs, or combinations thereof.

32. The system of claim 3, wherein each of the at least one thermal diffusion blade is adapted to receive thermal energy from one or more thermal energy storage components that are folded.

33. The system of claim 3, wherein a length to width ratio of a length of each of the at least one thermal diffusion blade is greater than 10% of a diameter of the motorized air movement mechanism.

34. The system of claim 3, wherein the air manifold, the combination fluid vapor source and thermal energy storage component, and the interior of the container are configured to pass air across fluid vapor from the at least one combination fluid vapor source and thermal energy storage component as the air is drawn into the air manifold by force generated by the motorized air movement mechanism thereby capturing particles in the air in fluid vapor, wherein the configuration of the air manifold, the at least one combination fluid vapor source and thermal energy storage component and the interior volume of the container in relation to operation of the motorized air movement mechanism causes the air to move in a direction that maintains separation between fluid vapor and the air filter.

35. The system of claim 3, wherein the thermal energy concentrator is comprised of a porous material or include a plurality of perforations throughout a length of the thermal energy concentrator.

36. The system of claim 3, further comprising a vibration absorption perimeter seal disposed along a lid perimeter and comprising an rubber ribbed gasket or elastomer gasket seal configured to form an airtight seal when inserted into the container and configured to engage with the container opening when the lid is in a sealed position on the container, providing vibration dampening, noise reduction, and thermal preservation between the container opening and the lid.

37. The system of claim 3, further comprising a mechanical coupling between the lid and the container consisting of one of a friction or interference fit, a latch mechanism, or a threaded coupling.

38. The system of claim 3, further comprising a non-slip vibration absorption or vibration dampening base disposed on a bottom surface of the personal ambient air temperature modification device upon which the device rests when placed on a surface.

39. The system of claim 3, wherein the motorized air movement mechanism comprises a variable speed fan with a compact turbine blade design and configuration of fan blades that enables thermal energy convection in compact motorized fan housing promoting vacuum generation and air return port thrust.

40. The system of claim 3, wherein the motorized air movement mechanism comprises a centrifugal fan having curved fan blades, flat fan blades, or combinations thereof.

41. The system of claim 3, wherein the motorized air movement mechanism comprises a fan housing with an aperture in fluid communication with the air funnel opening of the air manifold and a fan movably coupled to a motor that is electronically coupled to a power supply and contained within a motor housing coupled to the fan housing and a lid;

wherein the fan housing, the motor housing and the lid comprise a network of weather resistant closed compartments that prevent ambient temperature fluid condensation and modified temperature fluid condensation from infiltrating by using seals and insulating materials;

wherein the weather resistant closed compartments contain and protect:
one or more electrically connected switches,
one or more printed circuit boards (PCBs) comprising light emitting diodes (LEDs), and
electrical connections;

wherein the lid further comprises:
a handle,
a battery storage compartment, a hinged, weather resistant, or waterproof, battery door cover with a snap latch that locks over into a locked, sealed and closed position on the lid, wherein the personal ambient air temperature modification device is powered with rechargeable batteries, chargeable wirelessly or with a wired connection to a charger,
a weather resistant on/off switch with LED indicator for controlling the operation of the motorized air movement mechanism or a variable speed control graphically indicating power levels that functions as an on/off switch electronically and controls supply of electrical power to the motor from the batteries in the battery storage compartment electronically connected to the variable speed control,
a charging port; and
a light emitting diode (LED) on a top surface of the lid to indicate power status to a user or an LED power indicator that is illuminated when the device is on and not illuminated when the device is off.

42. The system of claim 3, further comprising a carry handle extending from the lid wherein the carry handle is configured to enable horizontal placement of the personal ambient air temperature modification device onto a flat surface without rolling, and wherein the carry handle is configured to block accidental on/off switch activation and block accidental power cord dislodgment when connected to an external power source.

43. The system of claim 3, wherein the return port outputs airflow that is 1 degree Fahrenheit or greater temperature differential versus ambient air input temperature into the device.

44. The system of claim 3, further comprising a nozzle removably and replaceably coupled with the return port to increase airflow rate, and further comprising an exit filter coupled with the return port, to an attachable delivery tube or extension hose, wherein the air return port is articulable, comprising components that direct the air in a user selectable direction, wherein the air return port further comprises an internally located safety grill that prevents debris ejection and human contact with the motorized air movement mechanism, and wherein the air return port further comprises a push button battery operated LED light that emits light through the air return port.

* * * * *